Feb. 16, 1965 K. K. SPELLNES 3,170,041

COMMUNICATION SWITCHING SYSTEM

Filed Oct. 16, 1962 47 Sheets-Sheet 1

Feb. 16, 1965 K. K. SPELLNES 3,170,041

COMMUNICATION SWITCHING SYSTEM

Filed Oct. 16, 1962 47 Sheets-Sheet 2

INVENTOR.
Kore K. Spellnes

BY C. A. Gulbrandsen

Atty.

Feb. 16, 1965 K. K. SPELLNES 3,170,041

COMMUNICATION SWITCHING SYSTEM

Filed Oct. 16, 1962 47 Sheets-Sheet 6

Feb. 16, 1965 K. K. SPELLNES 3,170,041

COMMUNICATION SWITCHING SYSTEM

Filed Oct. 16, 1962 47 Sheets-Sheet 9

Feb. 16, 1965 K. K. SPELLNES 3,170,041

COMMUNICATION SWITCHING SYSTEM

Filed Oct. 16, 1962 47 Sheets-Sheet 10

Feb. 16, 1965 K. K. SPELLNES 3,170,041

COMMUNICATION SWITCHING SYSTEM

Filed Oct. 16, 1962 47 Sheets-Sheet 18

Feb. 16, 1965 K. K. SPELLNES 3,170,041

COMMUNICATION SWITCHING SYSTEM

Filed Oct. 16, 1962 47 Sheets-Sheet 19

Feb. 16, 1965 K. K. SPELLNES 3,170,041

COMMUNICATION SWITCHING SYSTEM

Filed Oct. 16, 1962 47 Sheets-Sheet 26

Feb. 16, 1965 K. K. SPELLNES 3,170,041

COMMUNICATION SWITCHING SYSTEM

Filed Oct. 16, 1962 47 Sheets-Sheet 29

Feb. 16, 1965 K. K. SPELLNES 3,170,041

COMMUNICATION SWITCHING SYSTEM

Filed Oct. 16, 1962 47 Sheets-Sheet 32

Feb. 16, 1965 K. K. SPELLNES 3,170,041

COMMUNICATION SWITCHING SYSTEM

Filed Oct. 16, 1962 47 Sheets-Sheet 34

Feb. 16, 1965

K. K. SPELLNES 3,170,041

COMMUNICATION SWITCHING SYSTEM

Filed Oct. 16, 1962

47 Sheets-Sheet 36

Feb. 16, 1965 K. K. SPELLNES 3,170,041

COMMUNICATION SWITCHING SYSTEM

Filed Oct. 16, 1962 47 Sheets-Sheet 43

3,170,041

COMMUNICATION SWITCHING SYSTEM

Kore K. Spellnes, Glen Ellyn, Ill., assignor to Automatic Electric Laboratories, Inc., Northlake, Ill., a corporation of Delaware Filed Oct. 16, 1962, Ser. No. 230,887
15 Claims. (Cl. 179—18)

This invention relates to a communication switching system, and more particularly to a register-translator telephone switching system having marker controlled crosspoint switching groups.

The present application is related to my copending U.S. patent application Serial No. 782,067, filed December 22, 1958, now U.S. Patent No. 3,106,615, for a Communication Switching System (filed with the former spelling of my name, Kare K. Spjeldnes).

It is an object of this invention to provide new and improved methods and arrangements for interconnecting the switching control units, and for transmitting control signals between the switching groups used in setting up a communication path between telephone lines or trunks.

It is another object of this invention to increase the flexibility of telephone switching systems in order to permit rapid and inexpensive rearrangements to meet changes in traffic and other environmental conditions and to facilitate the addition of new and unusual functions in telephone switching systems.

It is another object of this invention to increase the reliability of telephone switching systems and to reduce the cost of maintenance of such systems.

These and other objects of this invention are attained in one specific illustrative embodiment wherein the system comprises two main parts, the transmission path and the common control. The transmission path includes line groups and group selectors. The common control includes register-sender groups and translators. In addition, trunk groups provide access from incoming trunks to the register-sender groups. Each group is self contained in regard to its logic circuitry. Each operates independently of the other sections. This makes it possible to add a section to any existing office and test it before cutting it into service.

Each transmission path group comprises an arrangement of crosspoint switching matrices. Markers are used to find idle paths and establish connections through these matrices. The crosspoint switches are preferably of a type which provides a metallic conversation path. The markers employ electronic circuits which provide very high speed operation, and thus make possible a very short holding time in using the markers on a one-at-a-time basis.

Each register-sender group includes electronic apparatus shared on a time division multiplex basis, with a ferrite core array used in a recirculating arrangement. The use of multiplex time sharing along with the fact that the registers are in a common pool, with each register used for each originating call only as long as it is needed to receive the dialing or other signals and establish the connection to a called line or an outgoing trunk results in a considerable saving of equipment.

Each register-sender group comprises fewer senders than registers. Each of the senders is equipped to provide high speed serial binary code transmission to the markers in the local office, and also to provide various modes, such as dial pulse of multi-frequency signalling to other offices, in accordance with instructions from the register.

This system provides full translation on every call from the directory number to an equipment location number. Each subscriber in the exchange is identified to the other subscribers by the office code, or one of a number of office codes, of that exchange and by a line directory number. His line is also assigned in that exchange a particular appearance on a set of terminals of the switching equipment. This arrangement also permits party-line service to be furnished on a completely flexible basis which permits the retention of the same telephone number when a party-line subscriber moves to a new location, even though only a single called terminal is provided for a party line, which represents a considerable economy in the switching apparatus. Also there is no necessity for a line intermediate distributing frame, each subscriber line is jumpered from the main distributing frame to the switching equipment only once—at the time it is installed. Any change of subscriber service is accomplished simply by changing the instructions stored in the translator.

The translator preferably uses a magnetic drum. Changes on the drum are made simply by keying instructions in from a control console.

The translator equipment is arranged to be accessed from the register-sender groups. The translator assigns itself to a register at various times during dialing, for example at the end of a group of digits representing an office code or other special code.

One advantage of the register-translator arrangement is the ability to receive and transmit over an outgoing trunk circuit signals of types other than those generated by the usual subscriber dial, selecting the type of signalling on the basis of the kinds of switching equipment used in the connecting offices and the current state of the signalling art. Another advantage in a modern telephone system is the advantageous accumulation and retention of all of the information required for automatic message accounting.

One feature of the invention relates to the fact that a marker during the establishment of an originating connection to a register after identifying the calling line or trunk for use in establishing the connection to the register, also transmits this line or trunk identification by high speed serial binary code to the register. If ticketing is required the line number identification which has been received from the marker as an equipment location number is supplied to the translator to obtain the calling subscriber directory number.

According to another feature, the system is asynchronous, each unit having its own independent timing. Each marker, each register-sender group, and each translator group is completely self contained; each having its own pulse sources (clocks), distributors, logic circuits, and other components individual thereto, with no such components used in common by more than one such unit. An arrangement is provided which permits different switching units under the control of different markers to have access to output terminals in common, to permit one marker to seize an outlet and lock out any other connections thereto by other markers.

Another feature relates to alternate route selection, which is performed by the group selector marker, eliminating pocketed calls and in some cases the need for retranslation when the primary route is unavailable.

According to another feature, ticketing equipment need not be associated with the outgoing trunk but may be inserted in the connection by the group selector as needed. Placing ticketing equipment on a common pool basis increases its efficiency.

The group selector marker is equipped to identify the ticketing trunk and relay this identity to the register sender group; this permits ticketer storage functions to be placed on the magnetic drum eliminating the need for storage facilities in the ticketing trunk.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 50 wherein;

FIG. 1A is a block diagram of a telephone switching exchange;

FIGS. 1 to 7 comprise a more detailed block diagram of the exchange;

FIGS. 8–11 show the arrangement and interconnection of the switching matrices in a line group;

FIGS. 12–33 comprise a schematic and block diagram of a line group and line group marker;

FIGS. 34–41 comprise a schematic and block diagram of a group selector and group selector marker;

FIG. 42 shows a second selector switching path;

FIGS. 43–45 comprise a schematic diagram of a register junctor;

SYSTEM ORGANIZATION

Figure 1:
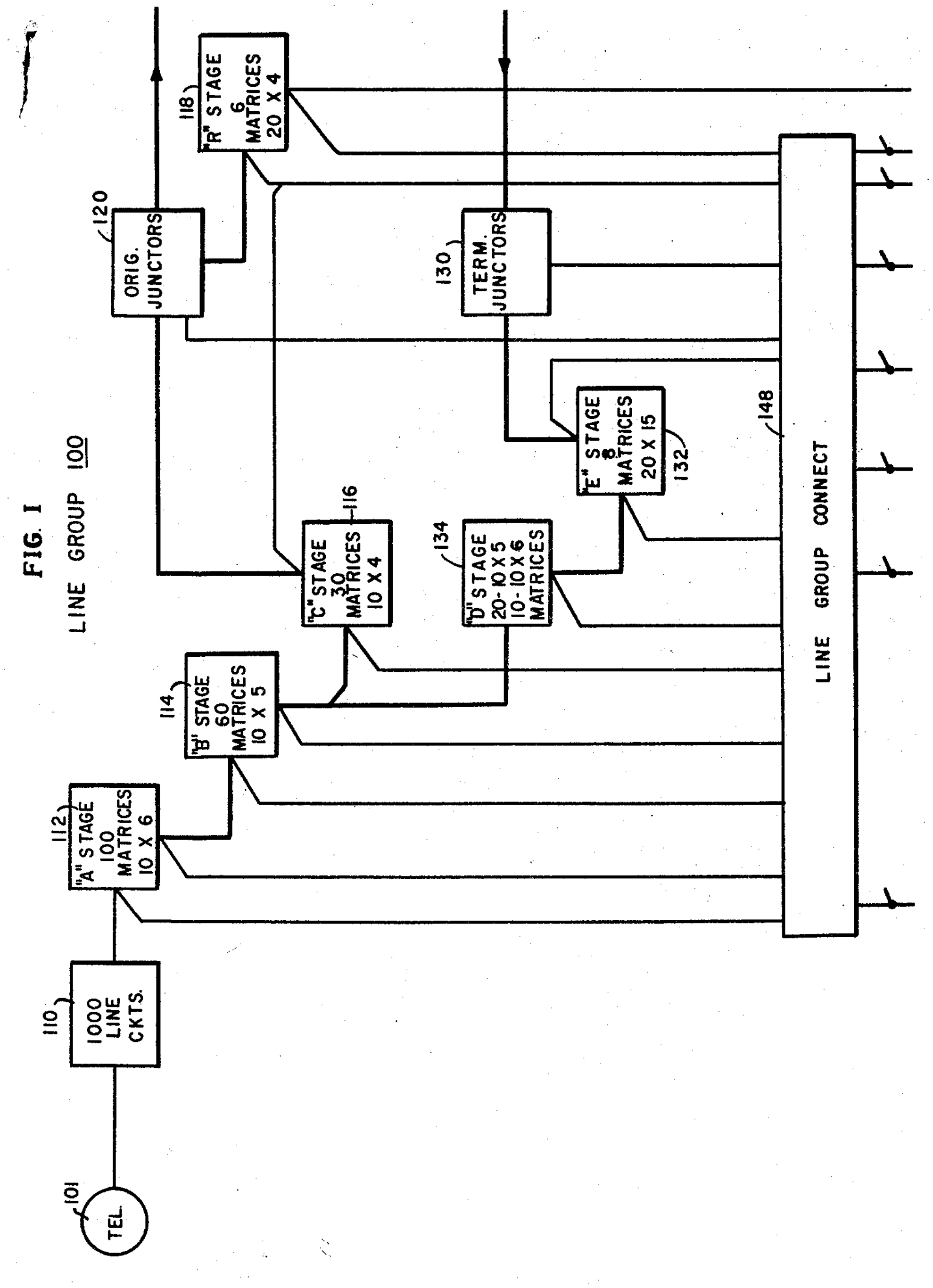
FIGS. 1–7 are to be arranged.
Figure 1A:
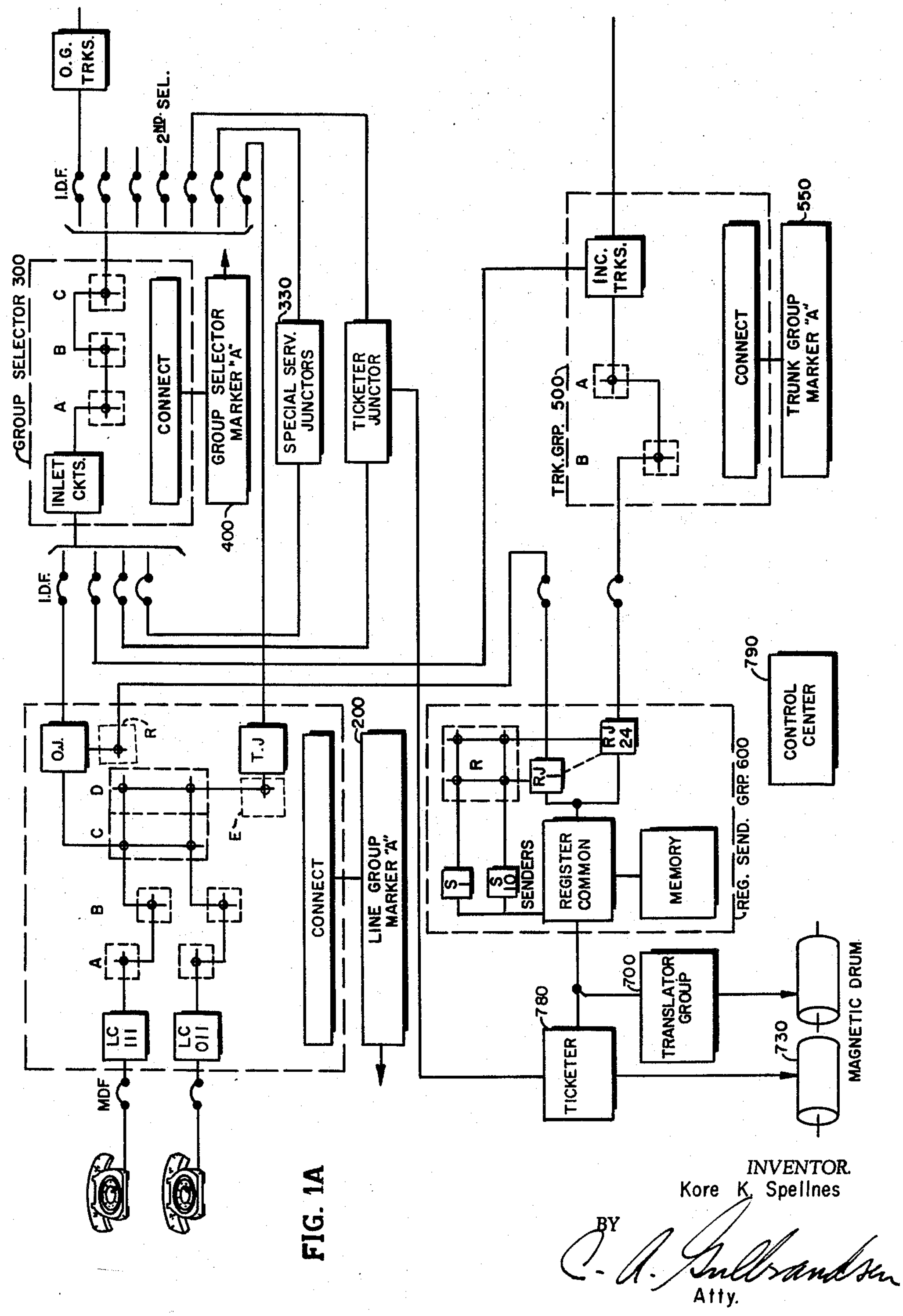

Referring to FIG. 1A, and FIGS. 1–7, the system consists of the line group 100, group selector 300, register-sender group 600, and the translator 700. There is also a trunk group 500 which provides access from incoming trunks to the registers, and a control center 790 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The space division switching elements of the system consist of reed relay matrix assemblies in configurations of 10 x 6, 10 x 5 and 10 x 4. The crosspoints are made up of reed capsules and have normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and crosspoint matrix assemblies the following pending United States patent applications may be referred to:

E. J. Glenner and K. K. Spellnes, Crosspoint Switching Arrays, Serial No. 127,237, filed July 27, 1961.

G. S. Lychyk and A. Taliste, Dry Reed Relays, Serial No. 127,648, filed July 28, 1961, now U.S. Patent No. 3,128,356.

P. K. Gerlach, G. J. David and R. O. Stoehr, Printed Matrix Board Assembly, Serial No. 132,897, filed August 21, 1961.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main office.

The method of signaling between the system groups is accomplished by a technique called di-phase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accomodate 4-wire switching.

The reason for this flexible operation of the system lies in the fact that the register-sender group, in connection with the storage in the translator, has sufficiently built-in features for the above described operation.

AUTOMATIC MAINTENANCE ADMINISTRATION

The control center 790 is designed for the purpose of introducing automation into the maintenance administration of the switchboard. The control console has direct access to all of the stored system program which is written on the magnetic drum. By means of an electric typewriter, this program may be changed by the maintenance personnel to accomplish quickly, for example, subscriber moves, re-routing of calls to intercept, transfer of a call to another line, absent subscriber service, toll restriction, line busy recording, etc. This method of operation has eliminated the need for an IDF and the labor of changing jumper wires.

The electric typewriter contains a tape punch as well as printer and thus provides a copy of the information written on the magnetic drum. In the same manner, quick reference may be made to the subscribers directory number, line terminal number, class-of-service, etc. This information will be displayed on the console in decimal form.

The different routiners indicated under the control console on the block diagram, simulate telephone traffic operation and are controlled by the recorder and analyzer computer. The operation of this equipment is based on preventive maintenance and designed to supply the computer with sufficient information regarding troubled circuitry conditions so that a trouble spot can be localized down to a standard building block.

EASE OF EXPANSION

Since the system will be applied most extensively in expanding existing step-by-step offices, considerable thought has been given to implement such an addition with a minimum of cost and change to the existing facilites. This is one of the reasons why the system is grouped into four functional sections. Each of the system sections are self-contained with regards to its logic circuitry and operates in an asychronized manner with regards to the other system sections, thus making it possible to add each of the other mentioned system sections to an existing step-by-step office and be completely tested before cut into service.

The philosophy of the system goes beyond merely line additions. It is intended to upgrade the existing step-by-step office by providing considerable recording and translation capabilities to meet with future requirements.

Of great importance to the operating companies is the possibility of offering the features available to the system subscribers also to the subscribers located in step-by-step part of the office. This is made possible due to the space division techniques and the system compatibility with electro-mechanical switching requirements. As to the degree of compatibility, in an integrated office such as the one described above, it may be mentioned that a subscriber may move back and forth between the step-by-step and this system without changing the directory number.

TRACING OF A LOCAL CALL

As an introduction to the system operation, a brief description of a typical local call as processed through the system is now presented. The block diagram may be followed for tracing the call. A more detailed explanation of the system operation will be found under discussions of the separate system sections that will follow.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders 671–680 and the originating junctor 120 of the originating line group to the group selector 300. In the group selector 300, the instructions are analyzed by the marker 400, an idle terminating junctor 130 in the terminating line group is located, and a path established to that line group via A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control paths are released for further service while only the talking paths are held through the switching matrices and junctors.

THE LINE GROUP

*Line group matrix*

This section of the system may be thought of as a large switching unit capable of connecting any one of 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages, A, B, and C, make up the outgoing switching stages. Four stages, E, D, B and A, make up the incoming switching stages. The 1000 subscribers lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide by-paths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

The switching stage matrices are made up of crosspoint reed relays, 15,000 for a fully equipped 1000 line group or 15 per line (12 per line for two unit calls per line). The reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve the other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeding electronic scanning operation. Once the supervisory control recognizes a request for service, either terminating or originating, it will process this call from beginning to end, locking out all other calls.

*Operational description*

The line identifier provides a unique identification of one calling line from the group of 1000 lines. In the event of a simultaneous request for service by two or more lines, all lines but one are excluded from the processing. By means of a contact on the line reed relay, the identifier recognizes a request for service and is able to provide a three digit line identification—hundreds, tens and units. Thus, it is possible to uniquely mark one of the one thousand "pull" leads at the inputs to the "A" stage matrices. Reed relays are used for a "tree" configuration to reach the desired "pull" lead after the identity has been made.

Pathfinding consists of establishing an idle route through the A, B, C, and R matrices from the identified calling line to a register. The marker, after the line identity, preselects any idle register located on the outlets of the R matrix. The term "preselect" is used in that the selection is conditional upon whether an idle route exists back to the calling line. Having preselected a register, the marker now has sufficient information to gate all originating junctors and BC links that can be reached from these two end points. The BC links will be marked busy or idle depending on whether they themselves are busy or idle. It now becomes a simple matter to scan these possibilities for an idle route. If no idle path can be found, another register is preselected which then presents other route possibilities. Having found an idle route, all information for completing the connection is available.

When acknowledgment is received from the register after marker information has been outpulsed, a "pull" potential is applied at the C matrix outlet to pull up in series the A, B, C crosspoints to the potential applied by the identifier at the input to the A matrix. Another "pull" potential is applied to the "R" matrix outlet to pull up the "R" crosspoint. This A to C and R pull connection will be held until the cut-off reed relay operates.

At a signal from the register-sender circuitry the line number and line group identity is electronically pulsed out to the register-sender via the link connecting the "R" matrix and the register. Serial sending of information using high speed pulsing is employed.

The register acknowledges receipts of information and returns a command to the originating junctor to ground the C lead. The C lead holds the matrix connections and operates the cut-off reed relay that, in turn, grounds the pull lead. This signal is recognized by the marker, and the supervisory control removes the pull potentials. Rather than clearing out immediately, the marker waits a few milliseconds to see whether the connection is actually good, which means being held via the "C" lead. If all checks out, the marker enters a "clear out" interval where all functioning circuits are permitted to restore to normal before attempting to process other awaiting calls.

A terminating junctor scanner detects terminating calls awaiting service. This scan is the first to be made after a marker cycle has been completed in order to give preference to terminating calls. With identification of one of the 120 terminating junctors requesting service, the transceiver of the marker is switched to the junctor to receive from the sender the called line number identity and ringing frequency.

The address of the called line is gated into that portion of the identifier which has access to the "pull" leads. If the called line is busy, its cut-off reed relay has been operated and the identifier will find the busy ground on the pull lead. If the line is idle, the identifier is positioned at the called line pull lead and ready to apply the pull potential subject to the command of the supervisory control.

This function operates in principle the same as that described for processing originating traffic. Knowing the called line identity and the terminating junctor identity, the marker can analyze all possible routes through the A, B, D, and E matrices between these two end points and select one route that is idle. Application of pull potential awaiting cut-off operation and verification of holding follows as before.

A two-way communication path exists between the marker processing a terminating call and the sender circuit. In addition to receiving the called line number and any special instructions regarding the line, the marker may signal back to the sender any conditions peculiar to the line such as line busy, line idle, link congestion, recycle and send again, and be referred back to the sender for appropriate action.

If on a terminating call, the marker transceiver received a PBX call indication, a PBX selector circuit marks all lines in the PBX group and enables the line identifier to make a sequential test to select the first idle line. A maximum of 200 lines may be allocated within a 1000 line group for PBX service. Assignment of lines to a PBX group does not require consecutive numbering allocation.

THE GROUP SELECTOR

*Group selector matrix*

The intermediate switching functions of the system are performed by a group selector 300. Three stages of crosspoint switches are provided. The first switching stage 312, the A stage, contains 60 cards of 50 crosspoints, each arranged in a 5 x 10 matrix. This switching matrix is associated with the inlet circuit 310 line and cut-off reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. In addition, a second group 317 of 60 switches may be added to expand the outlet capability of 1200 in case of a very large central office. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multi-frequency or dial pulse. In this case, the marker will send back instruction regarding digit changes or a command for the sender to change the type of pulsing. If no change is required, the marker can switch the call through to an alternate trunk without changing the sender's instructions.

Special service junctors 330, shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

*Operational description*

As in the line group, two group selector markers are always provided. Each may be associated with a maximum of five group selector units and is also capable of assuming the load of its companion marker. The principle of call recognition, matrix allotting, matrix connecting, matrix transfer are the same as described for the line group.

In its idle state, the group selector marker is continuously scanning the group selector matrices for new calls. The register-sender group, via an originating junctor or incoming trunk, initiates a demand on a group selector by pulling the inlet line reed relay. When associated with a matrix, the marker finding the inlet demanding service stops its scanning at that point and connects a transceiver to the demanding inlet. The routing digits are sent in high speed code from the sender into the marker transceiver. During this same time, the marker operates connect reed relays to determine the link availability from the demanding inlet in the A stage toward the outlets through the B and C stages. Two routing digits are received by the transceiver in the marker and extended to the trunk selection portion of the marker where connect reed relays gate idle test leads of the selected trunk group into the trunk scanning portion. Within this scanner the link availability is combined with the trunk idle leads such that an idle trunk can appear idle to the scanner only if an appropriate idle link to the inlet exists.

If the trunk scanner finds an idle trunk, it pulls the proper group selector crosspoints, checks to make sure that the selected trunk becomes busy indicating seizure through the group selector crosspoints, and clears its circuits.

If an idle trunk is not found, the marker checks its alternate routing equipment for an alternate. An alternate route causes new connect reed relays to operate in the trunk selector portion and a new trunk scanning operation takes place for the alternate.

THE TRUNK GROUP

*Trunk group matrix*

The trunk group 500 provides access for incoming trunks from outside of the office or for special intraoffice trunks such as operator or wire chief. A trunk group matrix is capable of connecting any one of 75 incoming trunks to any one of sixteen registers on a single output level basis. All trunks in the same group of 75 are either dial pulse (DP) or multi-frequency (MF). Trunk group matrices are added as required to handle large numbers of incoming trunks. Each matrix is independently controlled but outlets are graded to provide sharing of registers.

The trunk group matrix is comparable to the R stage of the line group matrix. The incoming trunk is equipped with loop splitting facilities, and access is provided from a trunk to a register and an additional path is provided from the register-sender to an inlet circuit of the group selector. When the call has reached its destination, the incoming trunk switches through to the established path and the crosspoints of the trunk group matrix associated with this call are released by the register-sender.

The matrix consists of a two stage network of crosspoint switches. The incoming trunks, divided into five groups of fifteen trunks each, appear as inlets to the first stage, the A stage. The A stage has twenty outlets or links (four for each of the five groups) appearing as inlets to the B stage. The B stage has sixteen links to registers. Both stages use a basic arrangement of twenty crosspoint switches in a 4 x 5 matrix unit. Three units are wired together to give the 4 x 15 matrix unit used in the A stage, while four single units make up the B stage.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

*Operation description*

As in the line group, two trunk group markers is continually monitoring the matrices for new calls. After the call is identified, the register junctors are scanned. Link availability information is combined with the scanner output such that an idle register junctor can be selected only if an idle link exists to that junctor.

Before operating the matrix crosspoints, the class-of-service of the trunk is detected. An incoming trunk may be assigned any one of 225 classes-of-service by a simple strapping operation. The class-of-service, trunk group and trunk identity are electronically pulsed out to the register-sender via the link connecting the matrix and the register. High speed serial sending of information is employed.

When the register acknowledges receipt of information, the connection is established through the matrix and held by the register junctor. If all operations are successful, the marker enters a "clear out" interval when all functioning circuits are permitted to restore to normal before attempting to process other awaiting calls. If no registers are available, the "clear out" period is entered immediately.

THE REGISTER-SENDER

The register-sender group 600 is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register goup. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

*Circuit description*

In order to facilitate understanding the following brief description of each of the circuits within the register-sender group is given.

The primary function of the register junctors 601–624 is to provide a buffer between the electronic equipment and the outside plant facilities. As such, the circuit employs reed relays for all switching functions, performing all those functions that require direct connection to the calling line or trunk. These include dial pulse repeating, dial tone control, battery feed for the calling line or trunk, calling station identification on party lines, test for coin deposit, coin refund, and test for coin refund. The circuit also controls the switch train and provides for peg count and traffic metering. Both multi-frequency and dial pulse junctors are used.

The sender circuits 671–680 provide means for transferring information (dialed digits or switching instruction) over the voice transmission path from the register-sender to the office markers or to distant offices. The sender is a universal sender inasmuch as it provides all modes of sending required by the system. Di-phase sending is employed for transmission of switching instructions to the office markers. The di-phase part of the circuit is actually a transceiver since it provides a means of receiving instructions from the markers as well as sending to the markers.

For outgoing calls, the sender provides for both dial pulse and multi-frequency signaling. The circuit operates in conjunction with sender controller 670 which is common to all senders in the register-sender group. The sender controller supplies the sender with the digits to be sent out and indicates the mode of sending to be employed.

The sender circuit is mainly an electronic circuit except for outgoing loop supervisory equipment where reed relays are used.

The register receiver 630 is seized by the register controller 664 and assigned to serve the register junctor on a hold-til-finished basis. The circuit receives either the line number identification generated by the line markers or the trunk number identification generated by the trunk markers. On seizure of the circuit, a diphase link is established to the marker being served. When all the digits have arrived in the register receiver, the information is presented to the register controller for storage in the area of the ferrite core array 660 associated with the register being served. Upon completion of this storage process, the register receiver 630 is released for use by the next register requiring service.

The time division generator 691 generates the time slot pulses, sub-time slot pulses, and control pulses that allow the common equipment to operate in a time division mode.

The time slot pulses create a unique time slot for each of the registers in the group. In association with a group of cores in the core array 660, they allow a true time division multiplex mode of operation.

The sub-time slot pulses allow the use of a folded word type memory; wherein each sub-time slot accesses a section of the information stored in those cores accessed by a particular time slot.

The control pulses allow the controlled generation of decisions while in a particular sub-time slot.

The register controller 664, operating on a time division multiplex basis, controls the progress of each call being processed. Within a particular time slot, this circuit up-dates the information in storage in the section of the core array associated with the time slot register. This up-dating takes place on a sub-time slot basis and is the result of changes in the information presented since the time slot was served last.

All information entering the register-sender group is available to the register controller for proper storage and interpretation.

The memoy read and write control 661 generates the proper current pulses needed to read and write the cores of the ferrite core array.

The ferrite core array 660 is a sequential access, time slot oriented, temporary storage facility. Each register is assigned a group of cores, which only the time slot with which it is associated can access. This group of cores is accessed in sections by the sub-time slots. Each section of the cores stores part of the total available information. The first section contains registration and translation control information. The second contains sender control information. The third and fourth provide for storage of as many as thirteen dialed digits. The fifth contains the line or trunk identity unless a line number translation has been performed. If a line number translation is performed, the calling party's directory number is stored in these cores. The sixth section contains the translated switching digits.

Since each section contains forty cores and each time slot accesses six sections, the total number of cores per register is two hundred and forty. The total ferrite core memory size per register-sender group is 6,600 cores, wherein one complete register storage is reserved for routining and trouble analysis.

The read-shift buffer 662 provides a buffer storage for the memory readout. The read-shift buffer is also utilized to shift information, in a particular sub-time slot, from one core position to another. The read-shift buffer, by temporarily holding the contents of a section of the memory word, provides a means for this information to be transferred to other circuits within the register-sender group.

The carry buffer 663 provides a place where information read from the memory during different sub-time slots can be accumulated until a time is reached, within the time slot, when a decision can be generated on the basis of this information. As a result, by accessing the cores containing the registration and translation control before the time slot is over, an up-dating process is accomplished based on the decisions made during the time slot.

The register transceiver 690 operates as the communication device for information transfer between the register-sender group and the system translators. It, like the register receiver, operates on a hold-until-finished basis. This circuit provides two-way di-phase serial communication between the translators and the register-sender group. The organization of this circuit is such that the transfer of information from the read-shift buffer to the register controller is in a parallel manner. Seizure is dependent on the condition of the control information available in the carry buffer.

The register transceiver 690 is also used to send information to the ticketer 780 via transceiver 781.

The sender controller 670 utilizing information available to it in the read-shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call. These digits are obtained from the read-shift buffer under the control of the register controller. The sender controller circuit operates in a time division mode and thus serves all registers during each system cycle.

The sender assigner 683, on request of the register controller, will connect an idle sender to the register junctor requiring service. The connection established by the assigner is the beginning of the terminating switch train, which will be extended by the system switching stages on information received from the sender. The sender assigner operates on a hold-til-finished basis.

*Operation description*

The register-sender group is a combined local and incoming unit and will handle and process cells of the types of which this local call is one of many possibilities.

Upon removal of the hand set by the calling subscriber, the line marker 200 identifies the line and searches for an idle register junctor. After finding an idle register junctor, the line marker determines if a path can be established from the calling line to that register junctor. If so, the line marker extends a call signal through the register junctor and into the register. This signal is recognized by the register controller during the time slot permanently associated with the register junctor requesting service.

This request for service command causes the register receiver to be attached to the register junctor as soon as it is available. Once the register receiver is seized, a "GO" command is extended to the line marker awaiting service. The line marker then forwards the line identity to the register receiver for storage in the register's core storage area.

As soon as the line identity information is successfully stored, the register receiver is released and a hold signal is sent to the register junctor. This signal causes a release of the line marker and the extension of dial tone to the calling subscriber.

The subscriber dialed digits are repeated by the register junctor on to the time division multiplex "pulse highway." As each pulse is recognized by the register controller, it causes the dialed digit storage information, associated with the register, to be up-dated. As the digits accumulate, they are stored and shifted to their proper location within the register's storage area.

As soon as the first three dialed digits have arrived, a request for the register transceiver 690 is generated and the process digits are coded. The series of digits, called the processing digits, that are contained in the registration and translation control storage area, are given the binary coded decimal values that initiates the translation operation.

This preliminary coding of the process digits will be used by the system translators to select the proper mode of translation. It should be noted that from this point on, in the processing of the call, the register controller will never generate any further coding of the process digits. Each time the system translators return information to the register-sender group, the process digits will also be returned. The register controller, on the basis of changes made in the binary coding of the process digits by the translators, will proceed to the next step in the handling of the call. The register controller is organized in a manner that allows it to obey any of the possible instructions and sequence commands inherent in the process digits.

Since a request for the register transceiver has been written, this unit will be seized as soon as it is available. The three dialed digits, the class of service digits, the process digits, will all be loaded in a parallel manner into the register transceiver, from the read-shift buffer. The register transceiver requests the service of an idle system translator and as soon as one is attached transmits this information, via a di-phase link, to the translator. For the local call being made the translator will upgrade the process digits and return them to the register transceiver. They are then forwarded to the register controller for storage and the register transceiver is released. In this particular instance they will cause the register controller to wait. They will contain the address of the system translator that must be accessed in order to locate the directory number of the particular local subscriber being called. Since both number group and code translations are located on the same drum, the process digits will indicate that a number group translation is to be performed. The register transceiver as soon as it is seized will receive the seven digits of the called directory number, the class of service of the originating line, and the process digits. The system translator, upon receiving this information, will in this instance, locate the proper switching digits and sender instruction digits. This information in addition to an upgraded set of process digits will be returned to the register transceiver. The information in the register transceiver is forwarded to the register controller for storage. As soon as storage is accomplished, the register transceiver is released for use by any other register requiring service.

The register controller, re-acting to the new coding of the processing digits will, in this instance, cause a request for the sender assigner. As soon as the sender assigner is seized, it will assign an idle sender to the register junctor requiring service. With the sender attached, the sender instruction digits that have been stored with the switching digits now come into play. The sender sequence state control, accessed by the second sub-time slot of the register being served, now forwards the sender control instructions to the sender controller. The sender controller, utilizing the sender control information, forwards the switching digits to the sender. The sender transmits this translated switching information to the proper markers. Two-way communication exists between the system markers and the senders, therefore, the action of the sender will be dependent upon the instructions returned from the markers. The instructions which the markers are arranged to send to the sender include line idle, line busy, trunk busy, resend and trunk identity for ticketing. If line idle is encountered, the signal is repeated to the register junctor which signals the originating junctor to switch through the signals and releases the sender.

The recognition of a sender release signal, by the register controller causes the register controller to extend a disconnect signal to the register junctor and returns the register's storage area to the idle condition.

If a line busy or trunk busy is encountered by the system markers, the disconnect sequence is the same as for the line idle, but in addition, the busy signal is extended to the originating end.

If the resend signal is returned to the sender, the sender will release the terminating switch train and the register controller will cause the initial send state to be introduced. A second attempt to establish the call will then be made. Only one resend signal will be obeyed. If a second resend signal is received, trunk busy will be returned to the calling subscriber.

THE TRANSLATOR

The translators 700 of the system provide semi-permanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office.

Each translator can be accessed from twenty register-sender groups and a supervisory console on a one-at-a-time basis. Four basic types of translations are processed.

(1) Directory Number Translations (DNT): The directory number of the called party is translated into switching instructions to enable the register-sender to direct the routing of the call to its destination. The switching instructions contain the equipment location of the called telephone line and the party ringing instructions.

(2) Line Number Translation (LNT): The calling party's line identification is translated into the calling party's directory number. The line number translations provide automatic number identification (ANI) for all one and two party lines.

(3) Code Translations: The called area, office, or special service code is translated into switching instructions. The translation capabilities required of control switching point (CSP) in the direct distance dialing (DDD) network are provided.

(4) Special Features: Special switching instructions are generated to provide such features as home extension intercom, repertory dialing, automatic call transfer, and other special features.

Information storage is provided by magnetic drums on the basis of one drum per translator. Memory words are recorded on the drum surface from a supervisory console, by simply typing the memory word and appropriate memory address at the console typewriter. This directory number and/or code translation can be added or existing translations altered with a minimum of maintenance effort.

Each drum provides 600,000 bits of information storage. Information is represented in digital form using a four bit binary coding. The magnetic drum is 10 inches in diameter and provided with 150 tracks. Each track stores 4000 bits with a packing density of approximately 130 bits per inch. The drum rotates at 1800 r.p.m. and provides an average access time of approximately 16 milliseconds. The basic time interval of 8.1 microseconds for the system logic is derived from recorded clock tracks. The recording technique employed is return-to-zero (RZ). Reading and writing functions are performed by one fixed read and write head per track. Adjustable register heads are provided for the clock tracks.

Memory words are recorded in parallel along the axis of the drum. Each memory word consists of 40 bits, thus occupying one bit in each of 40 tracks. Three segments along the drum axis with each segment made up of 40 tracks provides storage for 12,000 memory words. The memory words are addressed consecutively around the drum circumference with the first 4000 addresses located in segment one, the second 4000 addresses in segment two, and the third 4000 addresses in segment three.

The drum access circuitry, consisting of read and write amplifiers, all transistorized, are mounted on printed circuit cards in close proximity to the magnetic heads. All logic operations are accomplished through the use of transistorized standard circuits, with a small number of special circuits for pulse generation, shaping, distribution, and buffering.

*Circuit description*

Memory address and pulse generator provide a sequential count of the units, tens, hundreds and thousands digit of the calling and called subscriber along with the various timing pulses, strobe pulses, and write pulses to be used in the system.

The memory readout circuit provides drum segment selection for the read operation and gates information into a buffer circuit for distribution to other circuits.

Memory record circuit provides drum segment selection for the write operation obtaining the information to be placed on the drum directly from the access register.

A means for identifying and connecting a register-sender group or the control console to an idle translator is provided for by the register identifier circuit.

The readout processor provides the control needed for proper transfer of the translated information read from the permanent memory, and the means for processing this information prior to its return to the register-sender group.

The transceiver circuit provides a means of communication between the translator and the register-sender, or the console. Also, it provides a temporary storage for the incoming and outgoing information during the process of translation.

Based on incoming information, the process controller circuit selects a given translation (directory numbers, line numbers, code) and generates logic commands to control the sequential process of all circuits involved in the given translation.

The address comparator circuit provides indication of coincidence between the incoming information and the address of the permanent memory. Upon acknowledgment of the coincidence, respective information is read out from the permanent storage.

*Operational description*

The translators, by means of the register identifier circuit, continuously scan over the call signal leads from the register-sender groups hunting for a call sign. When a call signal from a register sender is encountered, the register identifier stops on this point in the scan and signals this register-sender that the translator is ready to receive.

Because of the large number of digits involved, high speed di-phase serial transfer of information between the register-sender and translator is employed. Within the translator itself, however, parallel transfer of information is employed.

The information subsequently sent from this register-sender is stored in the transceiver circuit. In order to perform a translation, a coincidence is sought between the address portion of the information stored in the transceiver and memory addresses sequentially appearing in the address comparator circuit as a result of memory address readout. Upon coincidence, the readout of the information located at this address (processing digits and switching instruction, line number or directory number) is loaded into the readout processor. Here this information is analyzed and if necessary modified before it is transferred to the transceiver for return to the register-sender. Upon return of the translation information to this register-sender, the translator again begins scanning the call signal leads for other register-sender group call signals.

The information received from a register-sender for translation includes a memory address and information concerning the format of the address.

The translator determines from the information received the type of translation required whether the memory address readout should be a memory address count or a memory address word. If the memory address readout should be a memory address count, each sequential count of the drum address counter is loaded into the address comparator for coincidence check. If the memory address readout should be a memory word, each memory word as they appear sequentially in the memory readout circuit is loaded into the address comparator for a coincidence check.

Since all memory words are not memory addresses and since a minimum of restrictions in the digital composition of an address is desired, an appropriate digit (E) is added to each memory word during the programming of the memory. This digit uniquely identifies the memory address words and further indicates the type of translation to which this address is assigned.

To guard against false coincidence during memory scanning, the same unique values of the digit "E" for the various type of translations are generated by the process controller. On a given translation, coincidence can be found only among those memory words containing a corresponding value of digit "E." Additional use is made of the readout of digit "E" to indicate the proper loading pattern to be used in loading, from the memory readout into the readout processor, the translated information associated with a memory address.

Memory words are assigned a maximum length of 40 bits. However, the number of bits in a memory address is an independent variable based on the numbering plan. Fifteen variations in memory address format are provided. The appropriate format against which coincidence is sought in the address comparator is determined by the process controller from an analysis of the information stored in the transceiver.

The translator performs the following translations, code translations, directory number translations and line number translations.

*Code translations*

The code translations are divided into two operations, initial translation, and final translation.

Initial translation consists primarily of three digit area, office, or service code translations. The first phase of such a translation is the determination if the three subscriber dialed digits stored in the translator access register constitute an unassigned code and therefore should be intercepted.

To accomplish this the values of the count from 0000 to 0999 of the drum address counter are considered. The various combinations of hundreds (H), tens (T) and units (U) digits of this count represent all possible three digit codes. In the memory word addressed by this count, if the HTU of the count corresponds to an unassigned code, the digit "W" having the value eight or larger would have been written during the memory programming. On the first phase of the initial translation, coincidence is sought between the drum address count (HTU only) stored in the address comparator and the memory address stored in the transceiver. If the coincidence is found during the first (TH) thousand count and the decoded value of the "W" in the readout is equal to eight or larger the call is intercepted. If an intercept translation is not obtained in phase 1, the translation proceeds to phase 2.

The second phase is the determination if a given code is a foreign area code or home office code that should be routed via the final route to the home office. As in phase 1, coincidence between the drum address counter of the memory address circuit and the transceiver is sought. However, now the coincidence in the second thousand count occurs and the decoded value of "W" is eight or larger, the final route flip-flop is set. The switching instructions pertaining to the final route are readout when the final route flip-flop is set and the correct value of "E" is decoded. This switching instruction is transferred to the transceiver through the readout processor and is sent to the register-sender. If a final route translation is not indicated, the translation proceeds to phase 3.

The third phase of the initial translation, the three digits are checked for coincidence against the address comparator which now displays memory address words transferred from the memory readout (the drum address counter is not used in this phase). This part of the translation will determine if the received code is a local office code, a home area office code, or an adjacent office area code. In the first case a given drum address and a request for directory number translation will be readout and forwarded to the register-sender. In the second case, switching instructions will be readout. In the third case, the three digits received are not sufficient to determine a given route; therefore, a request for an additional three digits to form a six digit translation is forwarded to the register-sender.

In all the cases the translated information is loaded into the readout processor from the memory readout only after coincidence is found and the proper value of "E" is decoded. The switching information is transferred to the transceiver for the readout processor and is sent to the register-sender.

Final translation consists of adjacent area and office code translation (six digit translation), repertory dialing where two digits code and the calling party line numbers are written on the drum, and other codes for which initial translation is not required.

In this translation, the memory readout is read in the address comparator and the coincidence between the transceiver and the address comparator is sought. Upon coincidence the parity flip-flop is set. The switching instruction pertaining to this translation are readout upon the first appearance of the proper decoded value of "E" following the setting of the parity flip-flop. Readout instruction with certain value of "E" after coincidence has been found permits us to write many codes in sequential groups followed by a single switching instruction pertaining to that group. This accumulative method used in initial as well as in final translation avoids repetitive writing of switching instructions.

*Directory number translation*

When the register-sender requests a directory number translation, the drum address counter is read in the address comparator. The coincidence between the directory number stored in the transceiver and the comparator is sought. Upon coincidence, the line number from the appropriate drum segment selected by decoding of the thousand digit of the dialed directory number is transferred to the transceiver via the readout processor. This information is then sent to the register-sender. To every memory word which corresponds to a given directory number the value $E=0$ has been assigned. If for any reason that number must be intercepted, the value of "E" is changed to be equal to eight or larger. When the value of "E" equals eight is decoded and a directory number translation was requested, the call is intercepted.

*Line number translation*

When the register-sender requests line number translation, the line number portion of each memory word (CDHTUPO) and the "E" digits are read into the comparator. The class of service digits (KY) of this memory word and the memory address appearing in drum address counter are transferred to the readout processor. Upon coincidence, the directory number and class of service digits stored in the processor at that time are selected for transfer to the transceiver for subsequent sending to the register-sender.

LINE GROUP AND MARKER-DETAILED DESCRIPTION

Figure 48:
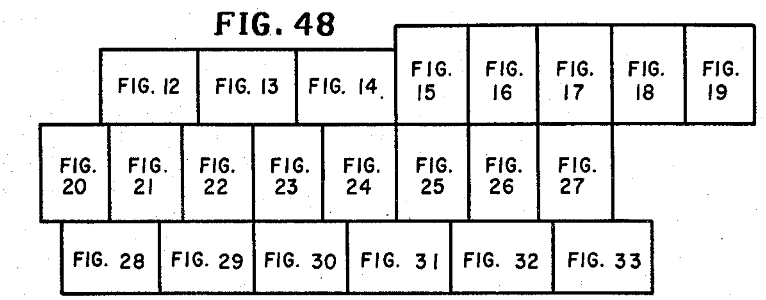
FIG. 48 shows how

FIGS. 12–33 when arranged as shown in FIG. 48 comprise a schematic and block diagram of a line group and line group marker. The line circuits, switching matrices, and junctors are shown in FIGS. 12–19; with the line circuits and A matrices on FIG. 12, the B matrices on FIG. 13, the C and D matrices on FIG. 14, the originating junctor, and the E matrix on FIG. 15, the R matrix on FIG. 16, and the terminating junctor on the FIGS. 17–19. The line group connect circuit 148 is shown in FIGS. 20–27. The marker 200 is shown in FIGS. 28–33, with the line control 260 shown in FIGS. 28–29, the path control 270 in FIGS. 30–33, and the send receive circuit 280 on the right hand side of FIG. 33.

Figure 47:
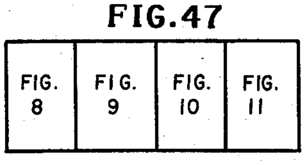
FIG. 47 shows how

FIGS. 8–11 when arranged as shown in FIG. 47 show the arrangement and interconnection of the switching matrices and junctors in a line group.

The subscriber lines are connected on the horizontal inputs of the A matrices, such that ten lines are connected at each A matrix. Therefore ten A matrices are provided for a group of 100 lines. Also for each hundreds group, six B matrices are provided, each B matrix having one input connected to each A matrix. Common to the ten hundreds group or one thousand lines of a line group, there are thirty C matrices, and thirty corresponding D matrices. The connections are such that each C matrix and its corresponding D matrix has its ten inputs connected to the ten different hundreds groups, in such way that in each hundreds group they go to the same input of the same D matrix. Thus since there are six B matrices per hundreds group, the matrices C7 and D7 are connected to the same B matrices as matrices C1 and D1. The verticals of the C matrices are connected to respective originating junctors, with originating junctors OJ1–OJ30 connected to the respective first verticals of the C matrices, originating junctors OJ61–OJ90 connected to the third verticals of the respective C matrices, and originating junctors OJ91–OJ120 connected respectively to the fourth verticals of the C matrices.

The originating junctors each have one output connection to the IDF for connection to the inlets of the group selectors, and another connection to the R matrices. Originating junctors 1–20 are connected to the respective horizontals of matrix R1, originating junctors OJ21–OJ40 are connected to the horizontals of matrix R2, continuing up to matrix R6 which has its horizontals connected to originating junctors OJ101–OJ120. There are four vertical links from each R matrix, or a total of twenty-four, which are connected to the IDF for connection to the register junctors in the register sender group 600. The register junctors in each register sender group are connected to the R matrix verticals of several different line groups.

The E matrices each have twenty horizontal links connected respectively to twenty different D matrices, with matrix E1 connected to D matrices D1–D20, matrix E2 having its first ten horizontals connected to D matrices D21–D30, and its second ten horizontals connected to matrices D1–D10. Matrix E3 has its twenty horizontals connected to D matrices D11–D30. Matrices E4 to E8 are similarly connected to other links of the D matrices. The verticals of the D matrices, fifteen from each matrix, are connected to the terminating junctors.

All of the matrices are designated by reference characters in which an initial letter designates the switching stage. In the A and B stages the letter is followed by two numbers. The first number indicating the hundreds group and the second letter indicating the matrix within the hundred groups. Thus in hundreds group one there are ten A matrices A11–A10 and six B matrices B11–B16. These A and B stages are interconnected by links designated by the letters AB followed by three numbers, in which the first number indicates the hundreds group; the second number indicates the A matrix in the hundreds group and the third number indicates the B matrix in the hundreds group to which the link is connected. Thus link AB111 of the first hundreds group connects card A11 to card B11. The lines from the line circuits to the inputs of the A stage are designated by the letter L followed by three digits, with the first number indicating the hundreds group, the second number indicating the A matrix within the hundreds group and the third number indicating the input of the A matrix. Thus lines L111–L110 are connected to the ten inputs of matrix card A11. In the C stage the matrix cards are designated C1–C30, and in the D stage the corresponding D matrices are designated D1–D30. The links interconnecting the B stages to the C and D stages are designated by the letters BC followed by three numbers. The first number indicates the hundreds group of the B matrix and the last two numbers indicate the C and D matrix, with a zero inserted as the center number for connections to cards C1–C9 and D1–D9.

The links interconnecting the D and E stages are designated by the letters DE followed by three numbers. The first number indicating the D matrix with a zero preceding the matrix number for the matrices D1–D9, and the last number indicating the D matrix.

The schematic diagrams of FIGS. 12–16 show part of a matrix card for each of these stages and also a line circuit and an originating junctor. An additional line circuit and an additional matrix for the A and B stages is shown in block form. Each matrix comprises a plurality of horizontal links and a plurality of vertical links interconnected by crosspoint switches. Each link comprises four conductors, tip T, ring R, control C, and pull P. The tip and ring conductors provide an extension of the subscribers loop for a talking path, the pull conductor is used to operate the crosspoints, and the control conductor is used to hold the crosspoints in a selected path. Between each hrizontal link and each vertical link of a matrix card there is a crosspoint switch comprising three make contacts in three capsules, two windings, and a diode. For example in matrix card A11 the crosspoint switch between horizontal link L111 and vertical link AB111 comprises the contacts 1205 and 1206 in the tip and ring conductors respectively, contacts 1207 in series with hold winding 1203 in the control conductor, and the pull winding 1202 in series with a diode 1201 in the pull conductor. To establish an originating path after the marker has selected the route, an operate circuit is established on the pull conductor through the three stages in series, through one crosspoint switch in each stage, to operate the crosspoints, then a hold path is established on the C conductor through the three crosspoints to hold the connection. For example if a path is to be established from line circuit LC111 to originating junctor OJ1 negative potential is applied to the lead L111P and ground is applied to a relay tree in the marker to the P conductor of the vertical link V1 of matrix C1. This causes current to flow in the path through diode 1201 and winding 1202 of matrix A11, to diode 1301 and the winding 1302 of matrix B11 and through diode 1401 and winding 1402 of matrix C1, causing the three crosspoint switches to operate in series. The diodes block current flow through undesired paths through other pull windings of each card. To hold the path ground is applied from other circuits to the C conductor of the vertical linkV1 which extends through the hold windings and their series contacts of the three crosspoint switches and cutoff relay 12CO of line circuit LC111 to negative battery potential.

The line circuit LC111 comprises a line relay 12L having two windings and a single make contact, and a cutoff relay 12CO having a winding, two break contacts 1 and 2 and a make contact 3. The tip and ring conductors L111P and L111R of line L111, which are connected to the subscriber's loop, are also connected to the break contacts 1 and 2 of the cutoff relay 12CO through the windings of the line relay 12L to ground and negative battery respectively. The conductor L111C is connected through the winding of the cutoff relay 12CO to negative battery. The conductor L111P is connected through the make contact of relay 12L and a 5600 ohm resistor 1211 to conductor LR1 to the marker; and also through the make contacts 3 of the cutoff relay 12CO and a diode 1212 to conductor BC0 to the marker. The conductors LR1 and BC0 are multiplied to all of the one thousand line circuits of the group. There is also a connection from the cutoff relay by an individual conductor WC111 to the marker, for wire chief use.

The originating junctor (FIG. 15) provides connections from the originating path from the C matrices by a line OJ1A through the junctor and line OJ1B and the R matrix to a register junctor, and line OJ1C to the IDF for access to an inlet circuit of the group selector. The transmission path (conductors T and R) from the C matrix to the group selector is split in the originating junctor. The incoming path is connected to the register by leads TR and RR; and the outgoing path by conductors TS and RS to the sender. The contacts of relay 15JA provide the split. Switching through of the connection from line OJ1A to line OJ1C is accomplished by operating relay 15JB under control of the register via lead ECR, which in turn causes the operation of relay 15JA.

Holding of the preceding switch train by ground on the lead C of line OJIA is under control of the register junctor via lead CR to relay 15JA before cut through; and under control of the group selector via lead C in line OJ1C to relay 15JA after cut through. The R matrix is released after cut through.

If a link busy condition is encountered, relay 15BT is operated by the register junctor via lead BY to return link busy tone (120 i.p.m.). Relay 15BT remains operated under control of the calling group. No cut through occurs under this condition.

Figure 17:
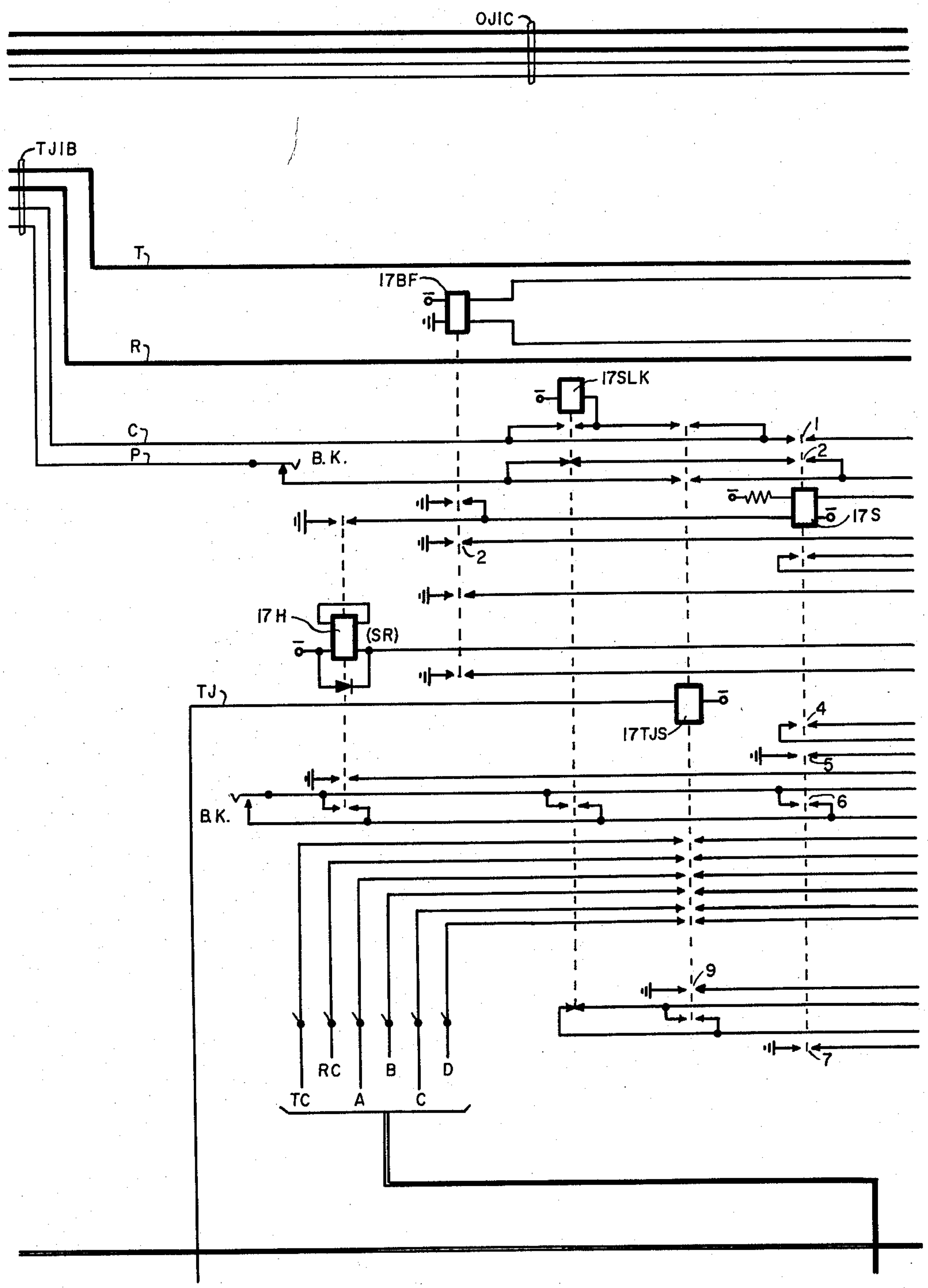
Figure 18:
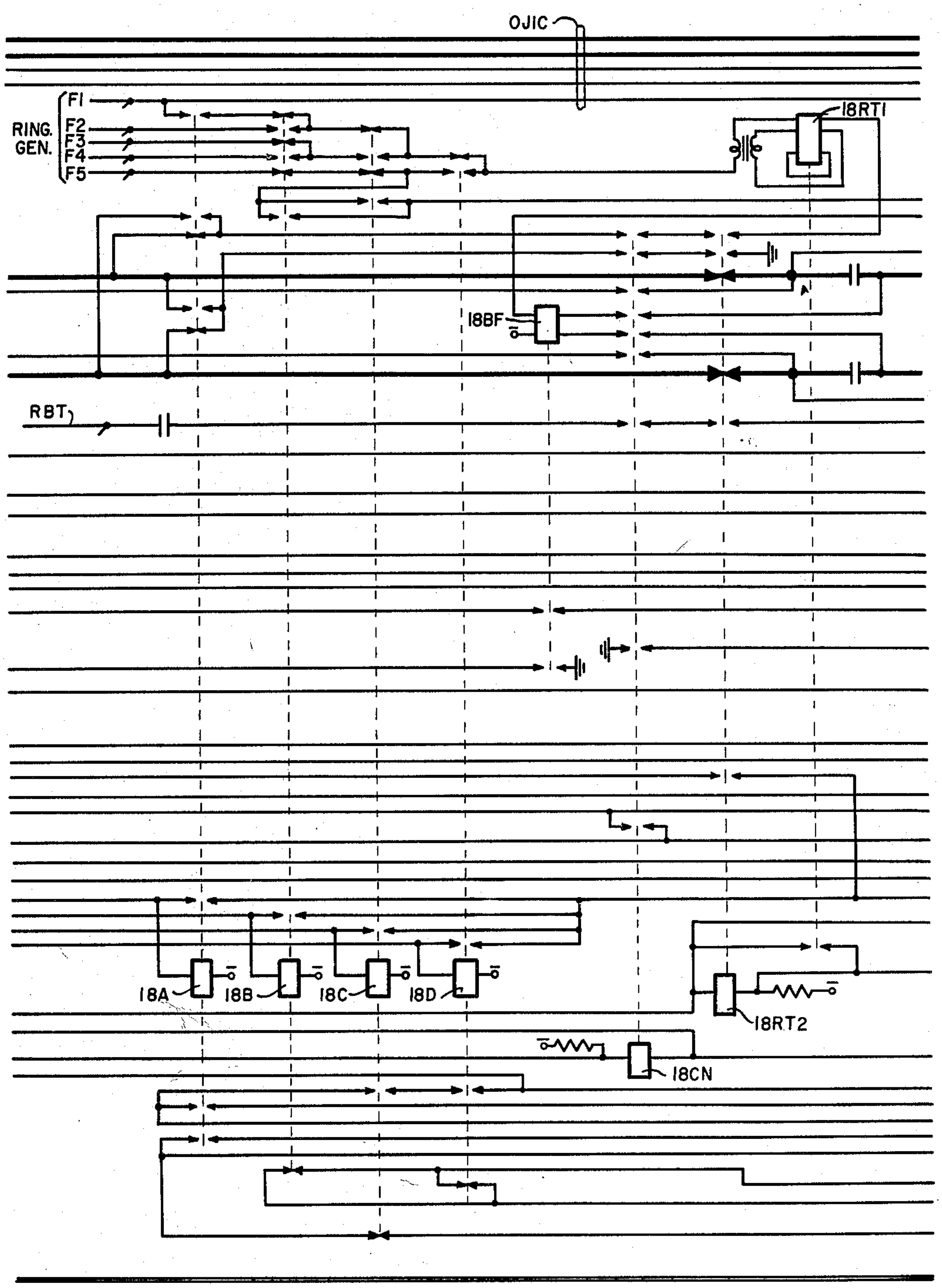
Figure 19:
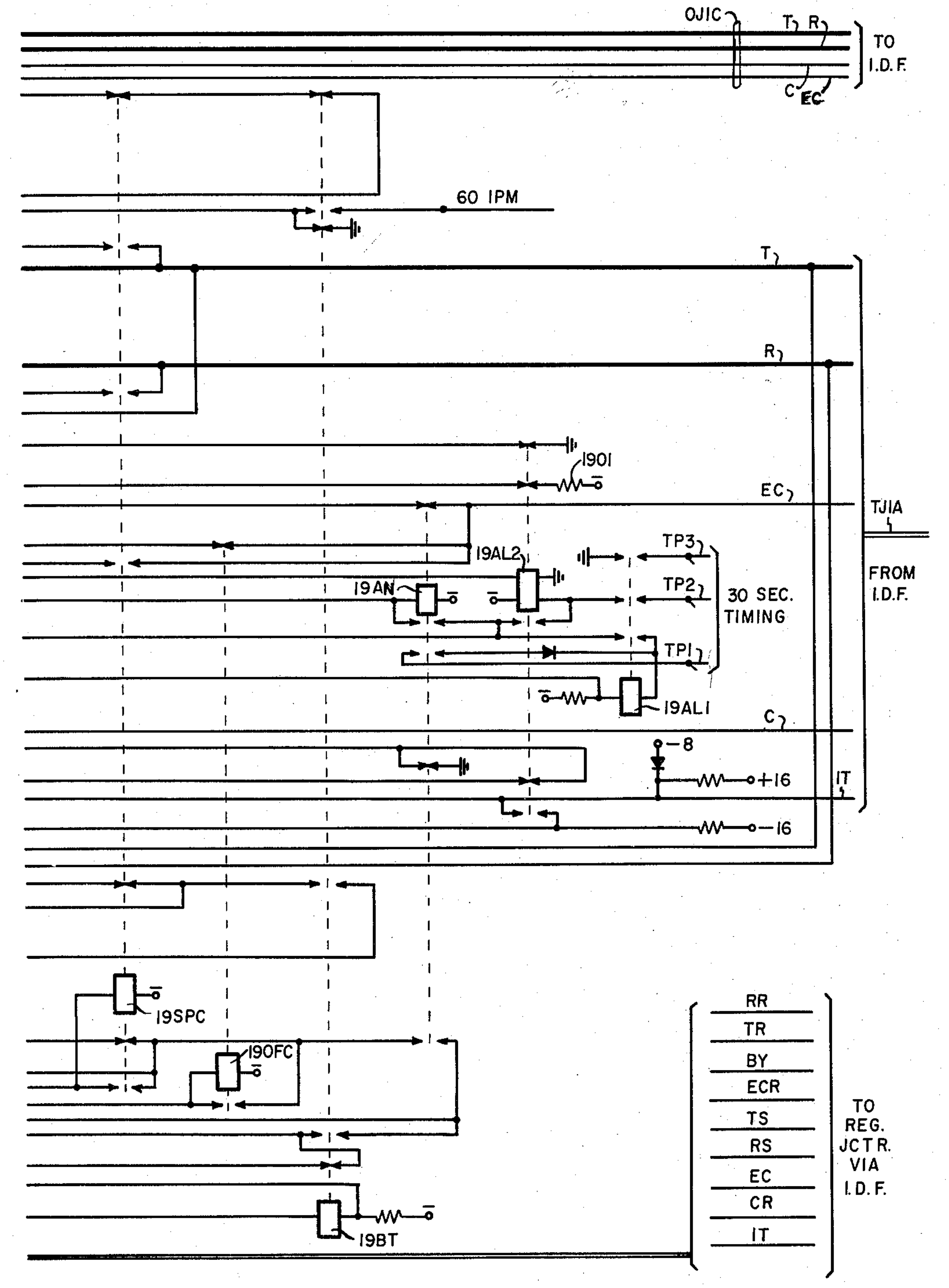

The terminating junctor TJ1 is shown by a schematic diagram in FIGS. 17, 18 and 19. It provides access from a group selector outlet, via the IDF and line TJ1A through the junctor to line TJ1B and thence through matrices E, D, B and A to a called line.

Battery feed is provided to the calling line by relay 18BF, and to the called party by relay 19BF.

Busy-idle indication is provided on lead IT of line TJ1A for use by a parallel test circuit in the group selector marker.

Relay 17TJS when operated provides a path from the T0 and R0 conductors of line TJ1A to conductors TC and RC of line TJC, which completes a path from the sender over the transmission path to the send receive circuit in the marker. This relay is operated under the control of the marker by a signal on lead TJ. Relay 17TJS also completes a path for the ringing code signals from the send receive circuit on conductors A, B, C and D of line TJC to the ringing control relays 18A, 18B, 18C, and 18D.

The junctor is seized by ground forwarded via lead EC0 of line TJ1A to operate relay 17S. This relay through its contacts 4 completes a path to ground to hold the preceding switch train, and through its contacts 1 completes a path to ground to hold the succeeding switch train.

Operation of one or more of the relays 18A, 18B, 18C and 18D, applies one of five different ringing frequencies to either lead T or lead R to provide fully selective five-party bridged or ten-party divided ringing, in accordance with the binary code received on leads A, B, C and D as shown in the following table.

| A | B | C | D | Gen. Connection | Ringing Frequency |
|---|---|---|---|---|---|
| 0 | 1 | 0 | 1 | T | F1 |
| 1 | 0 | 0 | 0 | R | F1 |
| 0 | 1 | 0 | 0 | T | F2 |
| 1 | 1 | 0 | 0 | R | F2 |
| 0 | 0 | 1 | 0 | T | F3 |
| 1 | 0 | 1 | 0 | R | F3 |
| 0 | 1 | 1 | 0 | T | F4 |
| 1 | 1 | 1 | 0 | R | F4 |
| 0 | 0 | 0 | 1 | T | F5 |
| 1 | 0 | 0 | 1 | R | F5 |
| 0 | X | 1 | 1 | T | F1 |
| SPECIAL FUNCTIONS | | | | | |
| 1 | 1 | 0 | 1 | Return line busy (60 i.p.m.) | |
| 0 | X | 1 | 1 | No. ans. supy. (OFC operates) | |
| 1 | X | 1 | 1 | No ans. supy. or ringing (OFC) and metallic cut-thru (SPC operates) | |

Ringback tone from the source on lead RBT is supplied to the calling party during ringing. Busy tone from the 60 i.p.m. source is supplied to the calling party when the proper binary code as shown in the table is received from the marker to operate relay 19BT.

In response to answer supervision ring trip relay 18RT1 operates and at its single make contacts shorts the winding of relay 18RT2, which connects the called party to the voice transmission path. Relay 19BF then operates, and at its contacts 2 applies ground which extends through break contacts of relay 190FC to lead EC0 of line TJ1A to repeat answer supervision to the preceding switch train.

In response to one of the codes as shown in the table, relays 19SPC and 190FC operate to provide a metallic path (T and R) free of attachments and inhibits ringing and answer supervision for vertification, wire chief, and routiner calls. In response to another code, relay 190FC operates to inhibit answer supervision on calls to official numbers, such as the telephone company business office.

Release of the succeeding switch train may be controlled by a routiner. Opening lead EC0 releases the succeeding switch train but holds the terminating junctor seized. The terminating junctor is released when negative battery potential is applied to lead EC0.

Release of the preceding switching train is delayed approximately 135 milliseconds after the calling party releases to protect against unintentional interruption of the calling loop.

Timed disconnect of the preceding switch train and the terminating junctor 30 seconds after the called party disconnects is provided.

An arrangement is provided to permit the called party to hold the succeeding switch train and the terminating junctor.

The line group connect circuit 148 is shown by schematic drawings in FIGS. 20–27. The line group marker 200 is shown by a schematic and block diagram in FIGS. 28–33. For convenience in the drawing, relays are shown having a large number of contacts although in the physical embodiment of this system the reed relay assemblies have been limited to ten contacts, and additional contacts are obtained by using parallel and slave connected reed relays. A relay driver device shown symbolically in the drawings by a triangle with a line across it and associated make contact, comprises a single transistor amplifier with a winding in its collector circuit and the single contact which is a reed capsule operated by the winding.

Figure 30:
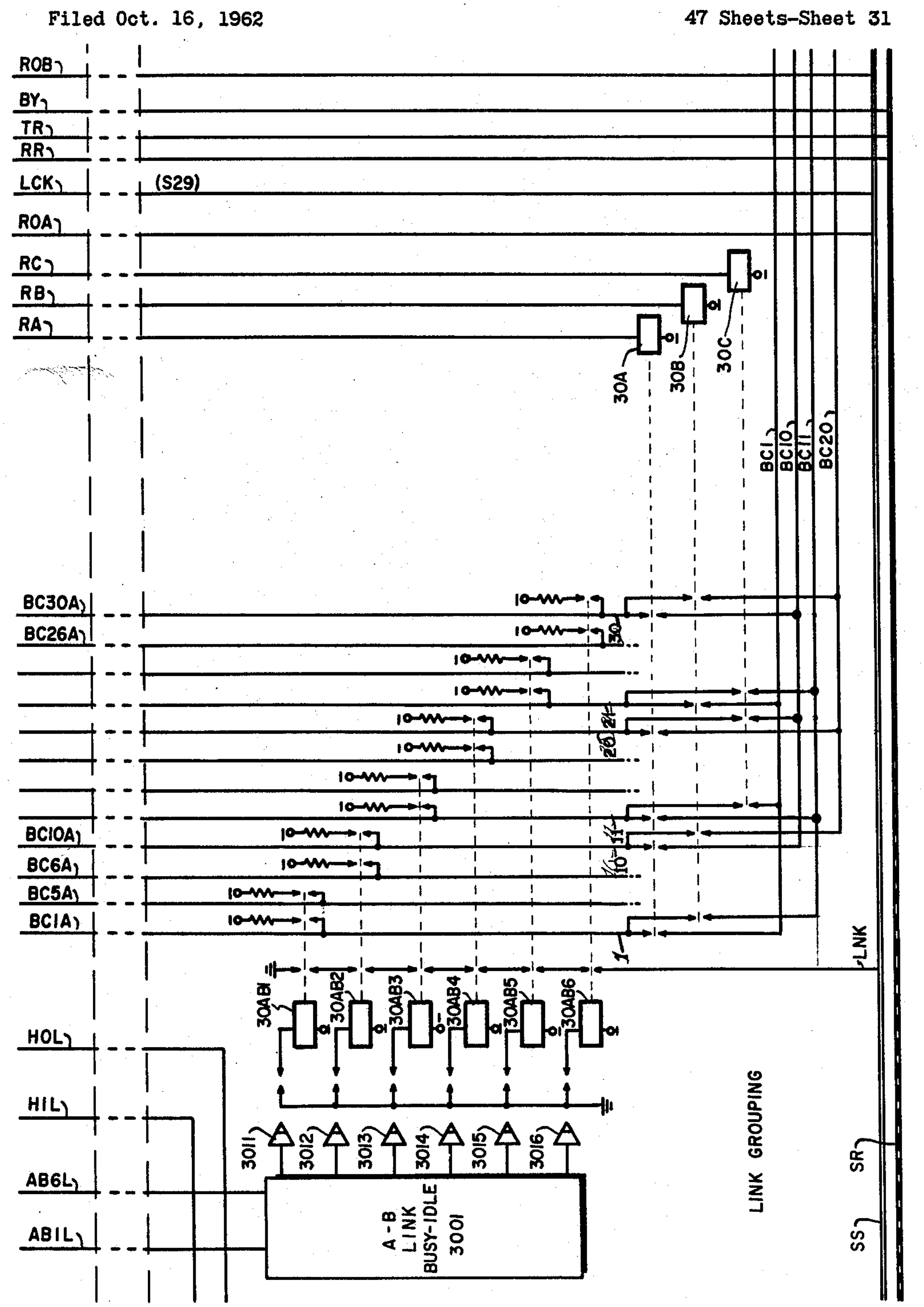
Figure 31:
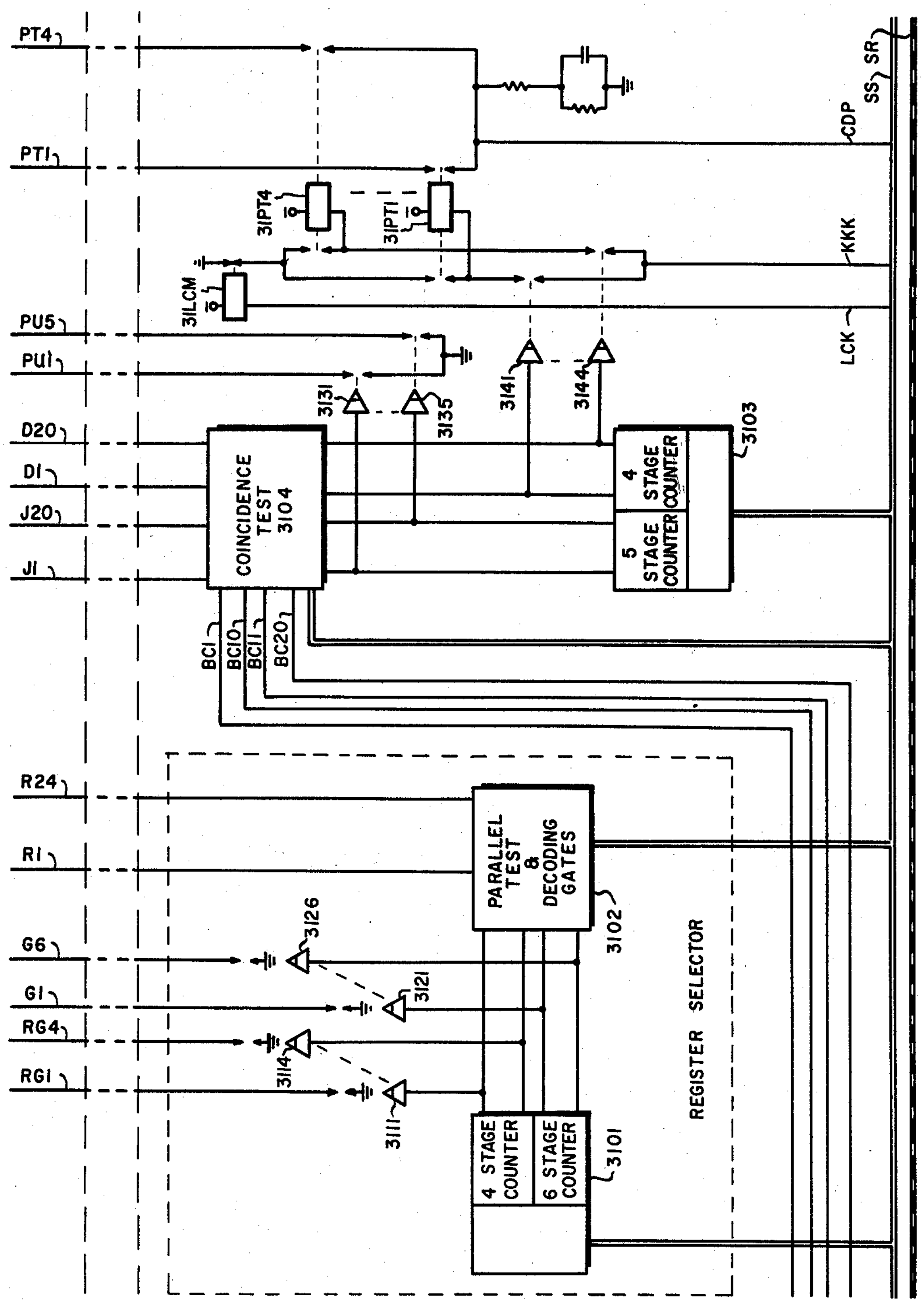
Figure 32:
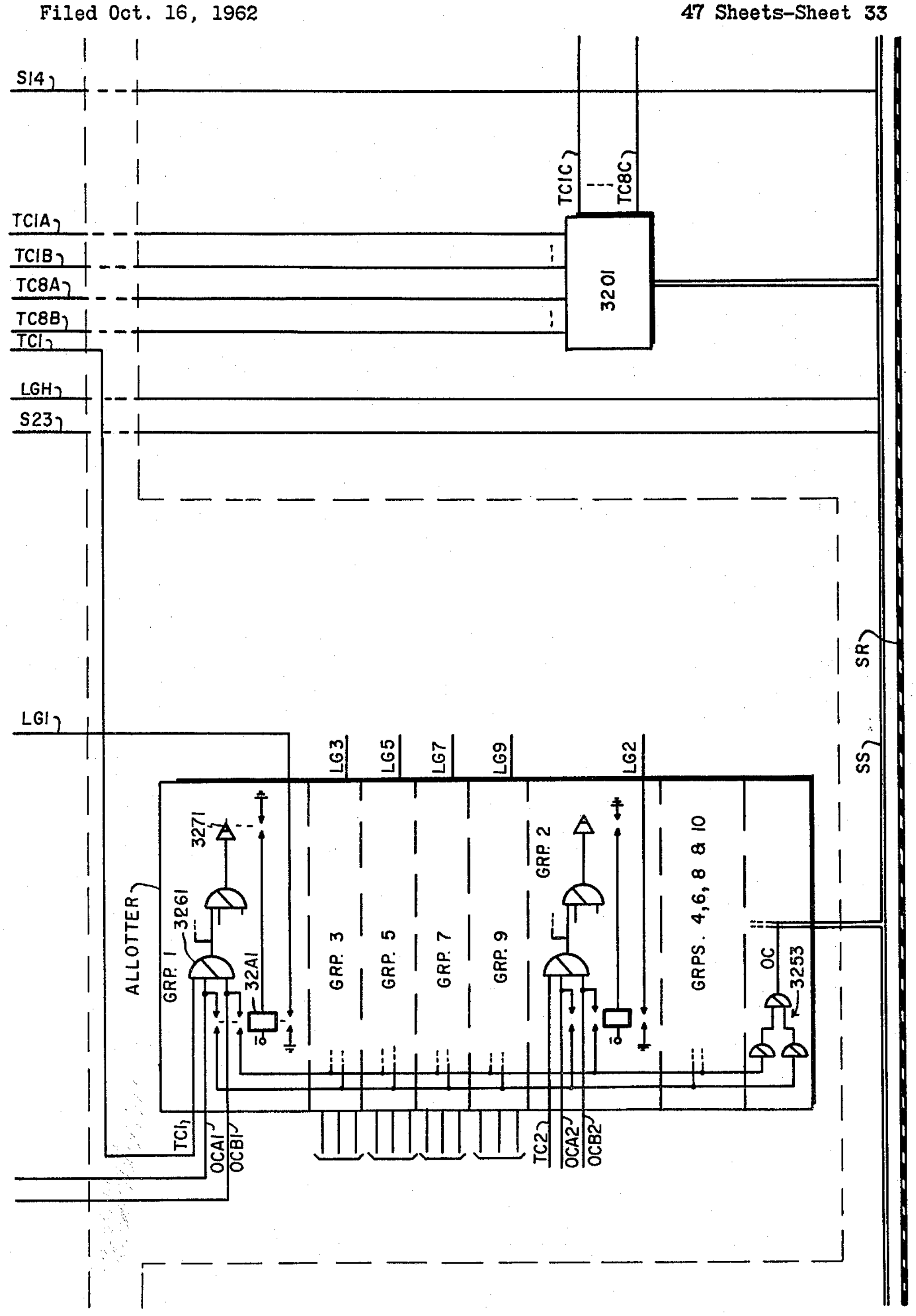

The allotter and transfer circuit 252 is represented by a dashed box across the top of all of FIGS. 28–33, with a portion of the allotter part shown in FIG. 32.

The principal units of the line identifier are a hundreds scanner 2903, a tens scanner 2902, and a units scanner 2901. These units may be scanners or parallel test and lockout circuits which perform the following functions: (1) a signal at any one of the inputs causes a device corresponding with this input to be set, (2) with one of these devices in set condition signals at other inputs are inhibited from setting their corresponding device, and (3) the device in said position operates a corresponding relay. Many circuits exist which meet these requirements. In one chosen embodiment scanners operated under the control of pulses sources and sequence state circuits in the sequence and supervisory unit 290 have been used. The output devices comprise relay drivers 2931–2940 from hundreds scanner 2903, relay drivers 2921–2930 from tens scanner 2902, and relay drivers 2811–2820 from units scanner 2901. The relays which are operated under the control of the relay drivers are relays 29H1–29H0 associated with the hundreds scanner 2903, relays 29T1–29T0 associated with the tens scanner 2902, and relay 29U1–29U0 associated with the units scanner 2901.

Referring again to FIGS. 12–14, looking at the P leads of the horizontal inputs of a single one of the matrices such as matrix C1, a negative potential applied to the P lead in any one of the line circuits can be detected through the diodes and pull windings of the A and B matrix cards, since the diodes are forward biased. Thus a negative potential applied to the P lead at any line circuit of hundreds group 1 such as to conductor L111P, can be detected at the first horizontal input of matrix C1, on conductor BC101P. Likewise a call in any of the other hundreds group of the 1000 line group will appear at a corresponding one of the P leads of the horizontal inputs of matrix C1. These leads are taken to FIG. 22, through contacts of relay 22HE, to FIG. 29 and amplifiers 2941 to 2950 respectively, and make contacts of relay 29TL to the ten inputs of hundreds scanner 2903. Likewise in each hundreds group the P leads of the horizontal inputs of any one of the matrices can detect a potential at any one of the ten lines of the A matrix card connected to that input. Thus in hundreds group 1 a call at any one of the lines L111 to L110 at the inputs of card A11 will appear at the conductor AB111P at the input of card B11. The ten leads AB111P to AB101P from card B11 are taken through respective make contacts of relays 22HEP1 and relay 22HE to the ten inputs of the tens scanner 2902. Likewise from each of the other hundreds groups the ten P leads from the horizontal inputs of one of the B cards, namely card B21 of hundreds group 2, card B31 of hundreds group 3 and so on to card B01 of hundreds group 10, are taken in FIG. 22 through contacts of corresponding one of the relays 22HEP2 (not shown) to 22HEP0. At the horizontal input terminals of the A cards, all of the 1000 P leads, ten from each card of the 100 A matrix cards, for example leads L111P to L110P of card A11, pass through contacts of a corresponding one of the one hundred relays 22LS11 to 22LS00, and then common together and are taken through contacts of relay 22LG and contacts 1–10 of relay 29UP to the units scanner 2901. The inputs to each of the scanners are multipled to the other line groups as shown by the multiple symbols at the bottom of FIG. 22.

The ten P leads from the horizontal P leads of matrix C10 namely conductors BC110P to BC010P are also taken through another set of ten contacts of relay 22HE and amplifiers 2951 to 2960 through make contacts of relay TL to the hundreds scanner 2903. These leads are also from the first B matrix of each hundreds group but from the second vertical. Thus in case of failure of diodes in the B matrix this second group of P leads may be switched in. This is provided by taking the outputs of the amplifiers 2941 to 2950 and 2951 to 2960 to a parity check circuit 2961. This circuit is arranged to detect failures and in response thereto to operate the relay TL to open its break contacts and close its make contacts so that the inputs BC1110P to BC010P are switched into the hundreds scanner instead of the inputs from matrix C1.

OPERATION OF LINE GROUP MARKER—ORIGINATING CALL

Assume now that the subscriber at station S111 initiates a call. In response to the closing of the subscriber loop, the line relay 12L of line circuit LC111 operates and closes its contacts. Negative battery potential through the break contacts of relay 21LR is applied over conductor LR1 and resistor 1211 of line circuit LC111 and the contacts of relay 12L to the pull conductor L111P, thence through diode 1201 and winding 1202 on card A11, diode 1301 and pull winding 1302 on card B11, to conductor BC101P at the input of card C1. The potential is also applied through diode 1401 and winding 1402 of card C1 to the P lead of vertical V1 to FIG. 25, thence by way of conductor OCA1 to an input of the allotter in FIG. 32. Note that the potential on the pull lead L111P is also applied through another path on P conductors through the A, B and C stages to a vertical P conductor of matrix C10 and thence by way of conductor OCB1 to another input of the allotter. Also at the horizontal input of card C10, the potential appears on conductor BC110P. This use of alternate signals by way of matrix C10 provides an extra margin of safety in case of failures of diodes in the switching network.

The signal to the allotter through OR gate 3261 and other circuits operates the relay driver 3271 which at its contacts supplies ground for operating relay 32A1. The signal potential of conductor OCA1 and OCB1 through contacts 1 and 2 of relay 32A1 and through gates 3253 is supplied to conductor OC, and thence through cable SS to the sequence and supervisory circuit 290 (FIG. 2), which causes the marker to enter an originating call sequence state. At contacts 3 of relay 32A1 ground is applied to conductor LG1 to operate the relays 26LG, 27LG, 24LG, 22LG, 21LG and 20LG which connects line group 1 to the marker. The signal HE through contacts of relay 22LG operates relay 22HE. Relay 22HE connects through the conductors BC101P to BC001P through the amplifiers 2941 to 2950 and the break contacts of relay TL to the hundreds scanner 2903, and also connects through the alternate conductors BC110P to BC010P, and prepares operate circuits for the relays 22HEP1 to 22HEP0.

In response to a signal from the sequence and supervisory circuits via cable SS, a 10-step counter in the hundreds scanner 2903 starts and steps until it finds coincidence of its output with a signal at one of the inputs to the scanner, which in this case is step 1, since the call is from hundreds group 1. The relay driver 2931 operates and supplies ground potential to operate the relay 29H1. Relay 29H1 locks to ground potential at break contacts relay 28LKM. Ground potential through contacts of relay 29H1 completes the operating path for relay 22HEP1. The conductors AB111P to AB101P from card B11 are connected through contacts of relay 22HEP1 and contacts of relay 22HE to the inputs of the tens scanner 2902. A signal at contacts of relay H1 is transmitted by way of conductor HX and cable SS to the sequence and supervisory circuits, which causes the tens scanner to start counting. Since the call is in tens group 1 the tens scanner finds coincidence at step 1 and operates the relay driver 2921, which in turn supplies ground potential to operate the relay 29T1. Relay 29T1 through its contacts locks to ground potential at break contacts of relay 28LKM.

Negative battery potential is supplied through resistor 2962 and contacts of relay 29T1 in multiple to the five line groups and through contacts of relay 22LG to ten of the 100 LS relays in line group 1 namely relays 22LS11 to 22LS01. Ground potential is supplied through contacts of relay 29H1 in multiple to the five line groups, and through blocking diodes to ten of the 100 LS relays of the line group, namely relays 22LS11 to 22LS10. Therefore relay 22LS11 in line group 1 operates.

The ten leads L111P to L110P from the horizontal inputs of card A11 are connected through contacts of relay 22LS11, of relay 22LG, and contacts of relay 29UP to the inputs of units scanner 2901. At contacts of relay 29T1 a signal is sent by conductor TX and cable SS to the sequence and supervisory circuits to cause the counter in units scanner 2901 to start stepping. The counter finds coincidence at step 1 and operates the relay driver 2811 which in turn operates the relay 29U1. Relay 29U1 at its contacts and break contacts of relay 29LKM locks to ground.

With the relays 29H1, 29T1, and 29U1 operated the line L111 is identified. The identity of the calling line is supplied through cable SR to the send receive circuit 280, from a negative 16 volt source through resistor 2973 and contacts of relay 29H1, through resistor 2972 and contacts of relay 29T1, and through resistor 2871 and contacts of relay 29U1.

The register selector shown in FIG. 31 includes a scanner 3101 and other electronic circuits 3102. The scanner 3101 includes a four stage counter whose respective outputs are connected to unit 3102 and also operate the relay drivers 3111–3114; and a six stage counter whose outputs are connected to unit 3102 and also operate respectively relay drivers 3121–3126. The idle test leads from the twenty-four register junctors are connected from the IDF through contacts of relay 24RJA to the respective conductors R1–R24 to the parallel test circuit in unit 3102. The scanner 3101 is driven under the control of signals from the sequence and supervisory circuit 290. The coding and coincidence gates along with the parallel test circuit in unit 3102 upon coincidence of the scanner position and an idle indicating potential on one of the leads R1–R24 transmits a signal to the sequence circuits to stop the scan, and at the same time places busy indicating potential on the idle test lead to prevent seizure of the register junctor by another line group marker. One of the relay drivers 3111–3114 supplies ground potential through its contacts to the corresponding one of the conductors RG1–RG4 and through contacts of relay 24LGA operates the corresponding one of the relays 24RG1–24RG4. Likewise one of the relay drivers 3121–3126 supplies ground over the corresponding conductor of G1–G6 through contacts of relay 24LNK to operate one of the relays 24G1–24G6. These two relays lock to ground at contacts of relay 24LKA. It is assumed throughout this description that control relays of the connect circuits such as 24LGA, 24LNK and 24RJA are operated at the appropriate times under control of signals from the sequence and supervisory circuit. Operation of one of the relays 24RG1–24RG4 and one of the relays 24G1–24G6 connects the leads RR, TR, and BY from the LNI sender portion 283 of the send receive circuit 280 (FIGS. 2 and 33) to one of the twenty-four vertical links from the R matrices, and negative potential through resistor 2401 to the P conductor of the corresponding vertical link. For example assume that the vertical 1 of R matrix 1 has been preselected and therefore that relays 24RG1 and 24G1 are operated.

The route selector shown in FIG. 31 includes a scanner 3103 and an electronic coincidence gating unit 3104. The scanner 3103 includes a five stage counter with outputs connected to unit 3104 and also respectively to the relay drivers 3131–3135; and a four stage counter having outputs connected to unit 3104 and also respectively to relay drivers 3141–3144.

Preselection of an idle register defines a group of twenty originating junctors. One of the slave relays 25G1–25G6 is operated from the corresponding one of the relays 24G1–24G6, which depend upon which one of the six R matrices the register junctor is connected to, to connect through the twenty idle test leads from the corresponding originating junctors to the twenty inputs J1–J20 of unit 3104.

Figure 23:
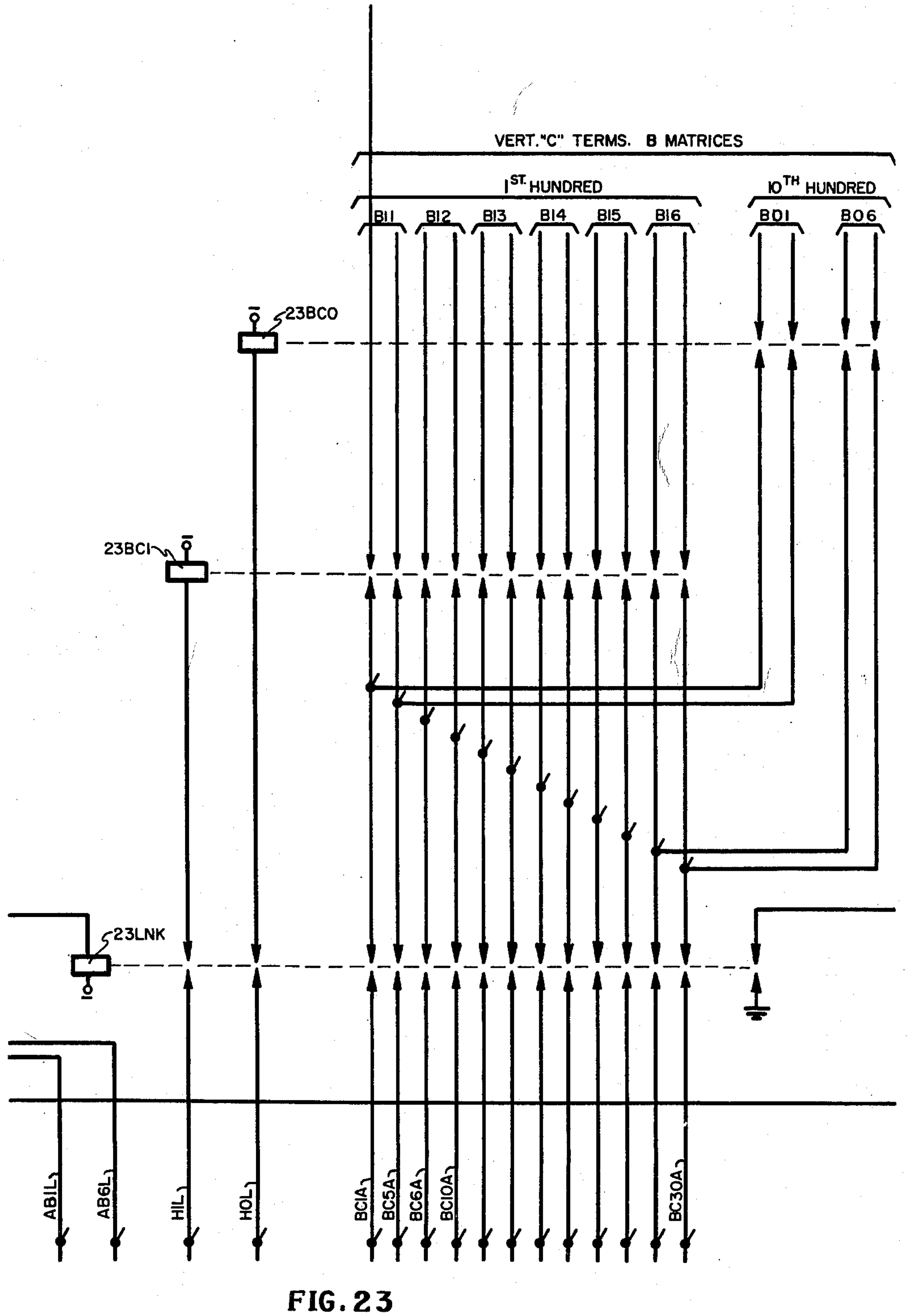
Figure 24:
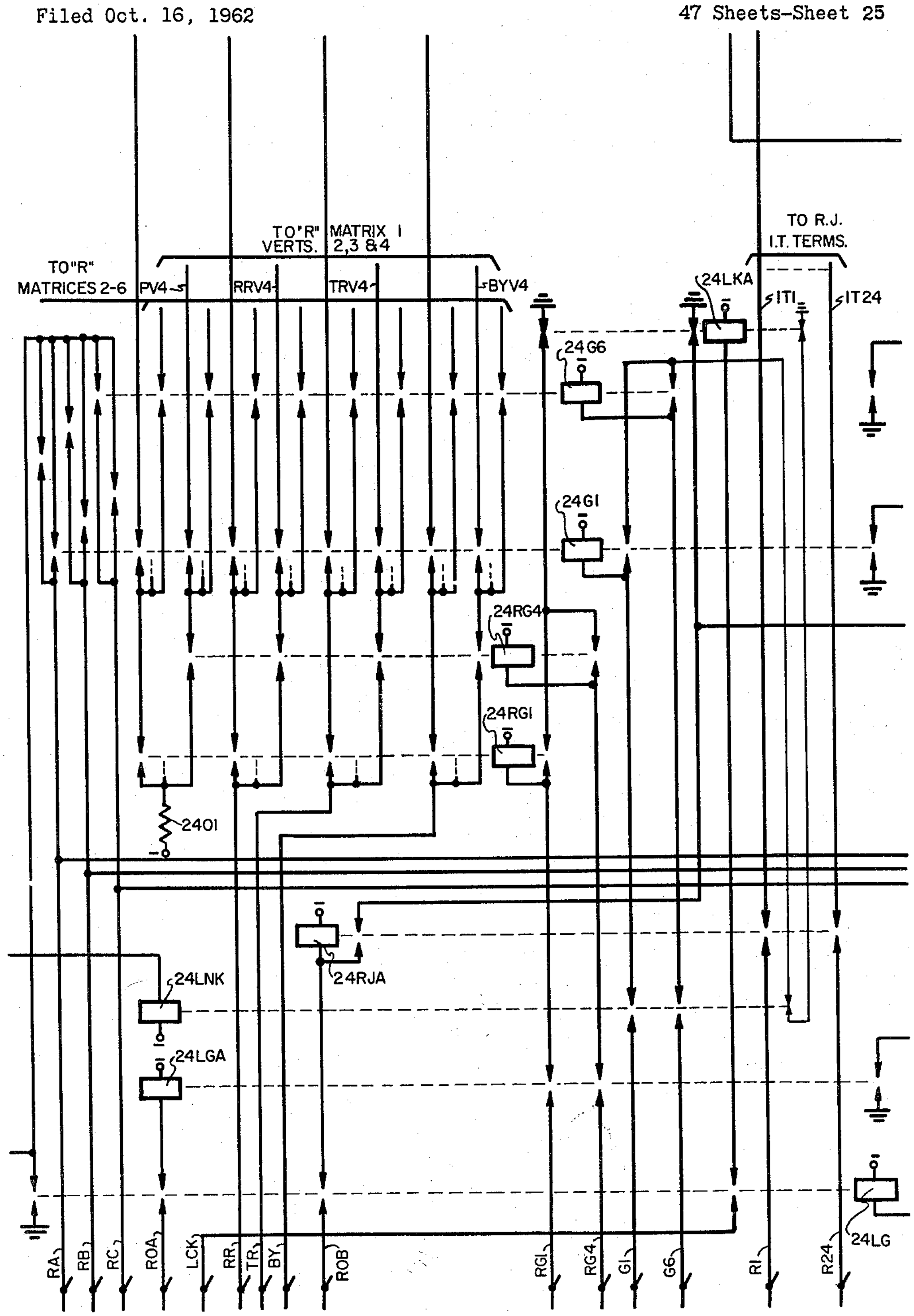
Figure 25:
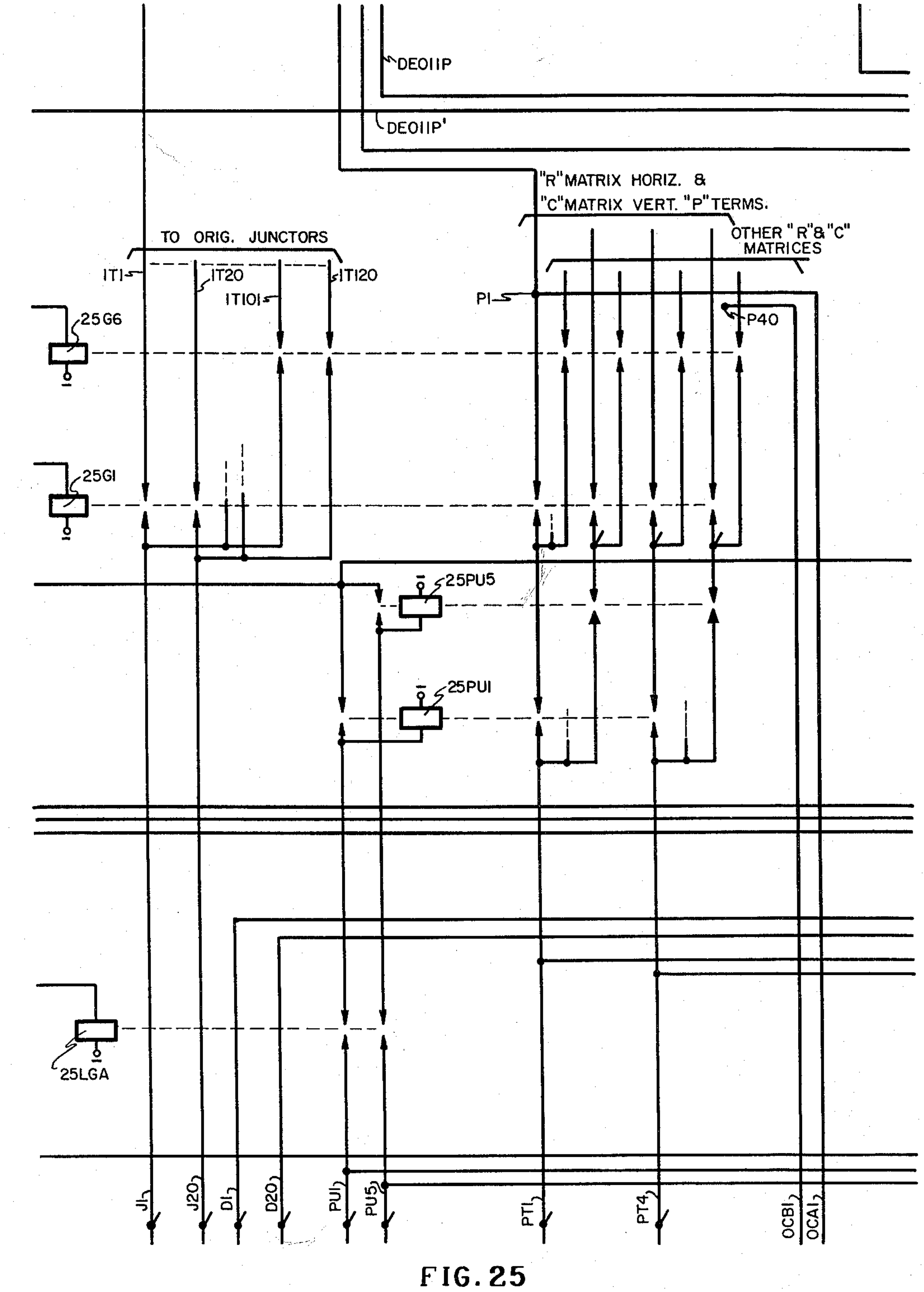

To test the interstage links for available paths, advantage is taken of the fact that the holding current in a busy path provides a negative potential on the C conductors of the links. To test the BC links, the vertical C terminals of the B matrices are connected as shown in FIG. 23, and grouped as shown in FIG. 30. One of the relays 23BC1–23BC0 is operated from ground at contacts of one of the relays 29H1–29H0. In this case relay 23BC1 is operated to connect through the thirty BC links which extend to the first hundreds group. These leads are connected through contacts of relay 23LNK via leads BC1A–BC30A to FIG. 30. One of the relays 30A, 30B or 30C is operated to select twenty of these leads corresponding to the twenty selected originating junctors. In this case relay 30A is operated over conductor RA from contacts of relay 24G1. There are six AB links to the A matrix which extends to the calling line. In this case the calling line is on matrix A11, and therefore relay 22LS11 has been operated by the line identifier. The C leads from these links are connected through contacts of relay 22LS11 and contacts of relay LNK via leads AB1L–AB6L through an amplifying unit 3001 to the respective relay drivers 3011–3016. For each link which is busy the relay driver operates and causes the operation of the corresponding one of the relays 30AB1–30AB6. Each busy AB link blocks paths via five BC links, which are made to appear busy by negative potential via resistors and contacts of the operated ones of the relays 30AB1–30AB6. If all AB links are busy ground appears on conductor LNK to the sequence circuits.

Thus the route selector, as the scanner 3103 steps, tests for coincidence of an idle DC link and a corresponding originating junctor idle test lead. Upon finding a route a signal is sent from unit 3104 to the sequence circuits to stop the scanner 3103.

It is possible that an idle route does not exist between the idle preselected register, an originating junctor, and an idle path from there to the calling line. Therefore, if an originating route is not found, up to six attempts are made by cooperation between the register selector and the route selector scanners to find a route by preselecting idle registers which define other originating junctor groups.

When a route has been found, one of the relay drivers 3131–3135 extends ground through its contacts and by the corresponding one of the leads PU1–PU5 through contacts of relay 25LGA to operate a corresponding one of the relays 25PU1–25PU5, which locks to ground through break contacts of relay 24LKA. One of the relays drivers 3141–3144 at its contacts completes a path to operate a corresponding one of the relays 31PT1–31PT4, which locks to ground at break contacts of relay 31LCM. Assume now that a route has been selected from line circuit LC111 by way of originating junctor OJ1 to the register junctor connected through the first vertical of R matrix one, and assume that the sequence circuit has activated the signals for pulling the connection. Then starting in FIG. 28, negative battery potential extends through resistor 2804 and contacts of relay drivers 2801 and 2802, through contacts of relay 28U1 to conductor LK1, and thence through contacts of relay 22LG and relay 22LS11 to conductor L111P, thence through diode 1201 and winding 2102 in matrix A11, diode 1301 and winding 1302 in matrix B11, diode 1401 and pull winding 1402 in matrix C1, to the P conductor OJ1AP, thence through contacts of relay 25G1 and relay 25PU1; contacts of relay 31PT1 to ground applied by the sequence circuit to lead CDP. Also negative battery potential is extended through resistor 2401, contacts of relays 24RG1, and 24G1, to the P conductor of the vertical V1 of R matrix one, through winding 1602 and diode 1601 to the P conductor OJ1AP to the previously noted ground. Therefore the crosspoints in the matrices A11, B11, and C1 operated in series, and the crosspoint in R matrix one also operates. The register junctor applies the holding ground on lead CR which extends through the hold winding 1603 in the R matrix one to operate relay 15JA in the originating junctor. This supplies a ground on the C lead which operates in series through the hold relays in the matrices C1, B11, and A11 to the cutoff relay 12CO in the line circuit to thereby hold the connection. Busy verification and other tests are made by the circuit in FIG. 28 connected to the lead LS1 through contacts of relay 28U1.

Figure 2:
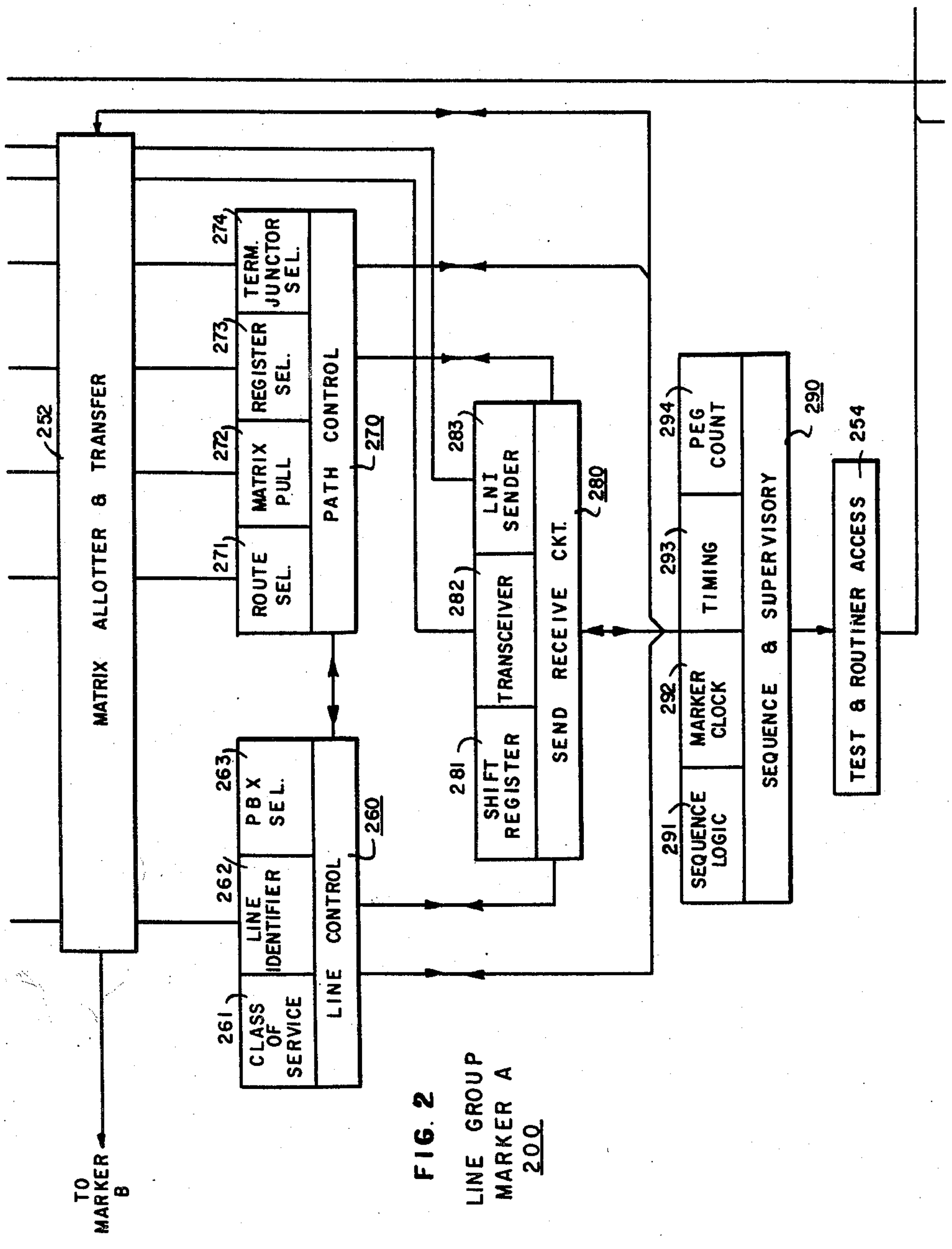
Figure 3:
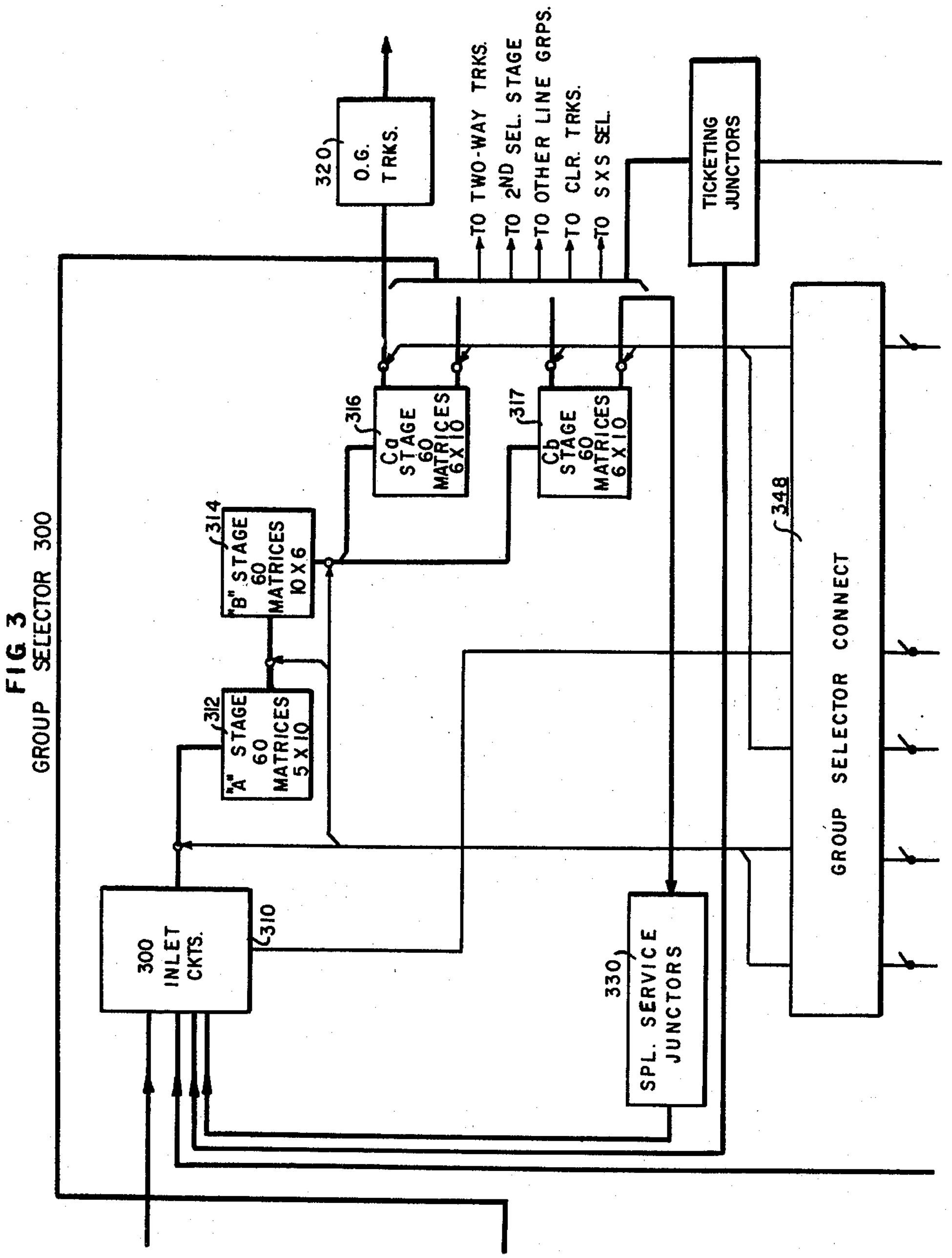
Figure 20:
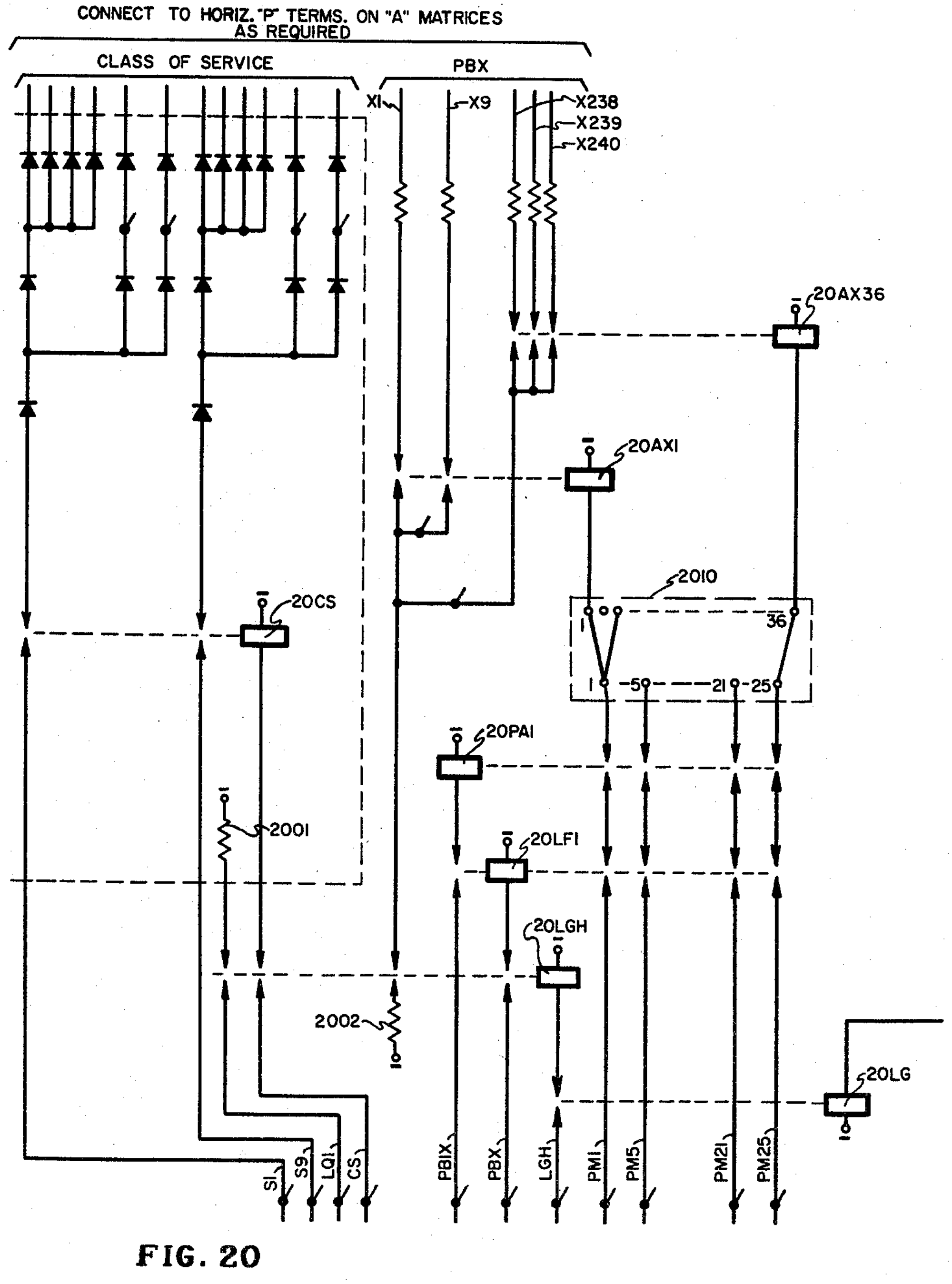
Figure 21:
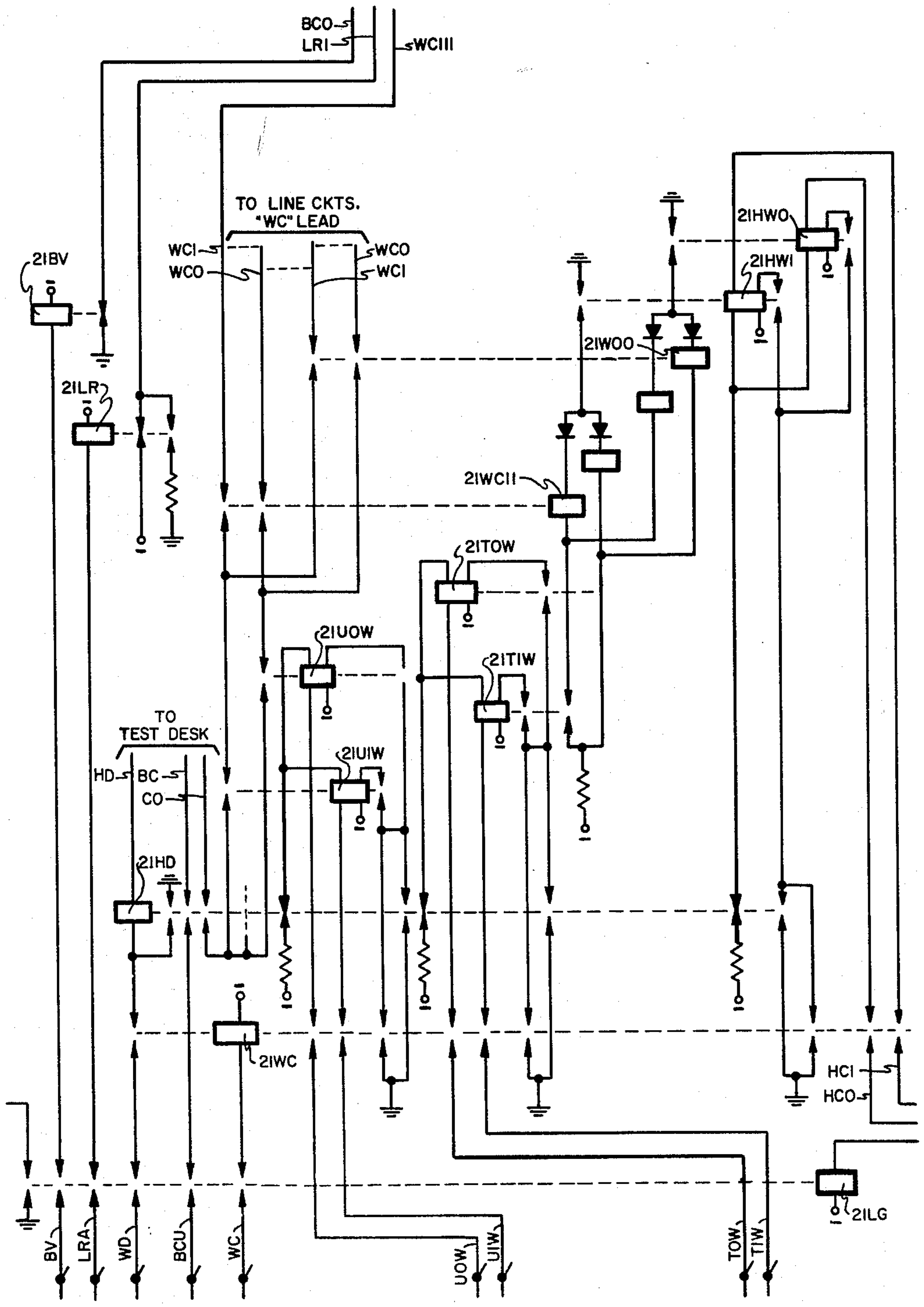
Figure 22:
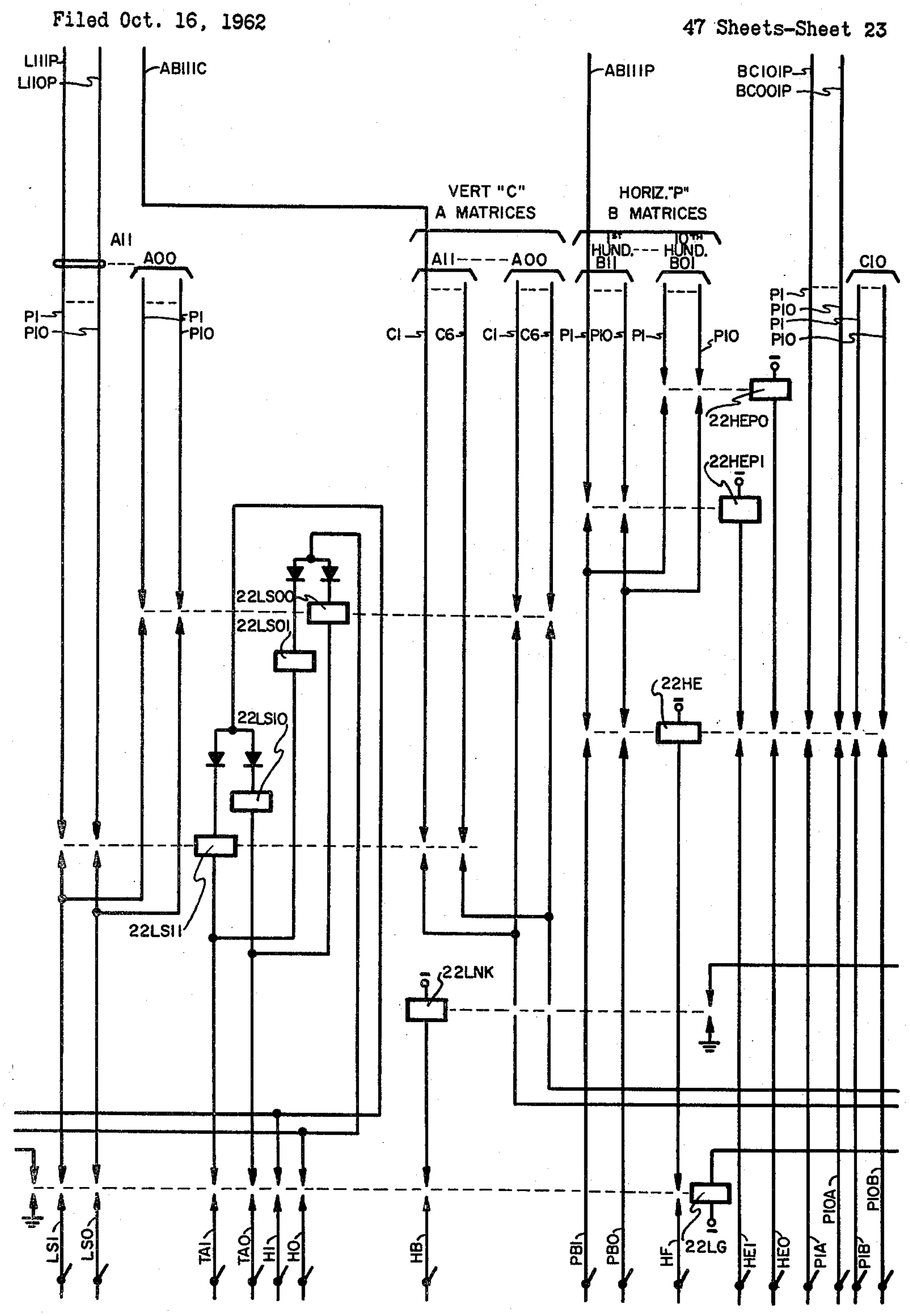
Figure 33:
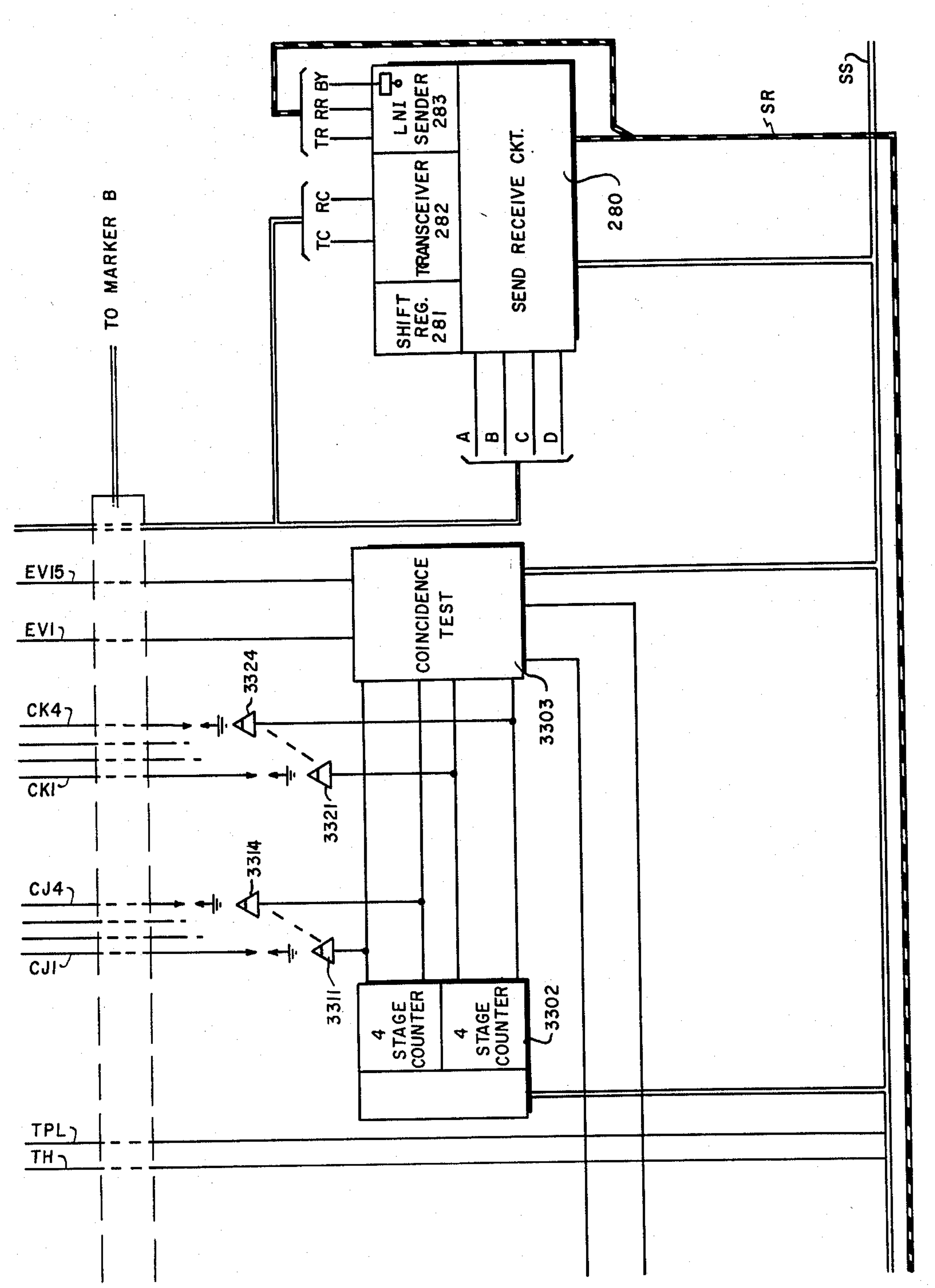

To provide a class of service indication, the P conductors of the line circuits connected from the horizontal P terminals of the A matrices to a diode field in FIG. 20 as required provides a signal on the conductors S1–S9 for the line circuit selected by the line identifier. Negative potential through a resistor 2001 identifies the line group. Operation of relay 20LGH at its contacts extends a signal CS to operate relay 20CS, and also connects resistor 2001 to a lead LQ1. This extends the signals on the lead S1–S9 and lead LQ1 to the send receive circuit 2A (FIGS. 2 and 33). After the route has been selected the LNI sender 283 is actuated to transmit via leads TR and RR the marker identity, the line group identity, the class of service, and the calling line identity by the path through contacts of relay 24RG1 and 24G1 to the vertical link one of R matrix one, and thence via the IDF and through the register junctor such as 601 (FIG. 6) to the register receiver 630.

After establishing and verifying the connection as described, the marker releases to handle another call.

OPERATION OF LINE GROUP MARKER—TERMINATING CALL

The terminating junctor selector includes a scanner 3302 and an electronic coincidence gating unit 3303 shown in FIG. 33. The scanner comprises two four stage counters. The first counter has its outputs connected to the unit 3303, and also respectively to the four relay drivers 1311–1314. The second counter has its outputs also connected to unit 3303 and respectively to the four relay drivers 1321–1324. The same scanner and logic is used for two distinct scanning operations. In the first operation the one of the eight E matrices and corresponding terminating junctor group in which the call appears is selected. In this operation the second counter is used as a two stage counter. In the second scanning operation the particular terminating junctor in the group is selected.

Assume now that a terminating call to line L011 is being made, and terminating junctor TJ1 is seized by ground appearing on lead EC0 of line TJ1A from the selector. Relay 17S operates and at its contacts 2 completes a path from negative battery through resistor 1901, and contacts of relays 19AL2, 17S, 17SLK, and contacts of a busy key to lead P of line TJ1B. This potential extends to E matrix one, through pull winding 1502 and diode 1501 to conductor DE011P and thence in FIG. 26 through break contacts of relay 26LGH to conductor TC1. This signal is then extended to the alloter, FIG. 32, which causes operation of the line group relay 26LG and its slaves shown in the various figures. The sequence and supervisory circuits will then supply a signal LGH which through contacts of relay 26LG operates relay 26LGH. The signal on lead DE011P is then extended through make contacts of relay 26LGH to the conductor TC1A to unit 3201. The call signal also is extended through E matrix one to the P conductor of the horizontal H20 and through other contacts of relay 26LGH to the conductor TC1B. The unit 3201 comprises parity check and gating apparatus which selects and gates through either the eight conductors TC1A–TC8A or the eight conductors TC1B–TC8B to the respective conductors TC1C–TC8C. These conductors extend to the coincidence test unit 3303. Since the call is an E matrix one, coincidence occurs and the scanner stops with relay drives 1311 and 1321 operated. Ground is then extended on conductors CJ1 and CK1 through contacts of relay 27LGH to operate relays 27J1 and 27K1. Relays 27GE1 and 26GE1 then operate to switch through various conductors associated with E group one.

Figure 27:
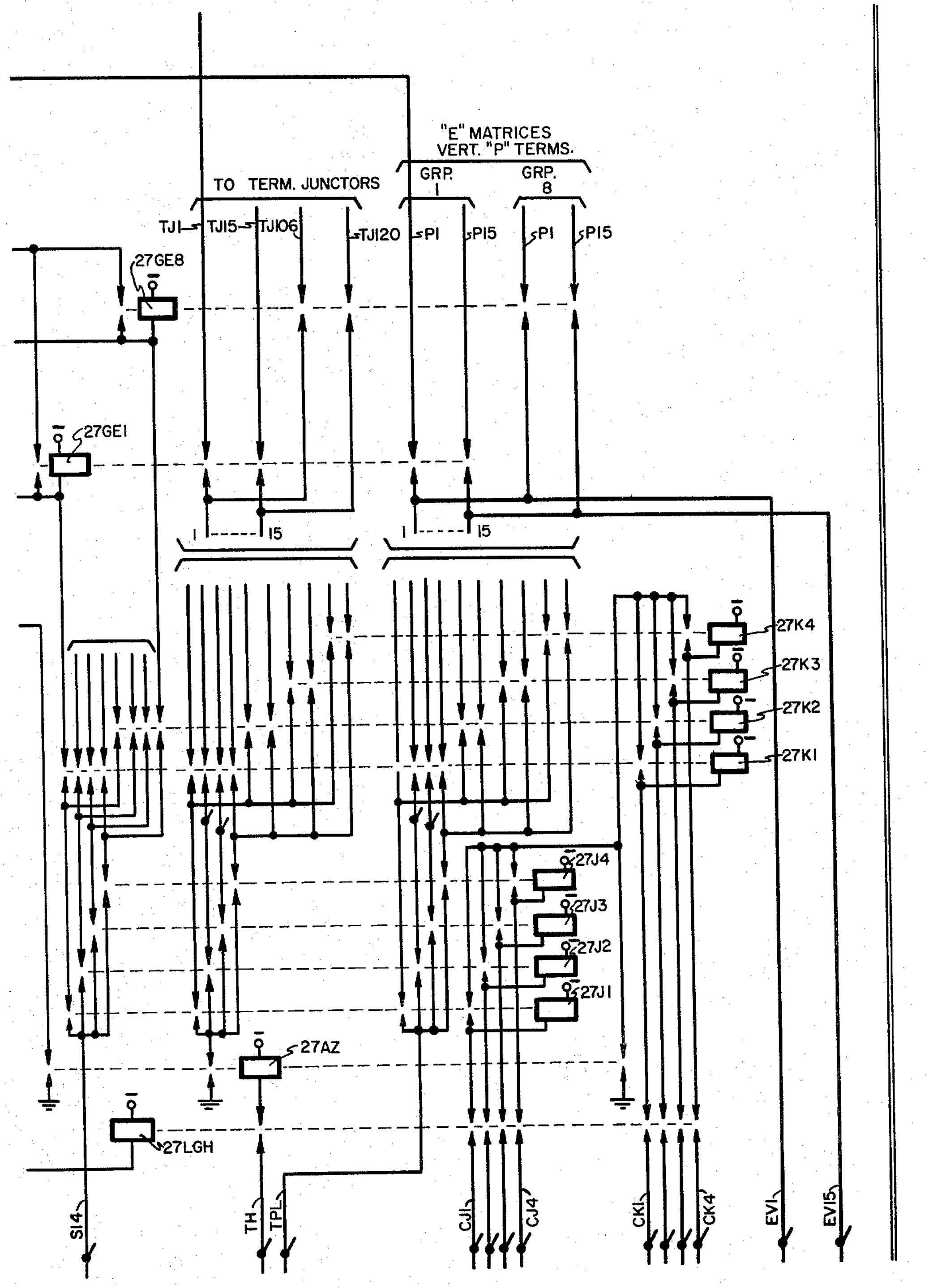

The fifteen vertical P conductors of E matrix one are then extended in FIG. 27 through contacts of relay 27GE1 through the leads EV1–EV15 which extend to the coincidence unit 3303. The second scanning operation then occurs which finds the call signal on lead EV1, and therefore results in the operation of relay drivers 1311 and 1321. The relays 27J1 and 27K1 then operate again to indicate the particular terminating junctor in the group and switch through corresponding leads.

Figure 26:
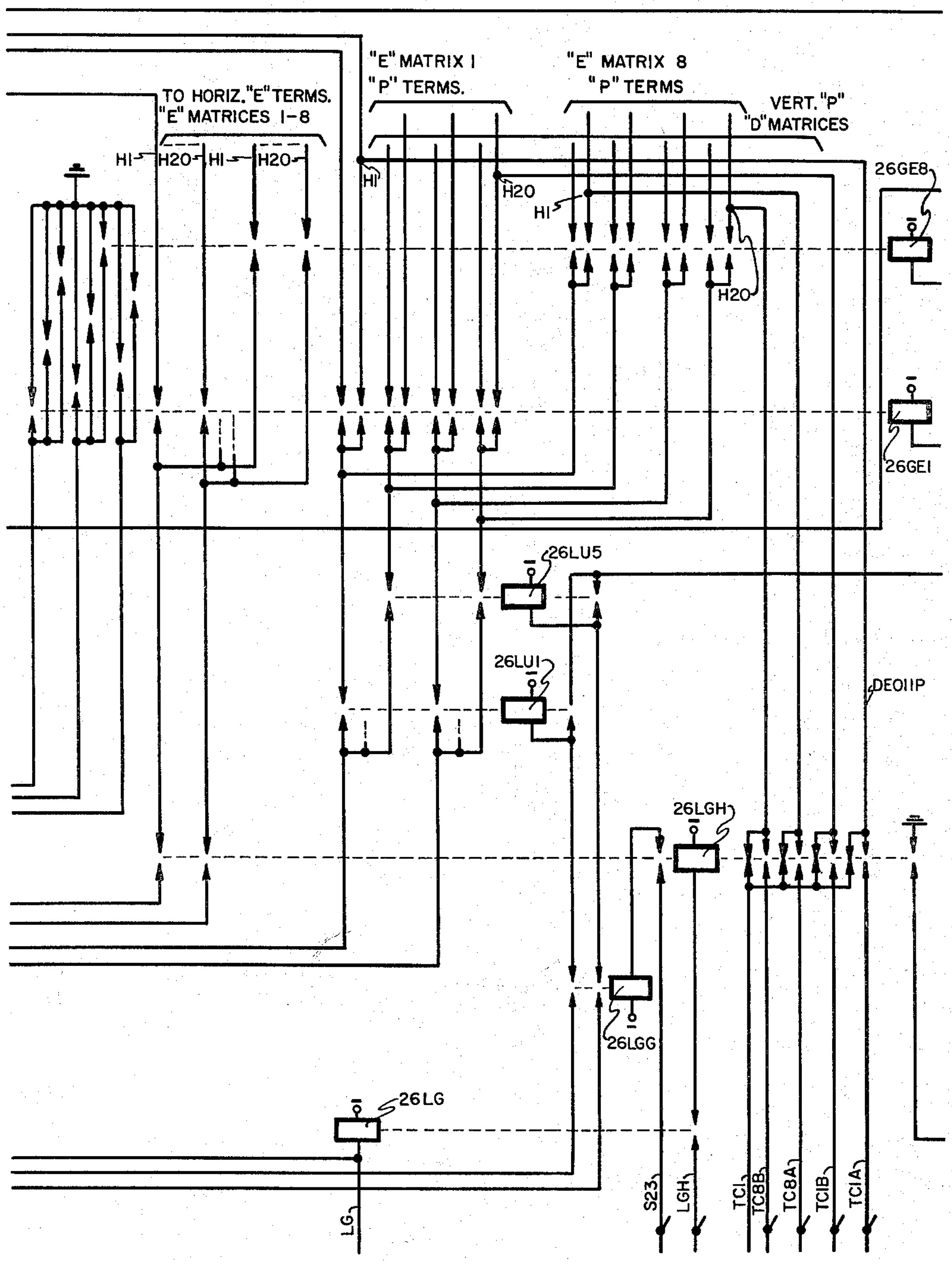

The horizontal P terminals from E matrix one are extended in FIG. 26 through contacts of relay 26GE1, and contacts of relay 26LGH to leads D1–D20 to the unit 3104 of the route selector in FIG. 31. In the same manner as described for an originating call the link grouping circuits in FIG. 30 extend the twenty leads BC1–BC20 to the unit 3104 to indicate the availability of the path from the D matrix to the called line. The route selector then selects an available path.

Ground through contacts of relay 27AZ and contacts of relay 27J1 and 27K1, thence through contacts of the group relay 27GE1 extends to the terminating junctor to operate the relay 17TJS. The tip and ring conductors of the communication path which have been extended from the sender through the originating junctor and the selector, are extended through contacts of relay 17TJS to leads TC and RC to the transceiver 282 of the send receive circuit 280 (FIGS. 2 and 33). The identity of the call line is received, decoded, and supplied to the line identifier in FIG. 20 on conductors HT0, TT1, and UT1, to operate the relays 29H0, 29T1, and 28U1.

When the sequence signal for establishing the connection has been received ground then extends from negative battery through resistor 2804 and relay driver contacts to lead LS1, thence through contacts of relay 22LG and contacts (not shown) of relay LS01 to the horizontal P conductor of matrix A01 then through the pull windings of matrices A01 and B01 to the P conductor of link BC001, thence through the pull winding 1412 of matrix D1 to the conductor DE100P. Ground from sequence lead TPL is also extended through contacts of relays 27J1 and 27K1 to the P conductor of the first vertical link of E matrix one, thence through pull winding 1502 and its associated diode to lead DE011P. The two leads DE011P and DE011P′ are extended in FIG. 26 through contacts of relay 26GE1, and thence through contacts of relay 27LU1 to the conductor PT1 and through contacts of relay 31PT1 to ground from the sequence circuit on lead CDP. The crosspoints then operate in matrices A01, B01, and D1 in series; and also in matrix E1 to establish the path. The path is held by ground on the C lead and a terminating junctor via line TJ1B and the hold windings of the four matrices E1, D1, B01, and A01, and the cutoff relay of line circuit LC011 in series.

A code designating the party, or other information regarding the call, is transmitted from the send receive circuit 280 via leads A, B, C and D to the terminating junctor. After the marker releases the call is under the supervision of the terminating junctor.

Figure 28:
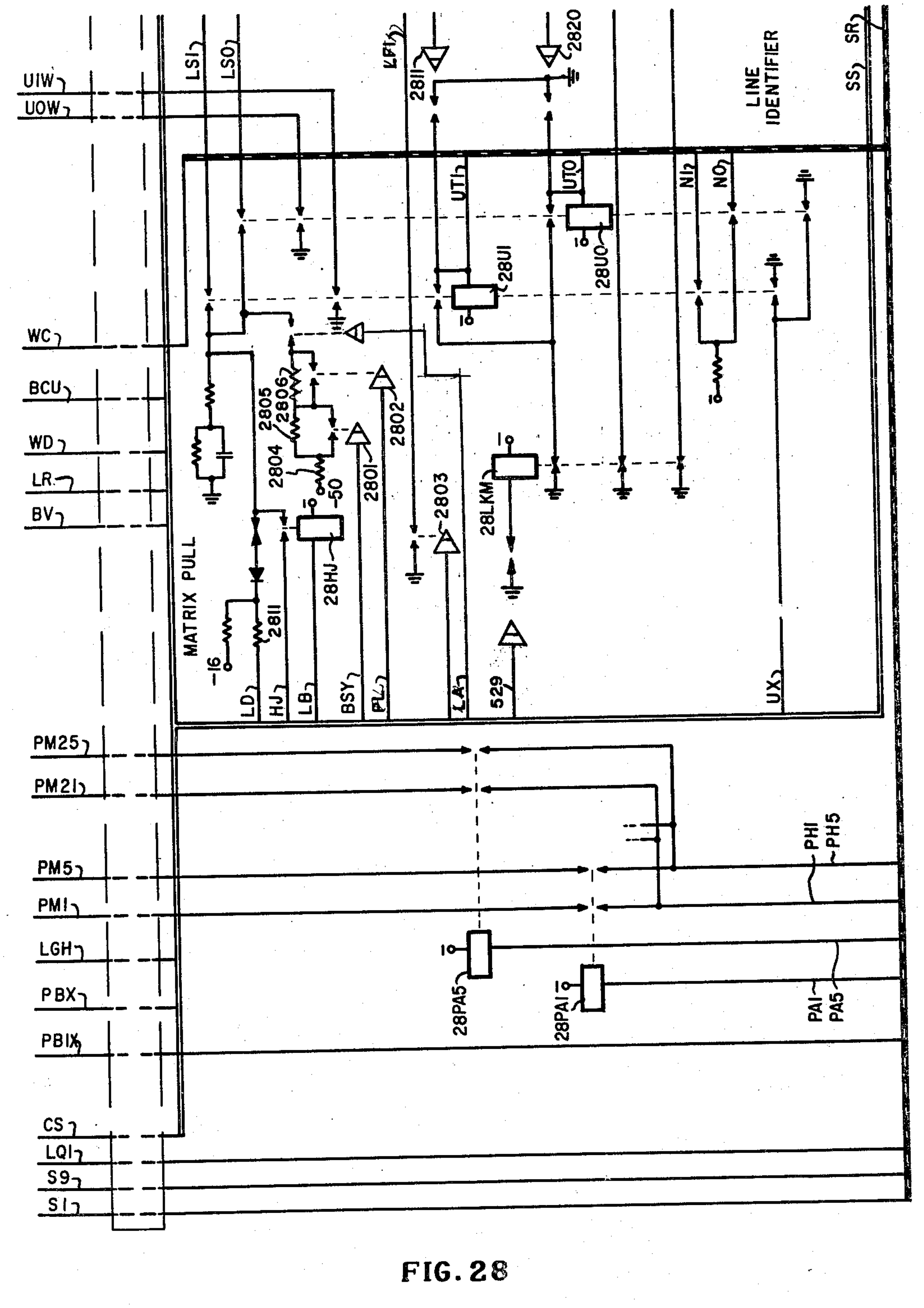
Figure 29:
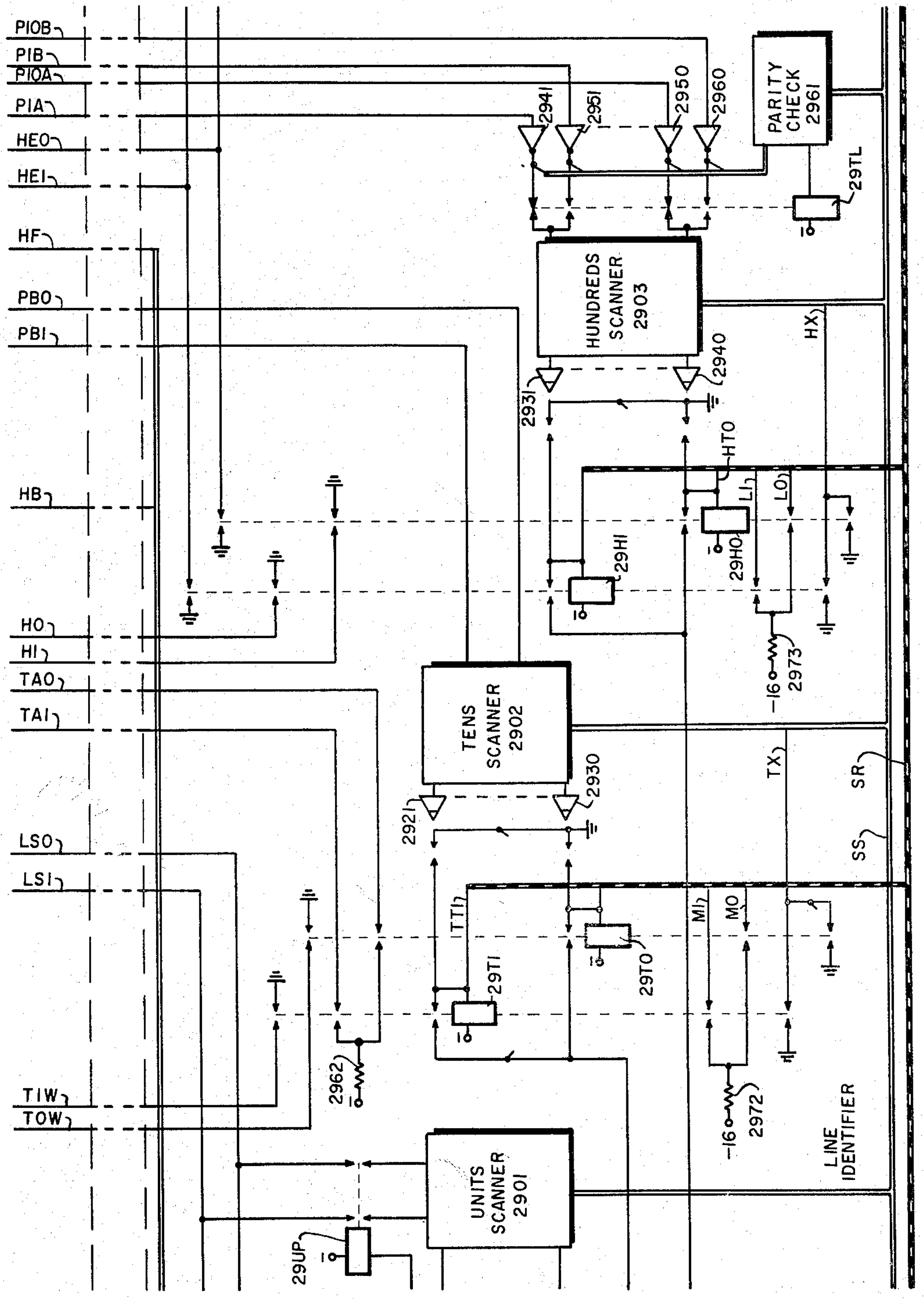

If the called number as received at the send receive circuit 280 designates a PBX group, the PBX group circuits in FIGS. 20 and 28 are used. An arrangement is provided for placing negative potential on the horizontal P conductors of all of the idle line circuits of a group. A jumper field 2010 having input leads through contacts of a relay 20PA1, and output leads to thirty-six relays AX1–AX36 is provided. If additional facilities are required, one or two additional jumper fields with inputs through contacts of respective relays 20PA2 and 20PA3 (not shown) and their own output grouping relays may be provided. For each PBX group one of the twenty-five input terminals of jumper field 2010 is used and is jumpered to one or more of the thirty-six output terminals. Each of the relays 20AX1–20AX36 may have a number of contacts, for example relay AX1 has nine contacts connected through respective resistors to the leads X1–X9, and relay 20AX36 has three contacts extending through respective resistors to the leads X238–X240. Negative battery potential is applied to all of these contacts through a resistor 2002 and contacts of relay 20LGH. The P conductors of the line circuits are connected from the horizontal P terminals of the A matrices to respective ones of the conductors X1–X240 as required to provide the PBX grouping. The called number code for the PBX group includes a signal on lead PB1 which through contacts of relay 20LF1 operates relay 20PA1, or a signal on a corresponding one the other leads (not shown) to operate a corresponding relay, for the other jumper fields. A signal on one of the leads PA1–PA5 operates one of the relays 28PA1–28PA5; and a signal on one of the leads PH1–PH5 is extended through the contacts of the operated last mentioned relay to one of the conductors PM1–PM25 thence through contacts of relay 20LF1 and relay 20PA1 and through the jumper field 2010 to operate the relay or relays for that PBX group. The line identifier then scans the line circuits to find the first idle line of the group as indicated by the negative potential on its P lead.

GROUP SELECTOR AND MARKER—DETAILED DESCRIPTION

Figure 34:
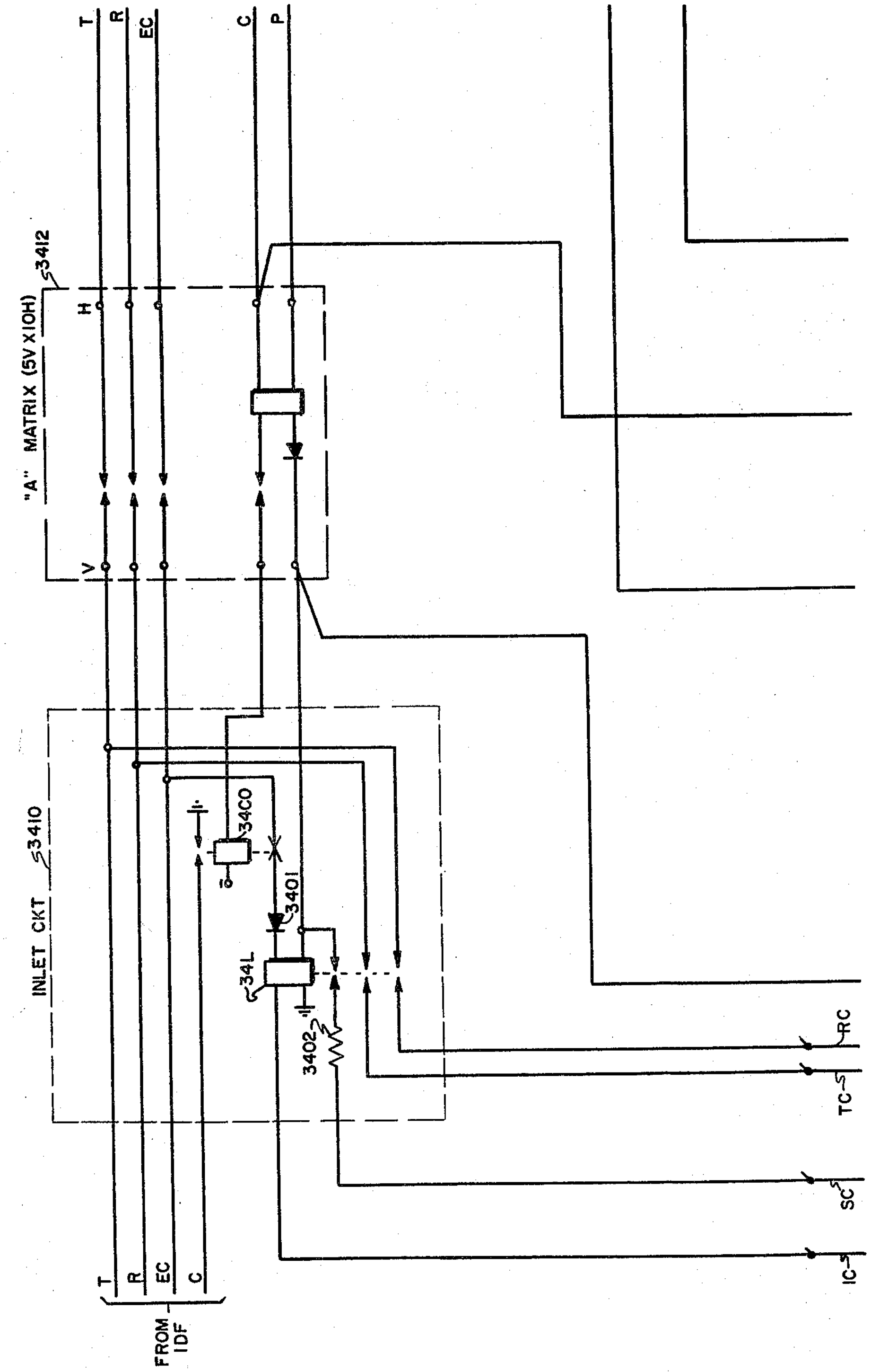
FIGS. 34–41 are to be arranged.
Figure 35:
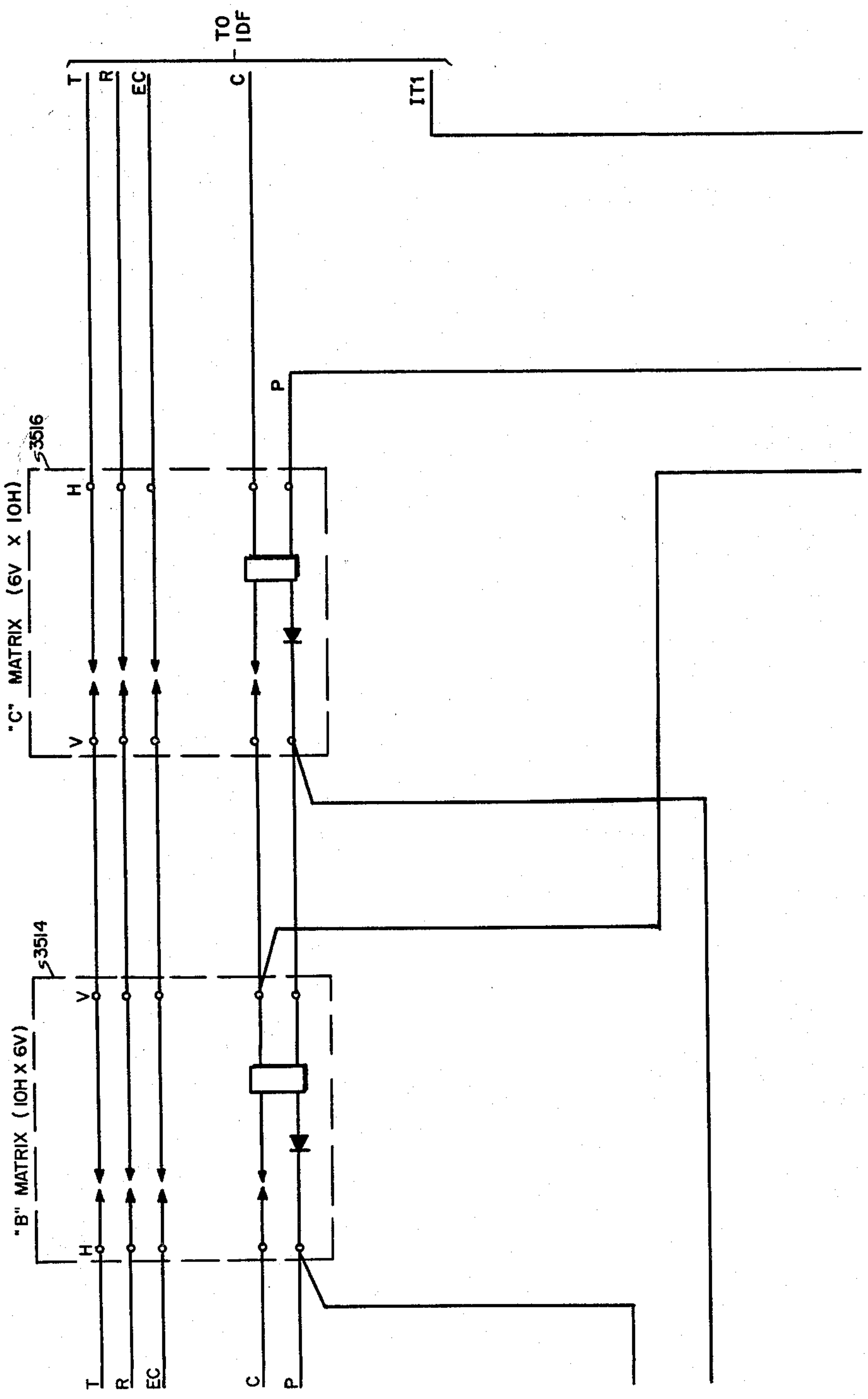
Figure 36:
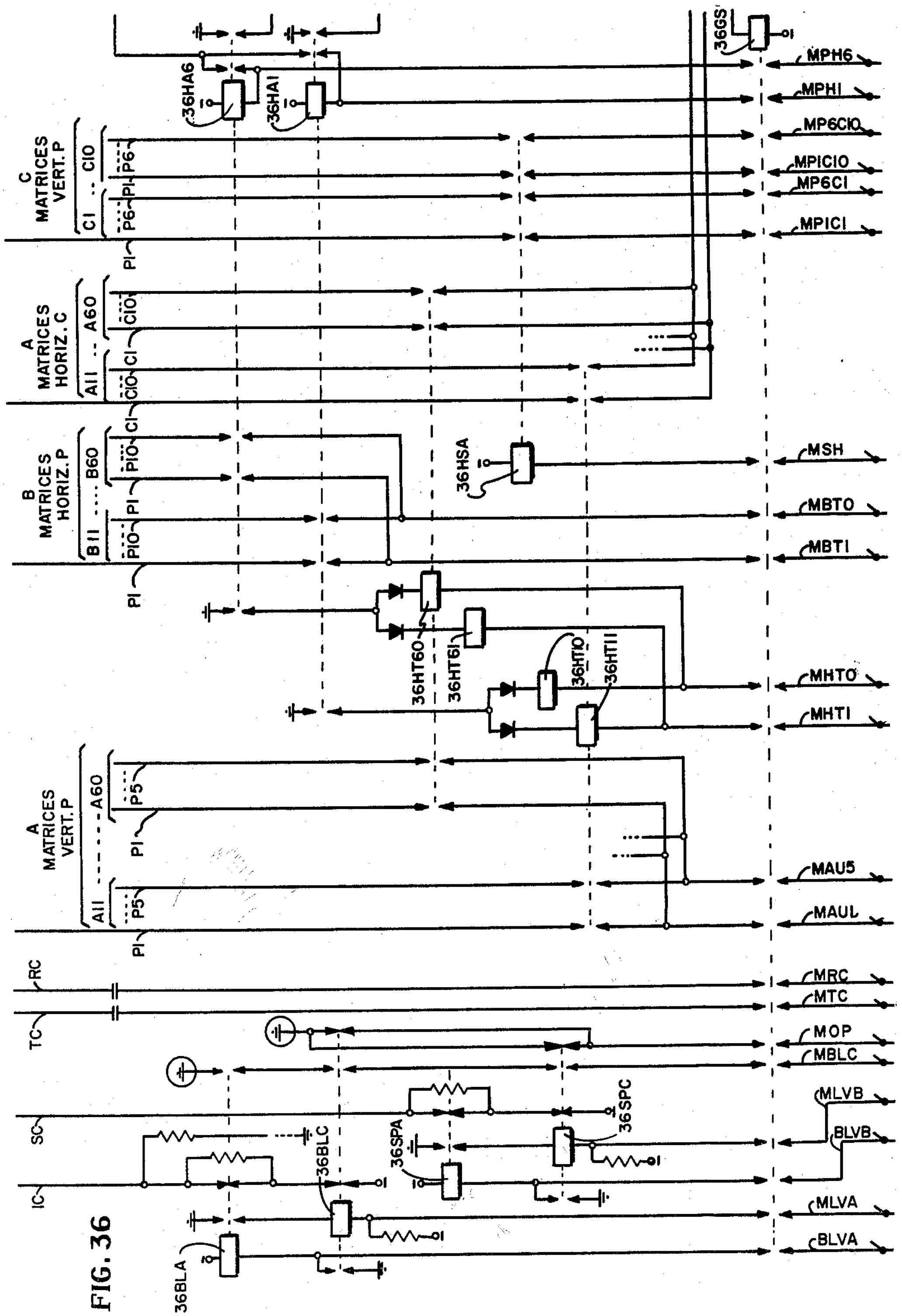
Figure 37:
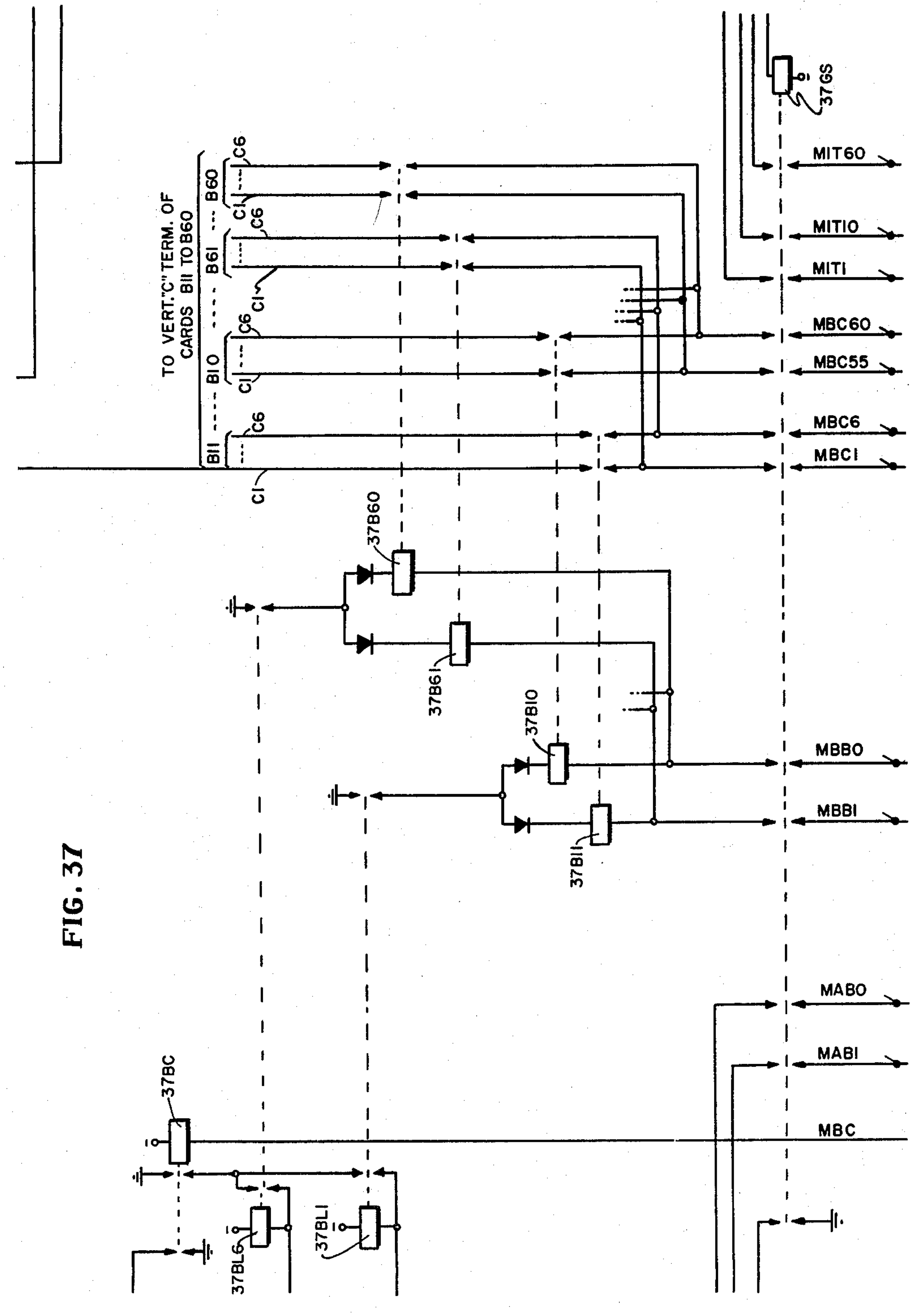
Figure 38:
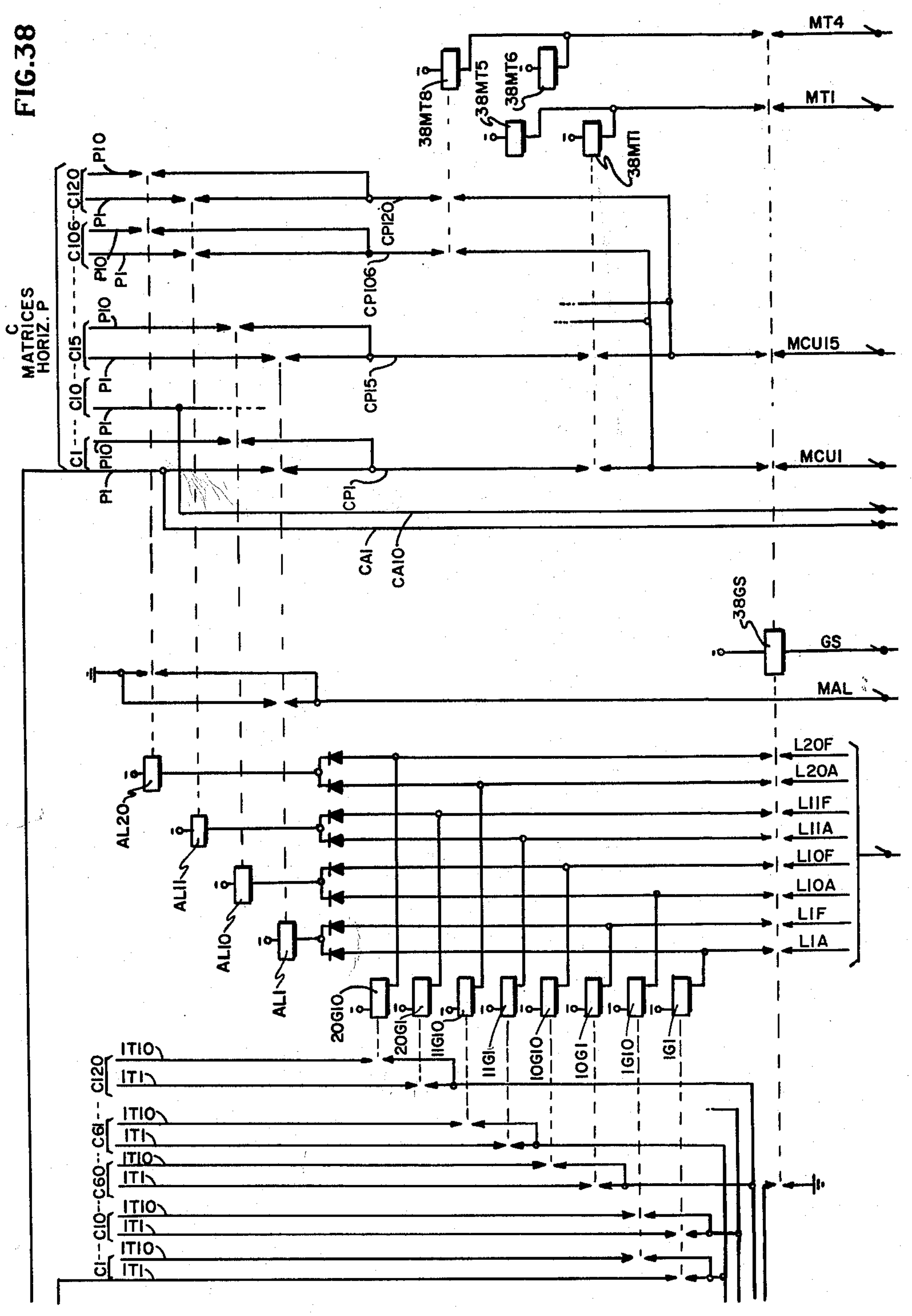
Figure 39:
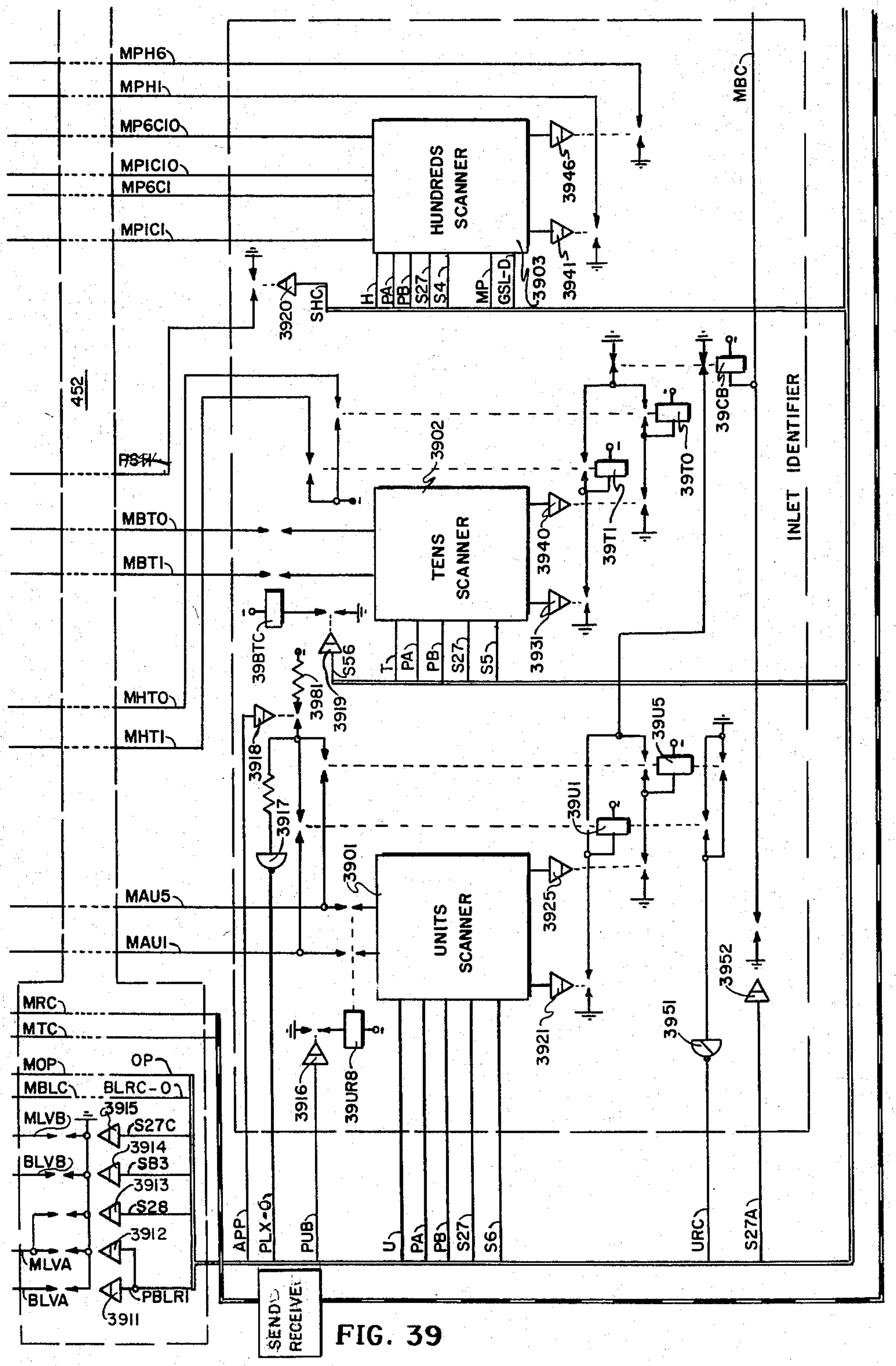
Figure 40:
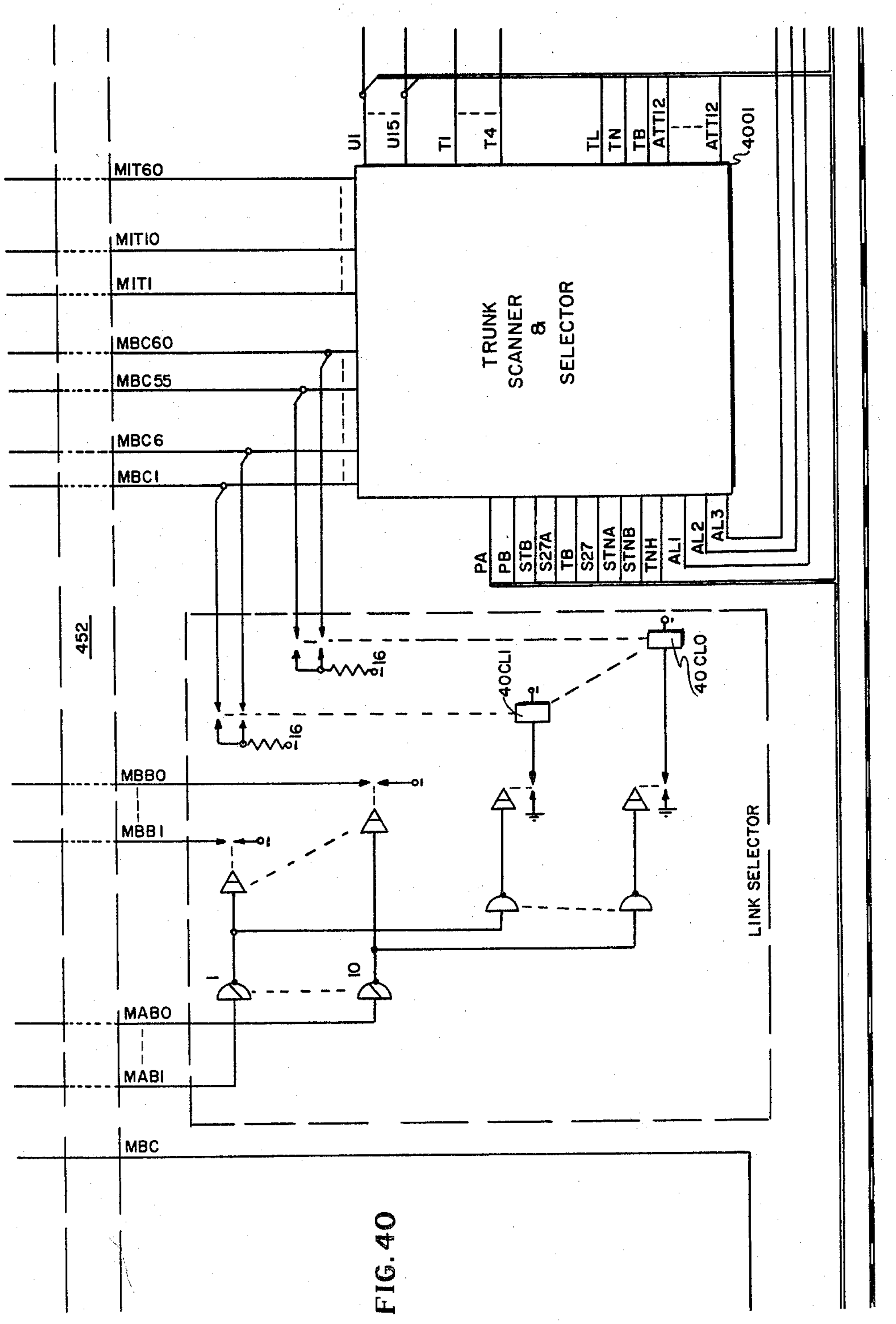
Figure 41:
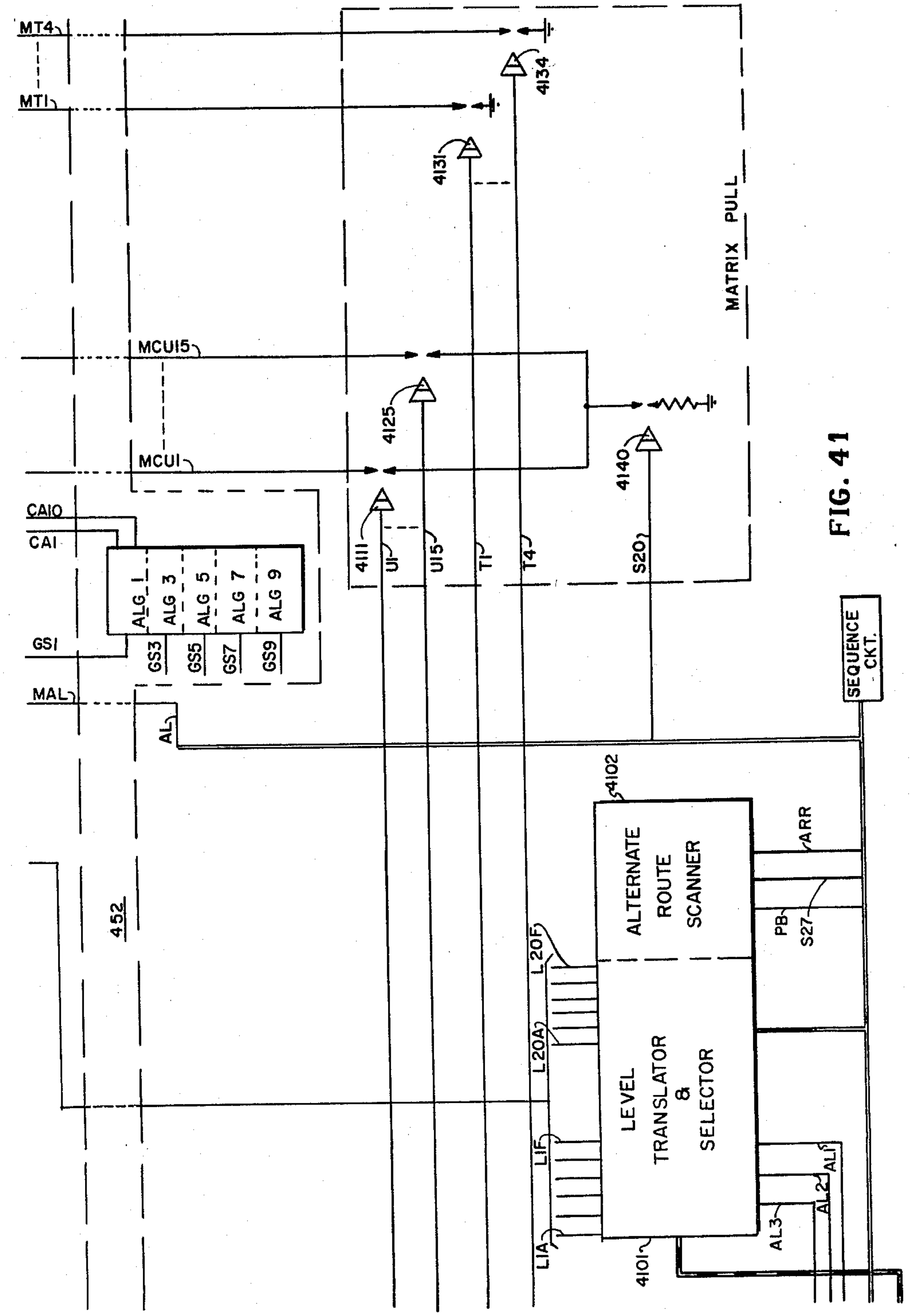
Figure 49:
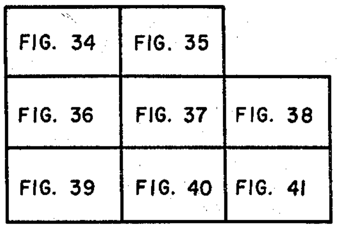
FIG. 49 shows how

The group selector inlet circuit and switching matrices are shown in FIGS. 34 and 35; the group selector connect circuit 348 is shown in FIGS. 36–38, and the marker 400 is partly shown in FIGS. 39–41. FIG. 49 shows how FIGS. 34–41 are arranged.

The inlet circuit 3410 includes a line relay 34L having two windings and three make contacts; and a cutoff relay 34CO having a set of break contacts and a set of make contacts. The circuit is seized by ground on lead EC which through the break contacts of relay 34CO, diode 3401, and the upper winding of relay 34L extends via lead IC to battery potential in the connect circuit. Negative battery potential from the connect circuit on lead SC through resistor 3402 supplies a marking potential on the P lead to indicate a service request. The switching network comprises three stages A, B, and C, of which one crosspoint in each is shown in FIGS. 34 and 35. These matrices are similar to those in the line group except that an additional lead EC is provided in the links with the corresponding additional contact in each crosspoint. An inlet identifier shown in FIG. 39, along with associated connect circuits in FIG. 36 is similar to the line identifier arrangement in the line group marker. One P conductor from each of two C matrices, C1 and C10, are connected as shown in FIGS. 38 and 41 to the allotter which in response to the service request causes the operation of relay 38GS and the slaves in the other figures, and locks out other line groups. Then the P conductor from the input (vertical) side of the C matrices C1 and C10 are connected through contacts of relay 36HSA and relay 36GS to the hundreds scanner 3903, which operates one of the relay drivers 3941–3946 to identify the hundreds group. This causes operation of one of the relays 36HA1–36HA6, and one of the relays 37BL1–37BL6. These relays lock to ground through contacts of relay 37BC. The P conductor from the input (horizontal) P conductor of the B matrices are then connected through contacts of the operated one of the relays 36HA1–36HA6, and contacts of relay 36GS to the tens scanner 3902, which causes operation of one of the relay drivers 3931–3940. This causes operation of the corresponding one of the relays 39T1–39T0 and in conjunction with the hundreds identify one of the sixty relays 36HT11–36HT60. The P conductors from the inputs (verticals) of the A matrices are then connected through contacts of the operated one of the relays 36HT11–36HT60, and through contacts of relay 36GS, and in FIG. 39 through contacts of relay 39URB to the units scanner 3901, which in scanning operates one of the relay drivers 3921–3925, and the corresponding one of the relays 39U1–39U5.

The apparatus including relay drivers 3911–3915 in FIG. 39, and the relays 36BLA, 36BLC, 36SPA, and 36SPC in FIG. 36, provides a means to release all line relays; except the one which was identified and has battery potential through resistor 3981 applied to its P conductor.

Figure 4:
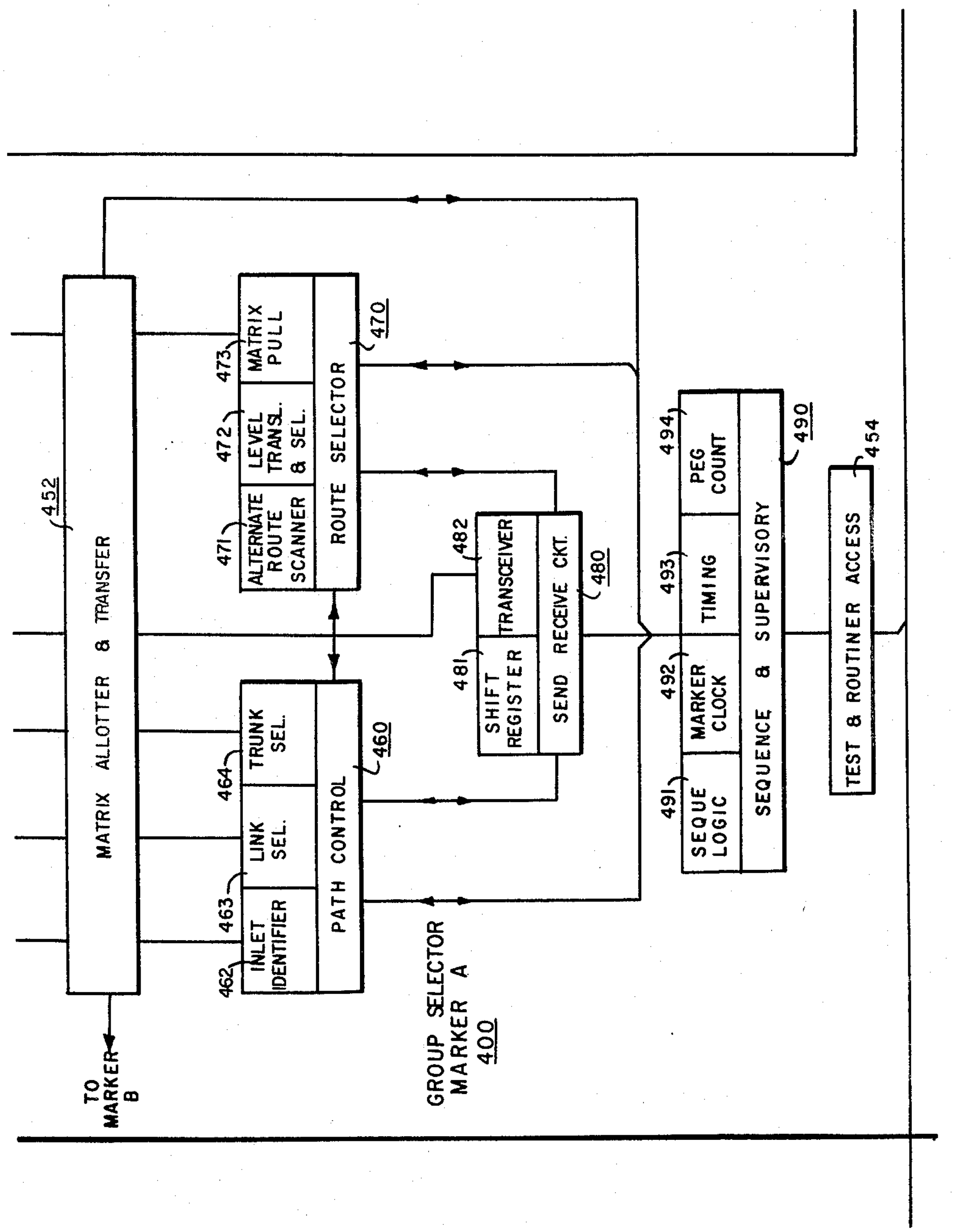
Figure 5:
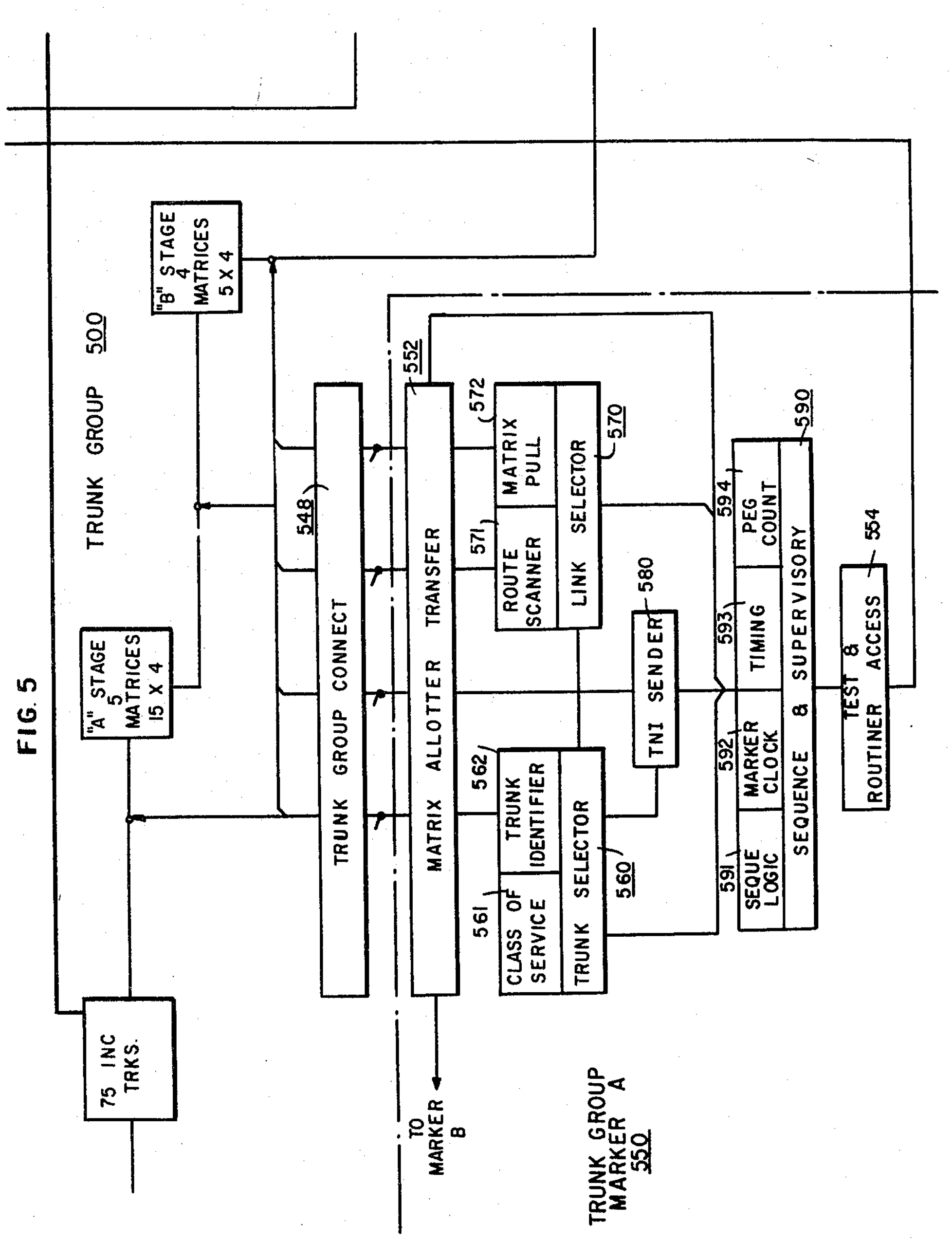

The tip and ring conductors are connected through contacts of relay 34L to conductors TC and RC and thence through contacts of relay 36GS to conductors MTC and MRC to the send receive circuit transceiver 482 (FIG. 4). The switching instructions then can be received and supplied to the various selecting units of the marker. The C conductors of the AB links, from the horizontal terminals of the A matrices are connected in FIG. 36 through contacts of the operated one of the relays 36HT11–36HT61 and in FIG. 37 contacts of relay 37GS to the link selector in FIG. 40. The C conductors of the BC links from the vertical terminals of the B matrices are taken in FIG. 37 through contacts of the operated one of the relays B11–B60, and through contacts of relay 37GS to the trunk scanner and selector in FIG. 40. Thus sixty leads MBC1–MBC60 are connected into the trunk scanner and selector 4001, to indicate the availability of paths in the switching network. Negative 16 volts through resistors and contacts of operated ones of relays 40CL1–40CL0 busy out BC links in paths to busy AB links.

The level translator and selector 4101, and alternate route scanner 4102, along with the trunk scanner and selector 4001 and other circuits of the group selector marker and connect circuits enables the selection, seizure, and/or alternate routing of the switching outlets of the group selector matrix.

The alternate route scanner 4102 uses coincidence gating to provide both electronic and relay signals when the selected trunk group requires an alternate route-special instruction.

The level translator and selector 4101 selects a group of outlets, dependent upon the received switching digits from the send receive circuit 480 (FIG. 4). It provides accessing to trunk groups of various sizes, up to a maximum of 60 trunks. It also provides for the sequential accessing of a primary route and a maximum of four alternate routes.

The matrix pull circuit comprising fifteen units relay drivers 4111–4125, and four tens relay drivers 4131–4134, along with a relay driver 4140 seizes an outlet dependent on the trunk scan position and trunk level position.

Figure 42:
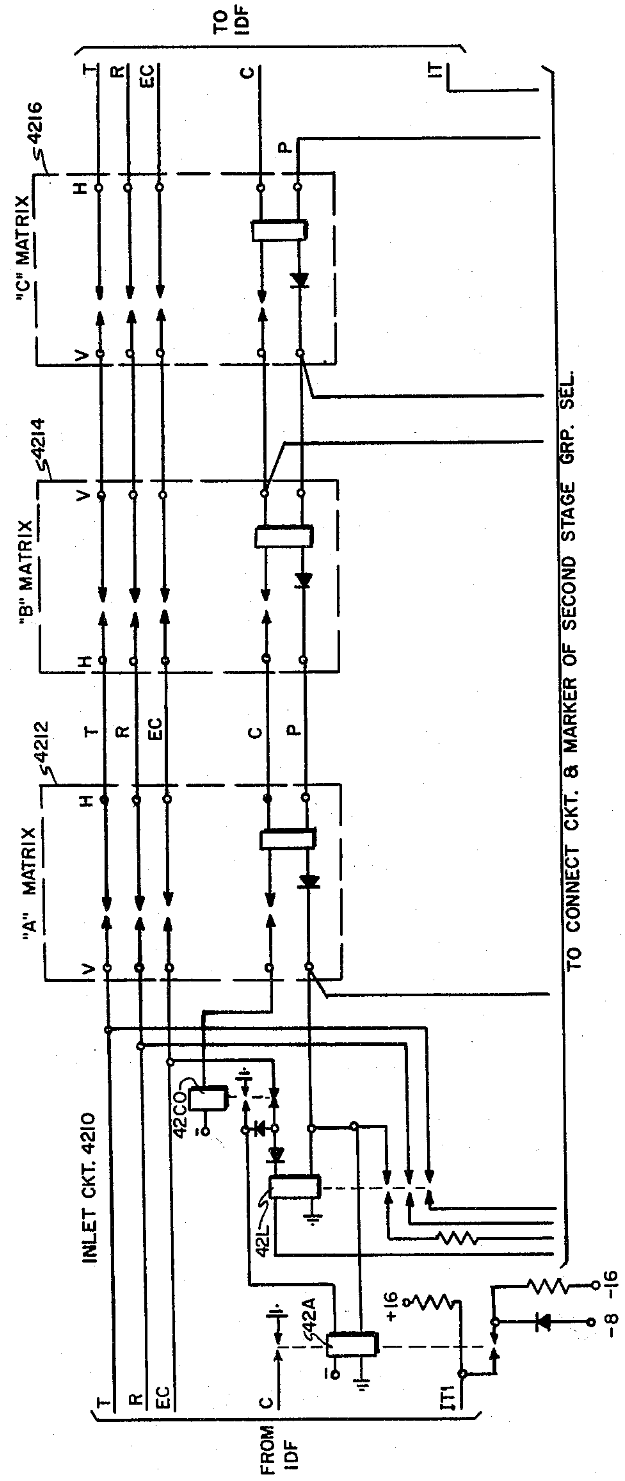

The idle test leads from the selector outlets which come through the IDF from idle test circuits such as that shown in FIG. 19 for a terminating junctor, or FIG. 42 for a second selector. In FIG. 38 there are 120 relays 1G1 to 20G10, and 20 relays AL1 to AL20 which are selectively operated in response to signals from the level translator selector 4101. This provides a path for connecting the idle test leads through contacts of relays in the group 1G1 to 20G10 and then through contacts of relay 37GS to conductors M1T1–M1T60 to the trunk scanner and selector 4001.

The matrix pull ground potential is connected through contacts of relay driver 4140, contacts of one of the relay drivers 4111–4125, contacts of relay 38GS, contacts of one of the relays 38MT1–38MT8, and contacts of one of the relays AL1–AL20 to the horizontal P conductor of the C matrix. The battery potential through resistor 3981 and contacts of relay driver circuits in FIG. 39 is supplied over one of the leads MAU1–MAU5, contacts of relay 36GS, and contacts of one of the relays 36HT11–36HT60 to the vertical P conductor of the A matrix. The connection can thereby be established, and is held by ground potential on the C conductor from the outlet through the three matrices in series and the cutoff relay 34CO to battery.

A second selector inlet circuit and switching network is shown in FIG. 42. This is the same as a first selector circuit except that the inlet circuit 4210 includes an idle test circuit and an additional relay 42A for returning ground over the C lead to the preceding switch train.

REGISTER JUNCTOR

Figure 43:
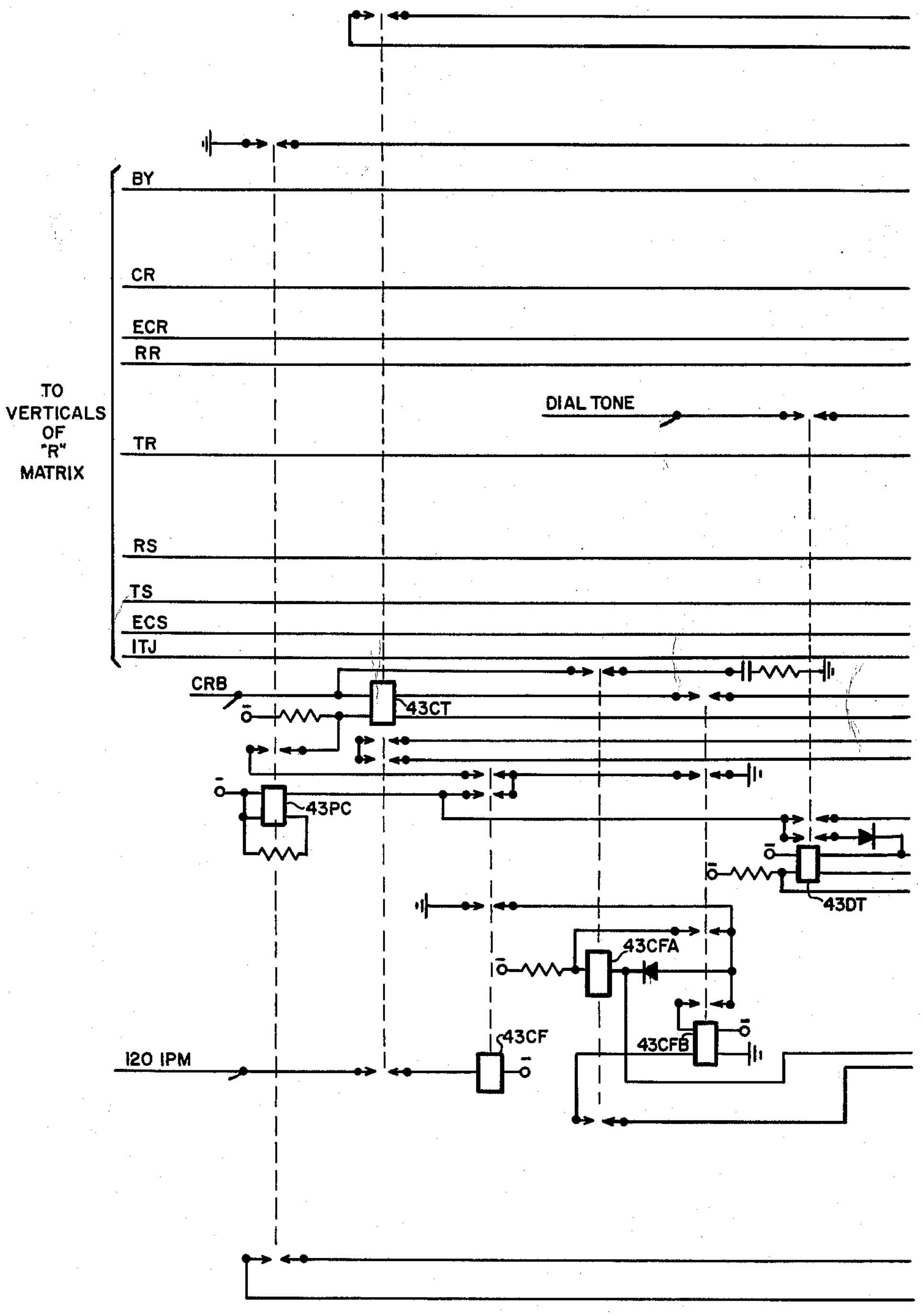
FIGS. 43–45 are to be arranged.
Figure 44:
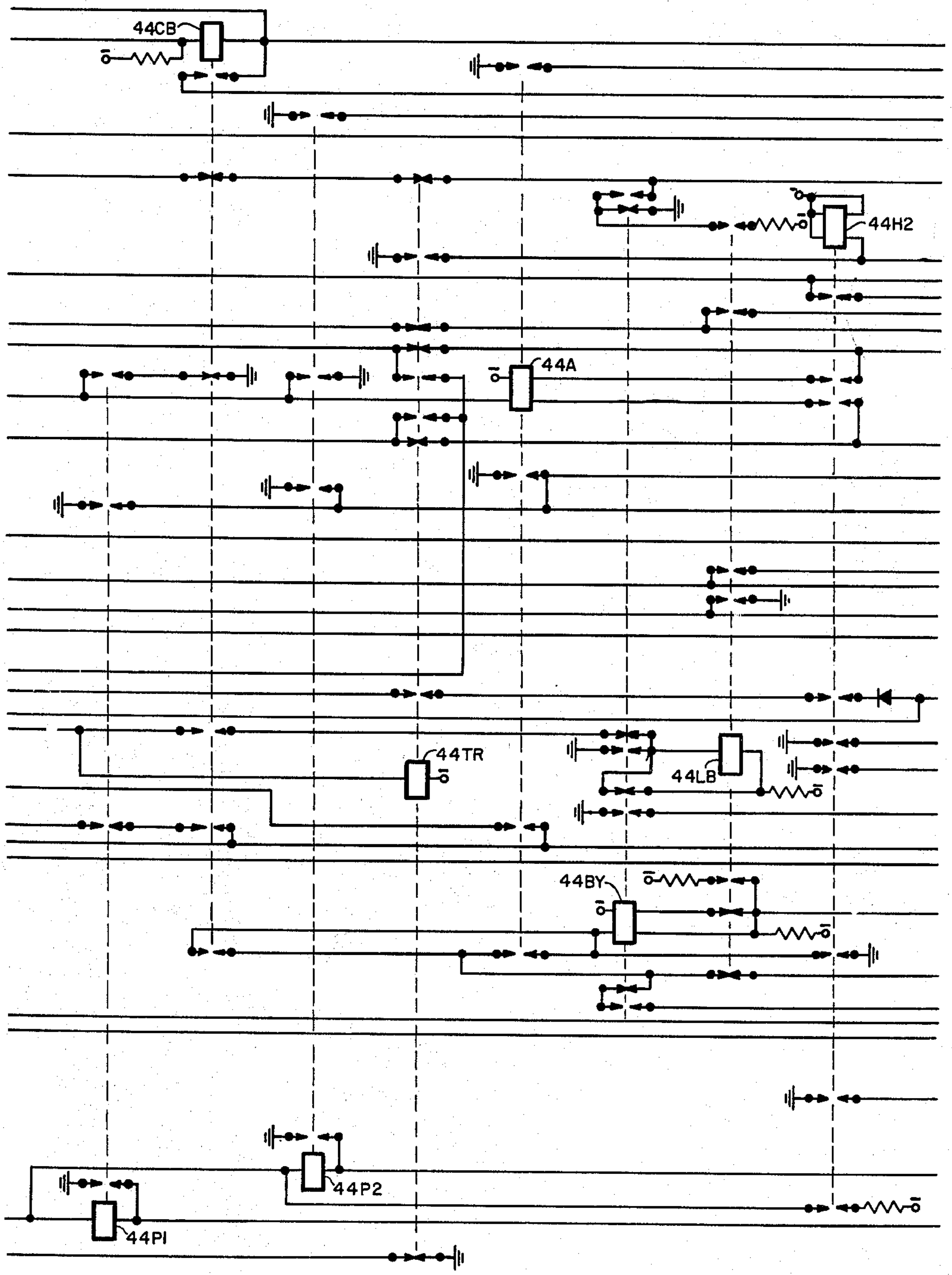
Figure 45:
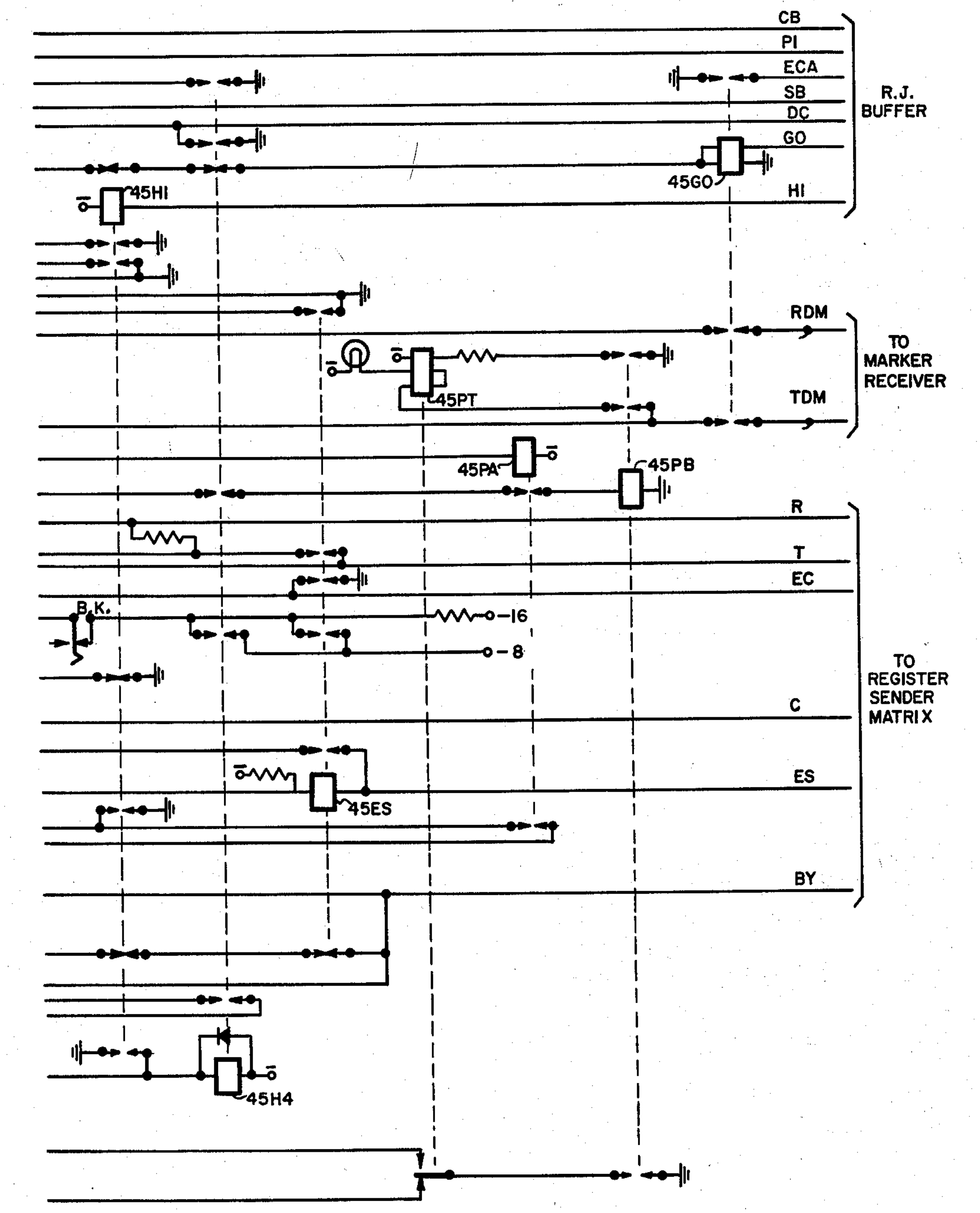
Figure 46:
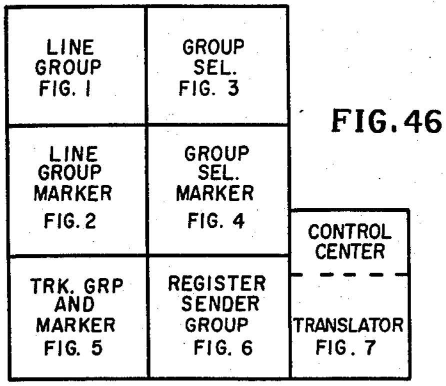
FIG. 46 shows how
Figure 50:
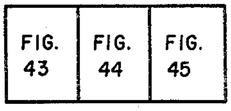
FIG. 50 shows how

A local register junctor 601 is shown in FIGS. 43–45, arranged as shown in FIG. 50.

The register junctor portion of the register-sender comprises a maximum of 24 register junctors, local or incoming, in this preferred embodiment. An important function of the register junctor is the provision of a buffer between the electronic equipment of the register-sender group and the outside facilities. As such, the register junctor employs reed relays for all switching functions and performs all functions of the register-sender which require direct connection to the calling line. These functions include dial pulse repeating, dial tone control, battery feed to the calling line, calling station identification on party lines, test for coin deposit on calls from paystation, coin refund on busy or abandoned calls, and test for coin refund.

Upon seizure, the line marker connects low resistance ground over lead BY causing relay 45GO to operate and to connect ground via lead EC to the register receiver in the succeeding equipment. The register receiver then returns a ground signal over lead GO to hold relay 45GO operated. Furthermore, this ground is extended through the winding of relay 45GO to lead BY which causes the line group marker to connect the diphase sender to the TR and RR leads. After all of the diphase information is received by the register receiver in the succeeding equipment, the register receiver removes ground from lead GO, thereby causing relay 45GO to restore.

The dial tone is provided for all calls immediately upon seizure. Relay 45H1 operates in response to ground being connected to lead H by the register receiver. As a consequence, relay 43DT operates and locks by means of its first winding. Relay 44H2 operates and connects relay 44A to leads TR and RR. Relay 45H1 also causes relay 45H4 to operate. These H relays hold the register junctor operated and provide a time delay before the release of the register junctor.

The dial tone is provided for all calls immediately upon seizure, being connected through winding 2 of relay 44A to the calling party under the control of relay 43DT. The tone is removed from the line upon the first on-hook signal from the line.

A call from a paystation causes relay 44CB to operate in response to ground being connected to lead CB by the succeeding common equipment. When calls originate from paystations which are not arranged to prevent dialing before coin deposit, dial tone is reconnected to the line if the calling party fails to deposit the coin. When calls originate from paystations which are arranged to prevent dialing before coin deposit, dial tone remains connected to the line until the coin is deposited. Deposit of the coin connects ground through the coin-control relay at the paystation via the preceding equipment to lead TR. When relay 44A restores on the first on-hook signal, the circuit is opened to relay 43PC and relay 43PB operates in series with relay 45PA, which connects sensitive polar relay 45PT to lead TR. If ground is connected to lead TR, relay 45PT operates. After approximately 20 ms., relay 44P2 operates, causing ground to be returned to the subsequent equipment over lead SB to indicate that the coin has been deposited. The operation of relay 44P2 also prepares relay 44A for the receipt of dial pulses.

The 20 ms. delay prevents registration of a momentary operation of the polar relay due to the discharge of ringers, or the discharge of line capacitance. The delay is accomplished by means of relay 43PC which produces a 20 ms. delay in restoration.

If the paystation subscriber had failed to deposit a coin, relay 45PT does not operate and relay 44P1 operates, instead of relay 44P2, after the 20 ms. delay, thereby causing relay 43DT to reoperate. Therefore, dial tone is reconnected to the line. On the next off-hook indication, relay 43PC reoperates and causes relay 44P1 to restore. This coin test operation is repeated upon either the receipt of each on-hook signal until the coin is finally detected or the succeeding equipment causes the register junctor to release after a time-out period of approximately 35 seconds by removing ground from lead H1 to restore the hold relay 45H1.

The dial pulses are repeated by the register junctor to the common equipment as ground pulses over lead P under control of relay 44A.

If the call originates from a party line, ground being connected through a three-thousand ohm resistor from the shunt springs of the dial, indicates that the call originates from party number 2 of that particular party line. Absence of ground indicates that the call originates from party number 1 of that particular line. Party identification is made in the same manner as the coin deposit test, with the exception that relay 44CB is not operated. Relay 44P2 indicates to the succeeding equipment which party has originated the call.

After the sender has been coupled to the register junctor, three types of indications of the call progress may be sent from the sender to the register junctor; end of send, line busy, and trunk busy.

The end of send indication is transmitted upon the successful completion of the call. The junctor immediately returns a release signal to the sender and transmits a signal to the preceding equipment that the call has been successfully completed. This operation is accomplished upon the receipt of ground on lead ESV, causing relay 45ES to operate and to return ground over lead ESV for the release of the sender in the common equipment. Operation of relay 45ES also connects ground to lead ECR to signal the originating circuit. The junctor will continue holding the switch train for an additional 100 ms. to assure that the succeeding circuits have taken over control of the switch train.

The line busy indication is similarly performed with additional operations. To provide line busy indication −50 v. is received from the sender on lead BYV causing relay 44BY to operate. Thereupon relay 44LB operates and causes −50 v. to be repeated by lead BY to the preceding equipment.

The trunk busy indication is provided from the sender during all calls which cannot be successfully completed, other than the actual line busy condition. Ground is received from the sender via lead BYV, causing relay 44BY to operate only its make contacts and to transmit ground, instead of −50 v., to the preceding equipment via line BY. Consequently the preceding equipment is able to distinguish the line busy indication from the trunk busy indication. As a result the register junctor signals the sender to release, repeats the trunk busy indication to the originating equipment, and then returns to idle.

If a call originates from a paystation, the sender is signalled to release, but the trunk busy indication is withheld from the originating equipment until the coin has been refunded. Operation of relay 44BY causes relay 44TR to operate and, when relay 45H1 releases in response to the removal of ground from lead H1 by the succeeding equipment, relay 43CT operates via its number one winding. Relay 44CB also releases in response to the operation of relay 44TR. Operation of relay 43CT connects relay 43CF to the 120 i.p.m. impulses, thereby causing relay 43CF to follow the 120 i.p.m. and to cause relays 43CFA and 43CFB to operate and restore in a four state sequence.

During the first state, relay 43CFA is operated and relay 43CFB is restored. This condition allows −110 v. from lead CRB to be connected to lead TR, thereby enabling the coin-box to refund the coin.

During the next state relay 43CFB operates in series with relay 43CFA, maintaining the −110 v. on the line. The third state occurs when relay 43CF reoperates and relay 43CFA releases. If the coin has been successfully refunded, ground is removed from lead TR which causes the second winding of relay 43CT to be open-circuited. At the same time the first winding of relay 43CT becomes short circuited, which allows relay 43CT to release.

However, if the coin had not been refunded due to the improper operation of the coin return mechanism in the paystation, ground on lead TR holds relay 43CT operated. Then relay 43CFB restores, which creates the last state in the sequence, and −110 v. is removed from the line in order to retransmit refund current on the next cycle. An impulse is needed for the operation of the coin return release mechanism rather than steady current flow. The four-state cycle is then repeated until the coin is successfully refunded.

If the coin is not refunded within approximately five seconds, relay 45H1 is reoperated opening the circuit to the second winding of relay 43CT and eventually restores relay 43CT to normal. If the coin is successfully refunded, relay 43CT restores which causes the remainder of the relays in the junctor to restore with the exception of relays 45H1 and 44BY. When relay 44TR restores, ground is transmitted via line BY to the preceding equipment. Thereupon, relays 45H1 and 44BY are eventually released by the succeeding equipment.

The trunk busy condition is also generated by the register junctor when the common equipment signals the register junctor to disconnect prior to the end of send indication from the sender. Relay 45H1 releases, thereby connecting ground to lead BYV. The remainder of the operation is performed as described above.

While I have described above the principles of my invention in connection with specific apparatus, it is to be clearly understood that this description is made only by way of example and not as a limitation to the scope of my invention.

Copending United States patent applications owned by the same assignee which disclose or claim apparatus used in the electronic automatic exchange system disclosed herein, or alternative embodiments of apparatus for use in the system, include the following by serial numbers:

S.N. 127,237, filed July 27, 1961, for Crosspoint Switching Arrays by E. J. Glenner and K. K. Spellnes;

S.N. 127,648, filed July 28, 1961, now Patent No. 3,128,356, for Dry Reed Relays by G. S. Lychyk and A. Taliste;

S.N. 132,897, filed August 21, 1961, for Printed Matrix Board by P. K. Gerlach, G. J. David and R. O. Stoehr;

S.N. 191,238, filed April 30, 1962, for Reed-Type Switching Device by R. K. Else and A. Taliste;

S.N. 204,936, filed June 25, 1962, for Control Circuit by B. Sherstiuk;

S.N. 231,425, filed October 18, 1962, for Line Identifier Arrangement for a Communication Switching System by L. Bruglemans;

S.N. 231,625, filed October 19, 1962, for Communication Switching System Common Control by K. E. Prescher, R. E. Schauer, and J. G. Van Bosse;

S.N. 231,627,filed October 19, 1962, for Translator by E. J. Glenner;

S.N. 233,290, filed October 26, 1962, for Reed Relay Circuit by R. K. Else and L. J. Meyer;

S.N. 240,497, filed November 28, 1962, for Communication Switching System by M. H. Esperseth, F. B. Sikorski, K. K. Spellnes and W. R. Wedmore;

SN. 254,750, filed January 29, 1963, for Communication Switching System and Outlet Testing Circuit Arrangement Therefor by W. B. Klees, W. C. Miller and E. H. M. Sellenslagh;

S.N. 268,384, filed March 27, 1963, for Magnetic Drum Translator by J. R. Maneschi, J. E. Meschi, V. R. Rice, J. G. Van Bosse and L. W. Amiot;

S.N. 268,385, filed March 27, 1963, for Register-Sender Arrangement for a Communication Switching System by R. E. Schauer, K. E. Prescher, J. G. Van Bosse and A. C. Lange;

S.N. 272,608, filed April 12, 1963 for Magnetic Drum Translator by J. R. Maneschi;

S.N. 278,954, filed May 8, 1963, for Communication Switching Equipment Supervisory Apparatus by W. R. Wedmore;

S.N. 280,053, filed May 13, 1963, for Sender for Communication Switching System by B. Sherstiuk;

S.N. 304,825, filed August 27, 1963, for Communication Switching Marker Arrangement by F. B. Sikorski and W. R. Wedmore;

S.N. 304,826, filed August 27, 1962, for Communication Switching Marker Selection Arrangement by F. B. Sikorski;

S.N. 304,827, filed August 27, 1963, for Sender Apparatus and supervisory Apparatus in a Unit Connecting Registers and Senders to the Switching network by B. Sherstiuk;

S.N. 304,892, filed August 27, 1963, for Marker for a Communication Switching Network by W. R. Wedmore;

S.N. 308, 112, filed September 11, 1963, for Register-Sender Arrangement for a Communication Switching System Common Control Arrangement by D. K. K. Lee and H. L. Wirsing;

S.N. 309,093, filed September 26, 1963, for Magnetic Drum Translator by E. P. Kostogiannis and M. A. Langowski;

S.N. 325,870, filed November 26, 1963, for Register-Sender Arrangement by H. L. Wirsing;

S.N. 330,730, filed December 16, 1963, for Matrix Gating Arrangement for a Register-Sender by H. L. Wirsing and B. Sherstiuk;

S.N. 331,282, filed December 17, 1963, for Crosspoint Switching Array and Control Arrangement Therefor by K. K. Spellnes;

S.N. 332,208, filed December 20, 1963, for Loop Sensing Circuit by M. Levine;

S.N. 352,527, filed March 17, 1964, for Crosspoint Switching Array and Control Arrangement Therefor by E. Cotroneo and L. Bruglemans;

S.N. 352,910, filed March 18, 1964, for Crosspoint Switching Array and Control Arrangement Therefor by L. Bruglemans;

S.N. 352,912, filed March 18, 1964, for Diphase Transmission System by W. R. Wedmore;

S.N. 361,127, filed April 20, 1964, for Automatic Central-Office Equipment Testing Arrangement by J. R. Vande Wege;

S.N. 362,227, filed April 24, 1964, for Automatic Line-Access Arrangement by F. B. Sikorski and J. R. Vande Wege;

S.N. 367,003, filed May 13, 1960, for Communications Switching System-Common Control Arrangement by K. E. Prescher and J. G. Van Bosse;

S.N. 372,993, filed June 5, 1964, for Diphase Transmission System With Noise Pulse Cancellation by L. Bruglemans;

S.N. 373,032, filed June 5, 1964, for Party Line Exchange With Interworking of Different Type Switching Units by W. C. Miller and F. B. Sikorski;

S.N. 378,351, filed June 26, 1964, for Line Lockout in a Cross Point Switching System by L. Brugelmans.

S.N. 404,764, filed October 19, 1964, for Supervisory Apparatus by J. R. Vande Wege.

S.N. 414,174, filed November 27, 1964, for Arrangements in a Communication Switching System by W. B. Klees and W. R. Wedmore.

In the switching network and marker sections of the system, application S.N. 240,497 covers the arrangement of the crosspoint reed relay windings connected in series, with the network arranged to have unique paths through a given number of tandem stages, so that a path through these stages may be established by applying marking potentials at the end points to operate the crosspoint reed relays, as fully disclosed herein. In this arrangement a diode is connected in series with the operate winding of each crosspoint relay to prevent current flow via undesired paths. Application S.N. 231,425 covers the line identification arrangement making use of a portion of the network including the diodes in the operate conductors of the switching network, as fully disclosed herein. Application S.N. 254,750 covers the parallel test arrangement which permits different markers to simultaneously test the same outlets as used in the line group marker at block 3102 in the register selector of FIG. 31, and as also used in the group selector marker in the trunk scanner and selector of FIG. 40. Application S.N. 304,892 covers the pathfinding arrangement in the marker in which the hold conductors of the links are connected through connect circuits to electronic scanners using ring counters and coincidence gates, as disclosed herein. Application S.N. 304,825 covers the arrangement in the line group marker using the same line identifier for terminating calls as is used for originating calls, as disclosed herein. Application S.N. 304,826 covers a PBX trunk hunting arrangement, using the same line identifier as is used during the originating call sequence, the normal calling potential of all line circuits being first removed and special marking potentials being supplied to all of the lines of a particular PBX group; this application also covers a class of service identification arrangement and other special features of the marker. Application S.N. 233,290 covers the ring trip reed relay arrangement 18RT1 used in the terminating junctor as disclosed in FIG. 18.

Application S.N. 404,764 covers the arrangement for seizure and hold using an extra control conductor in combination with a hold conductor through the switching matrices. Application S.N. 414,174 covers features incorporated in the group selector as disclosed in FIGS. 34–42, including an arrangement for connecting the send-receive circuit of the marker through contacts of the line relay to the transmission path, and also the arrangement for alternate route selection.

Figure 7:
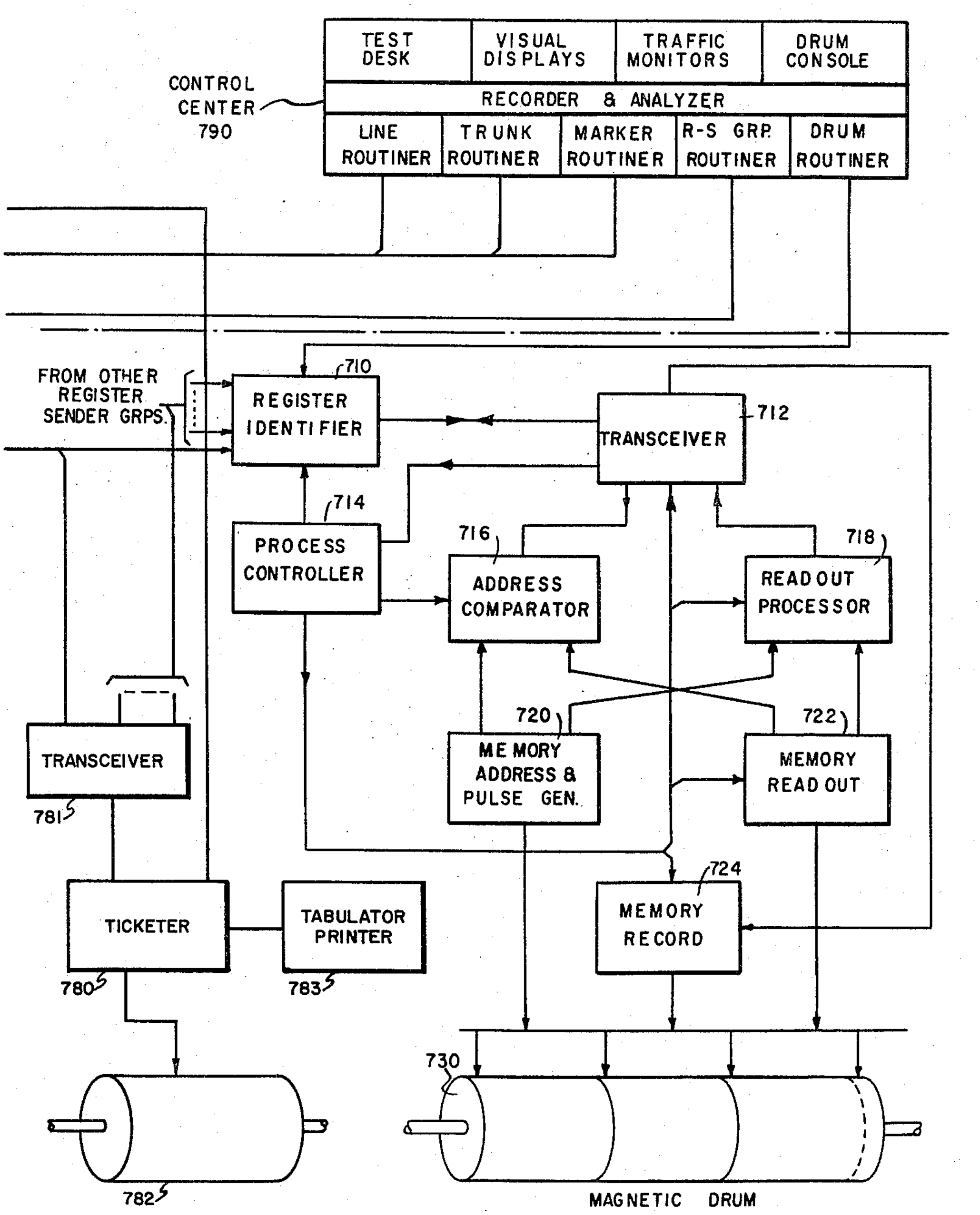
Figure 8:
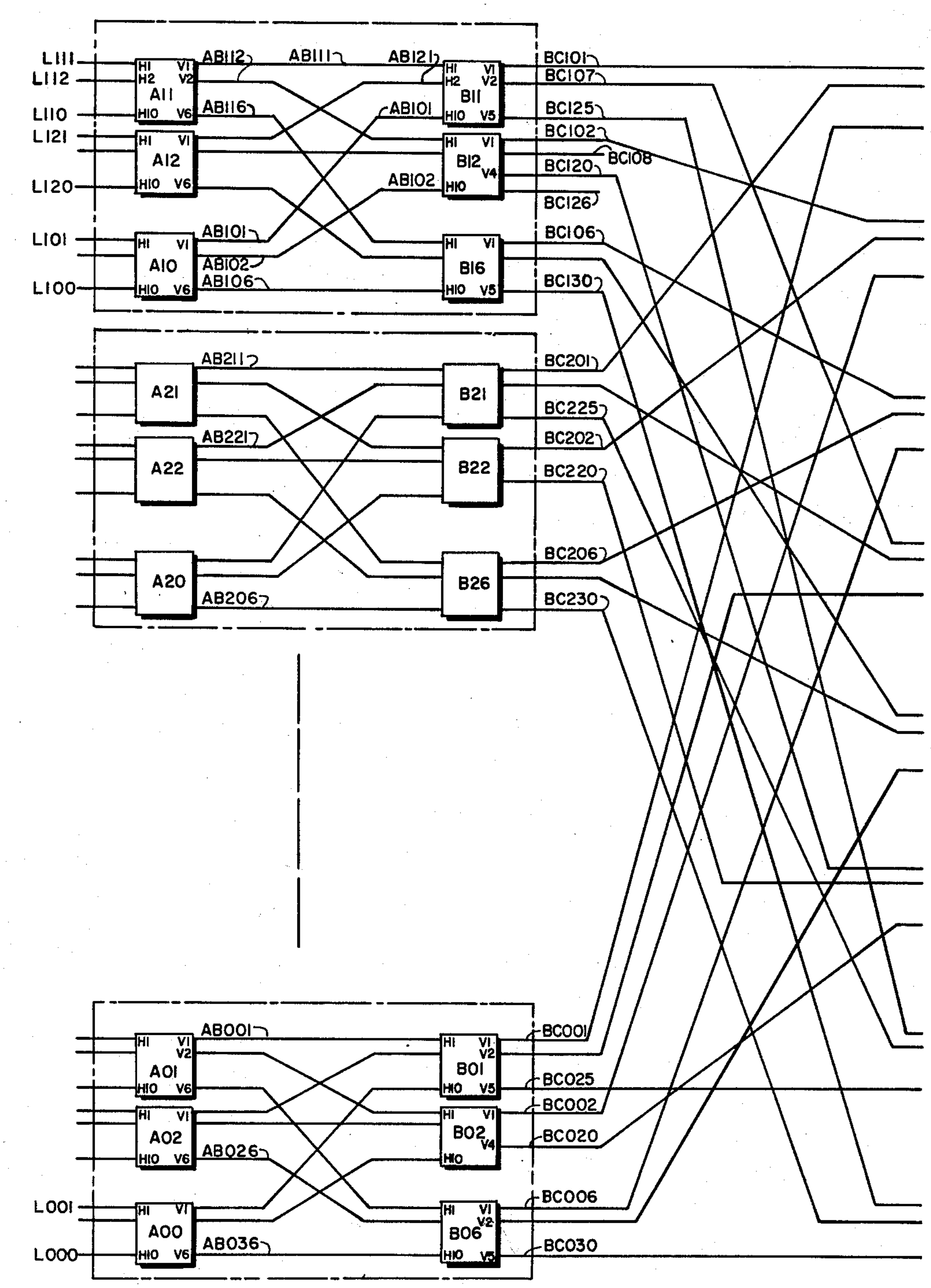
FIGS. 8–11 are to be arranged.
Figure 9:
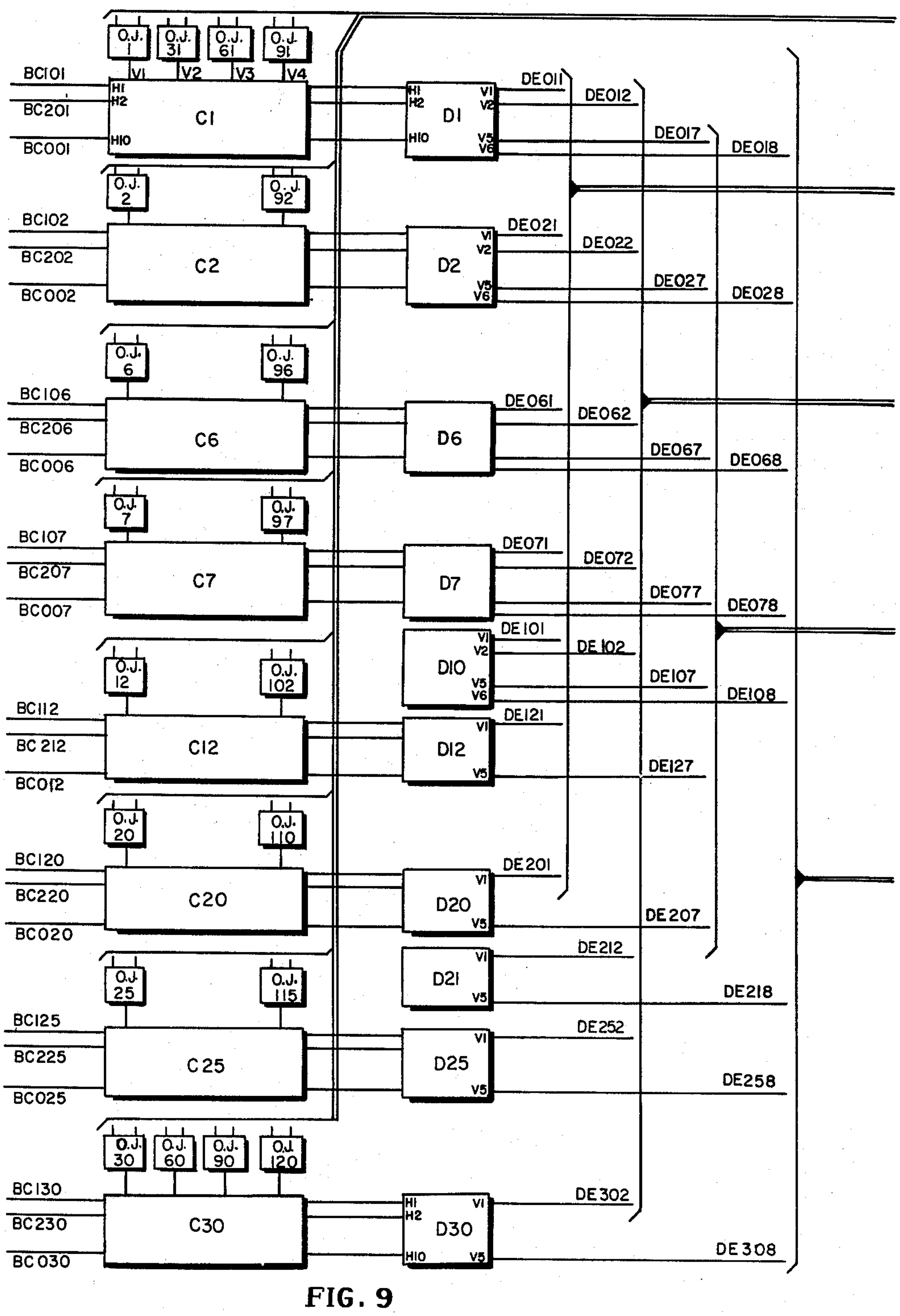
Figure 10:
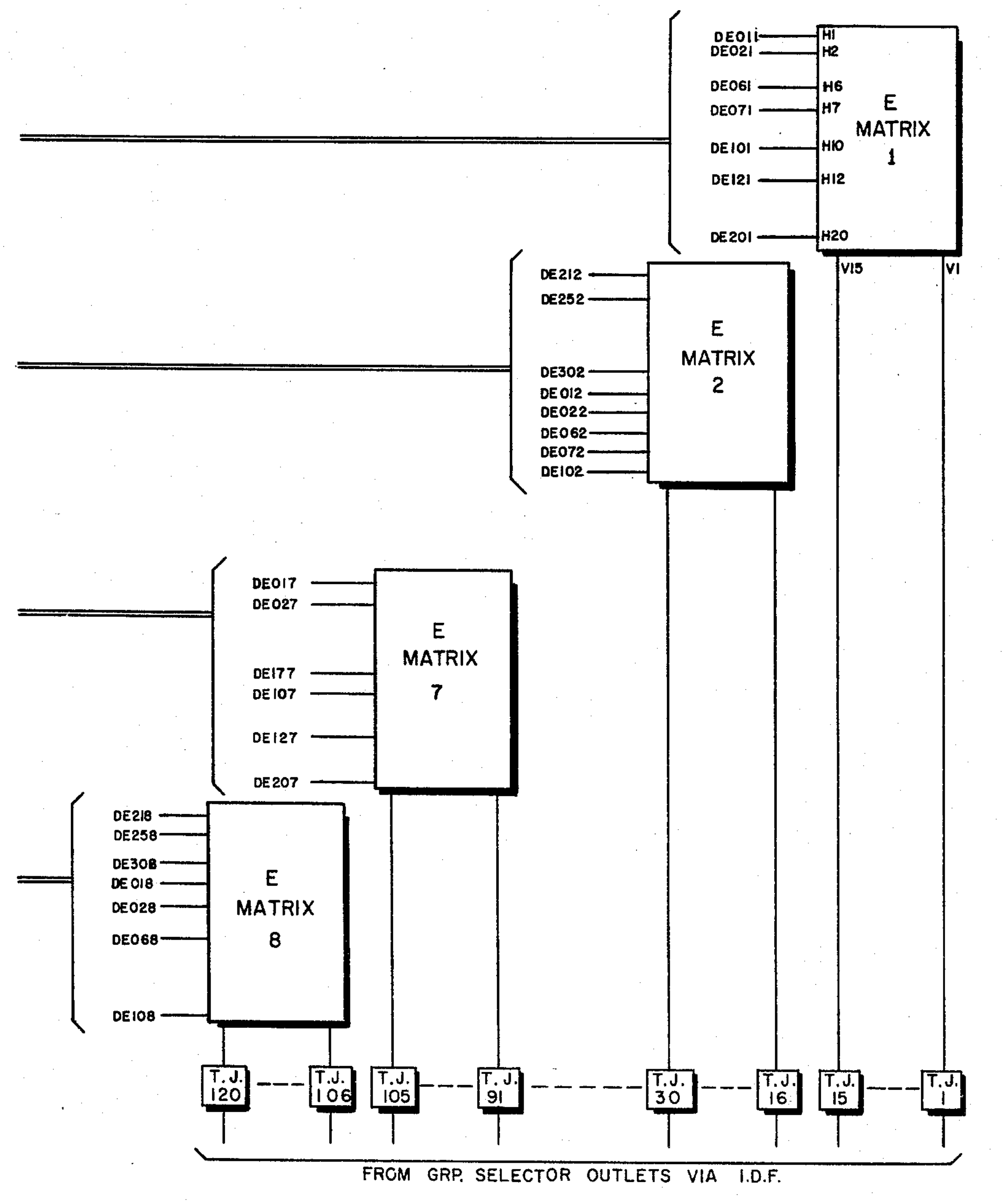
Figure 11:
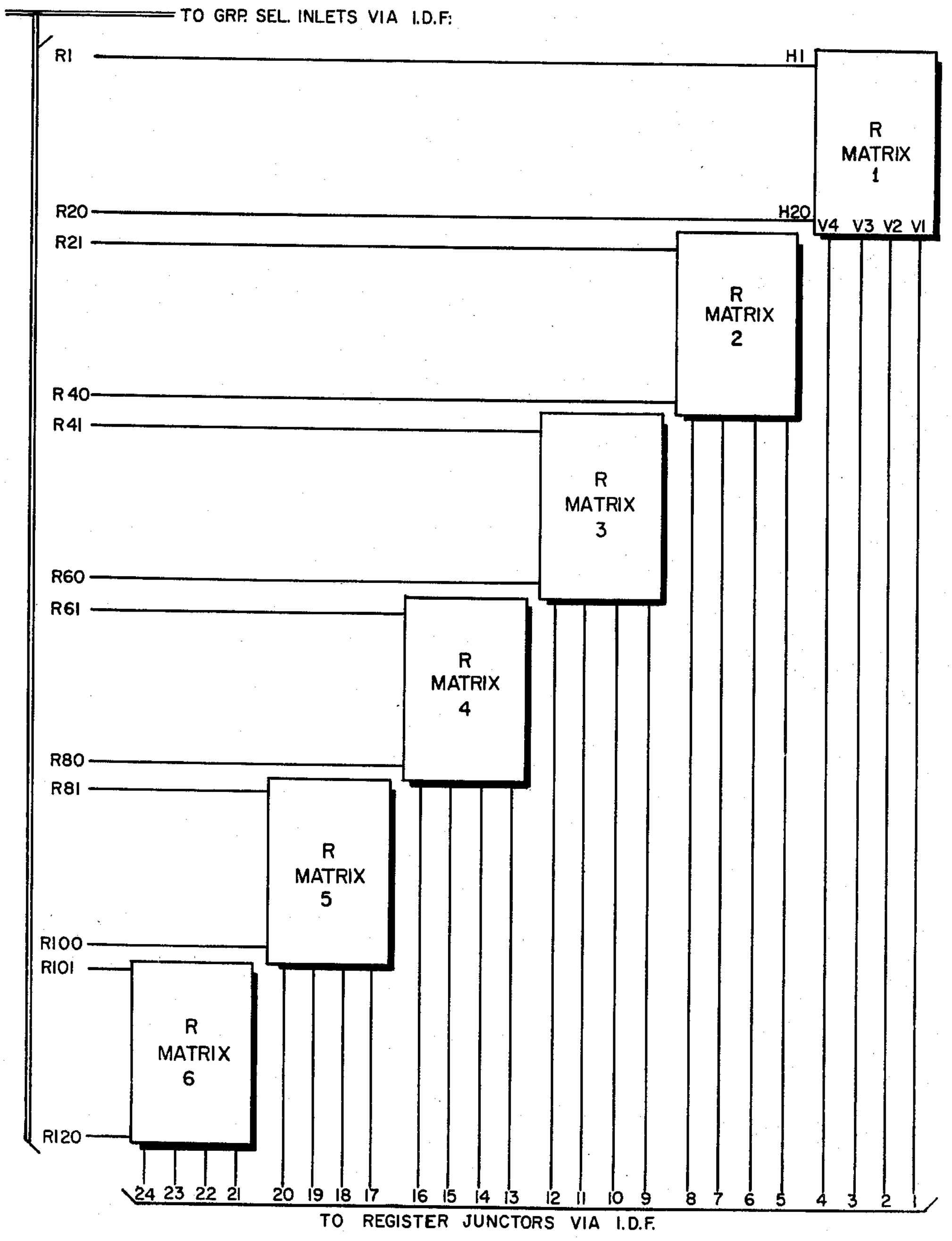
Figure 12:
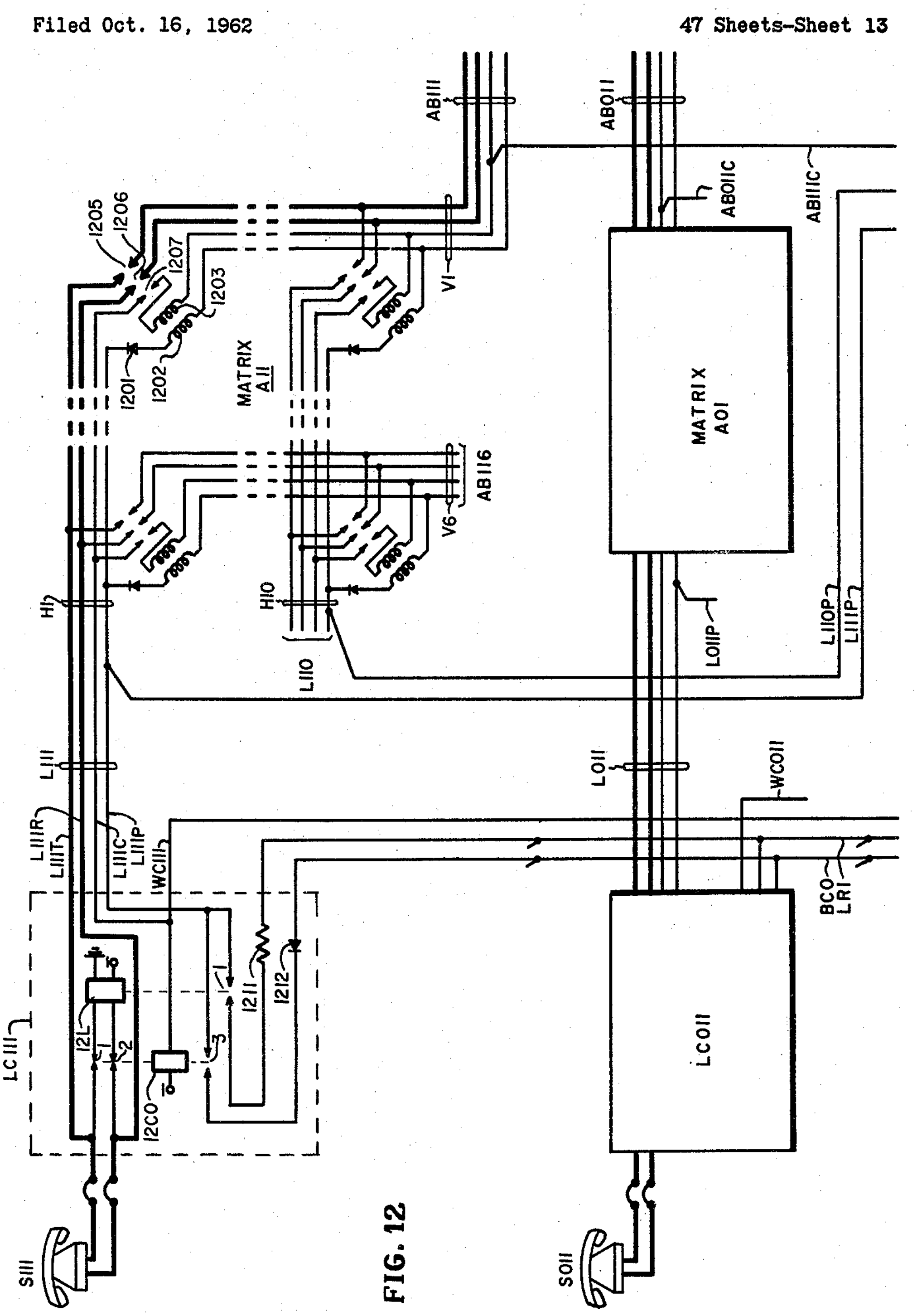
FIGS. 12–33 are to be arranged.
Figure 13:
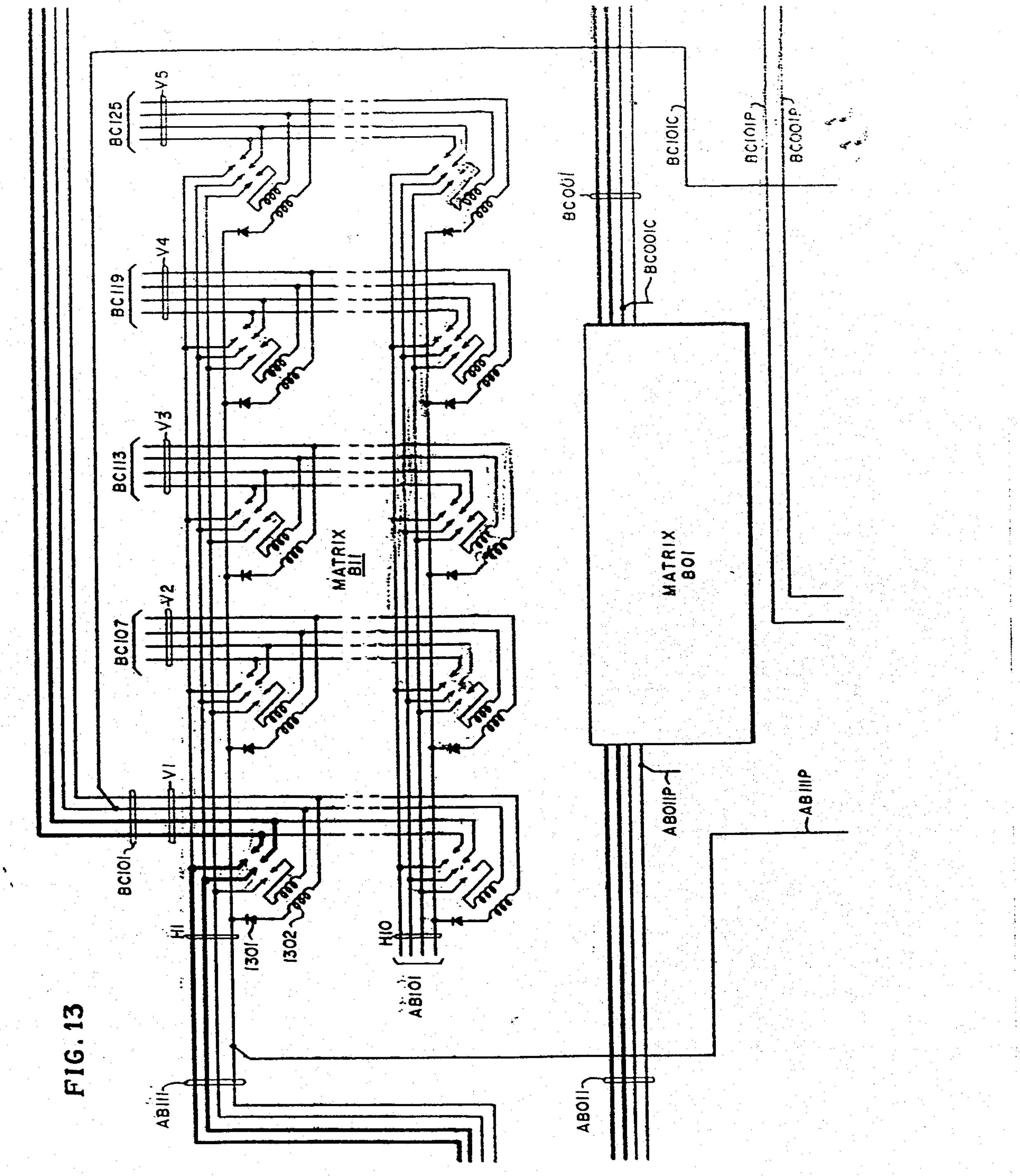
Figure 14:
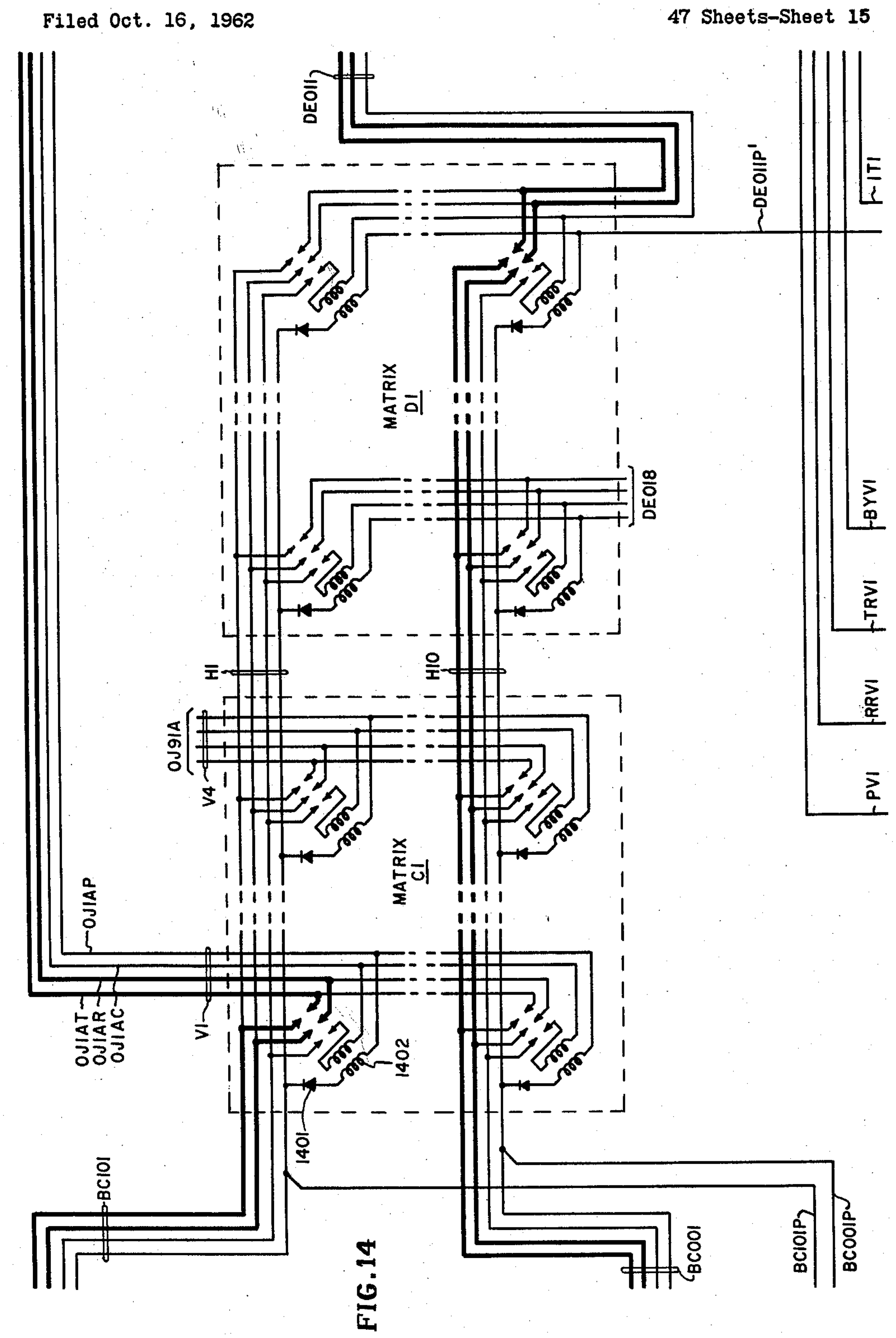
Figure 15:
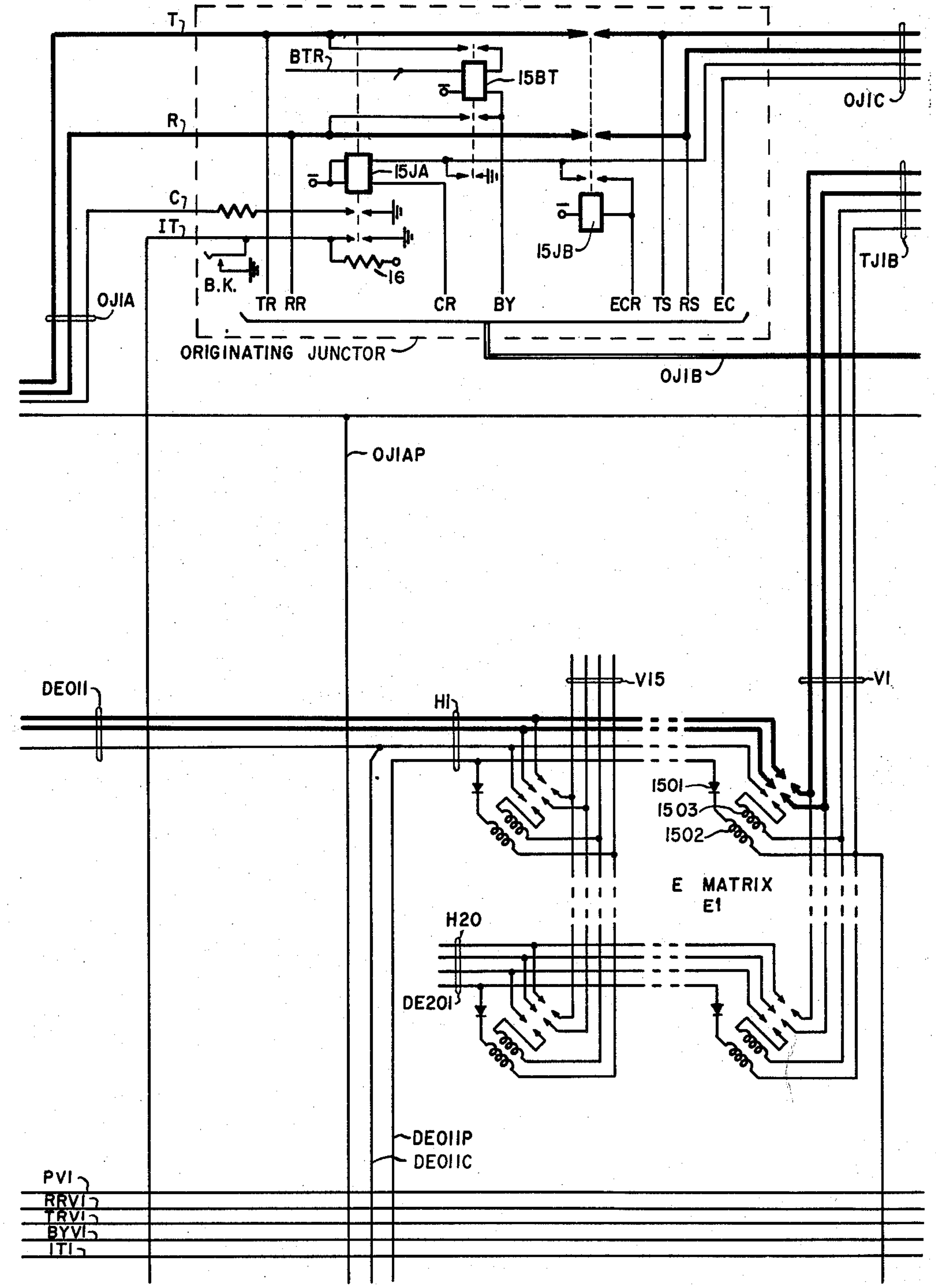
Figure 16:
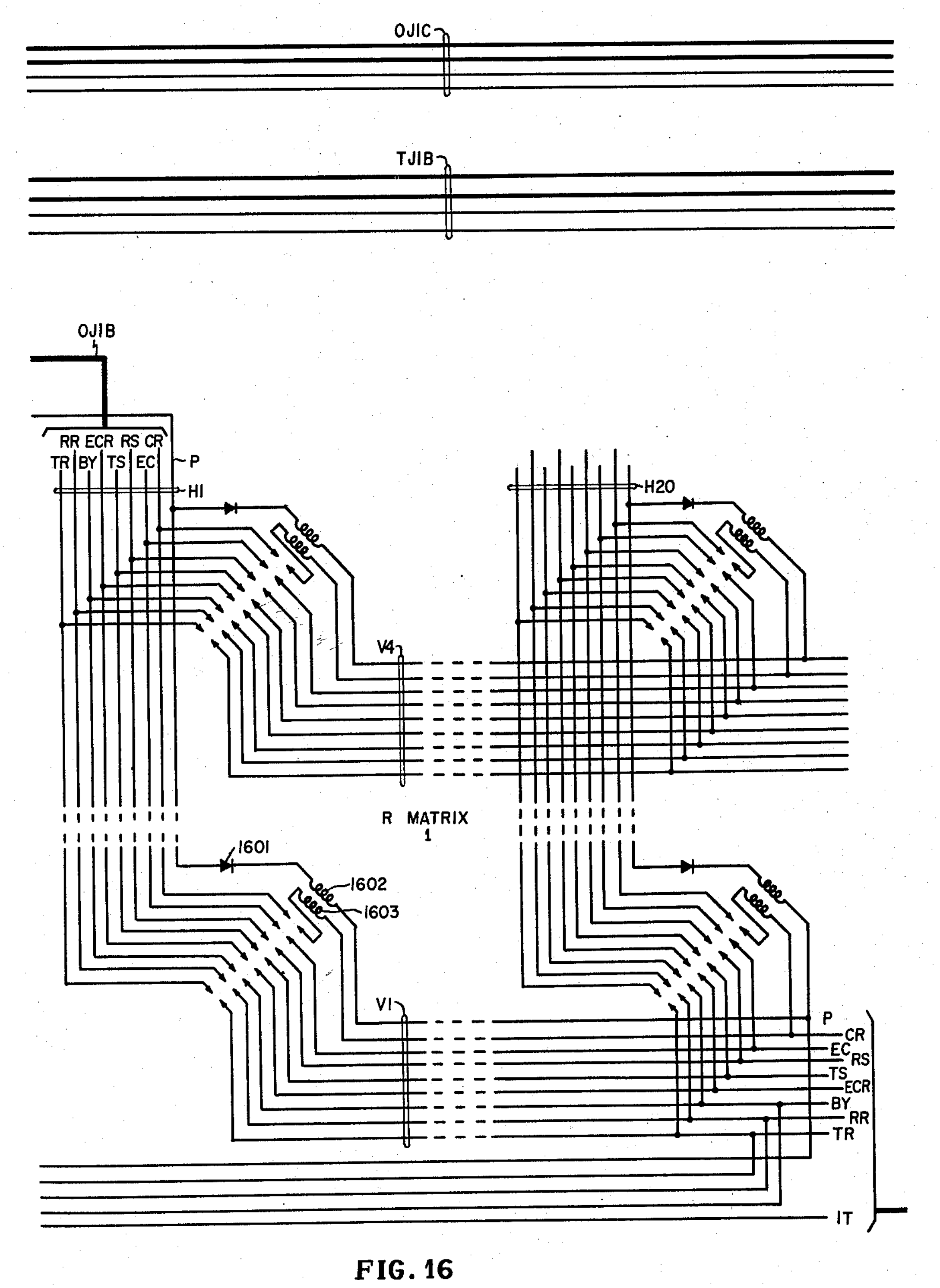

The features of the translator section using a magnetic drum are covered by applications S.N. 231,627, S.N. 238,384, S.N. 272,608 and S.N. 309,093. FIG. 7 herein is a block diagram of the specific arrangement disclosed in the latter two of these four applications.

Application S.N. 231,625 covers an arrangement for binary serial communication between the time division register groups and the translators.

Figure 6:
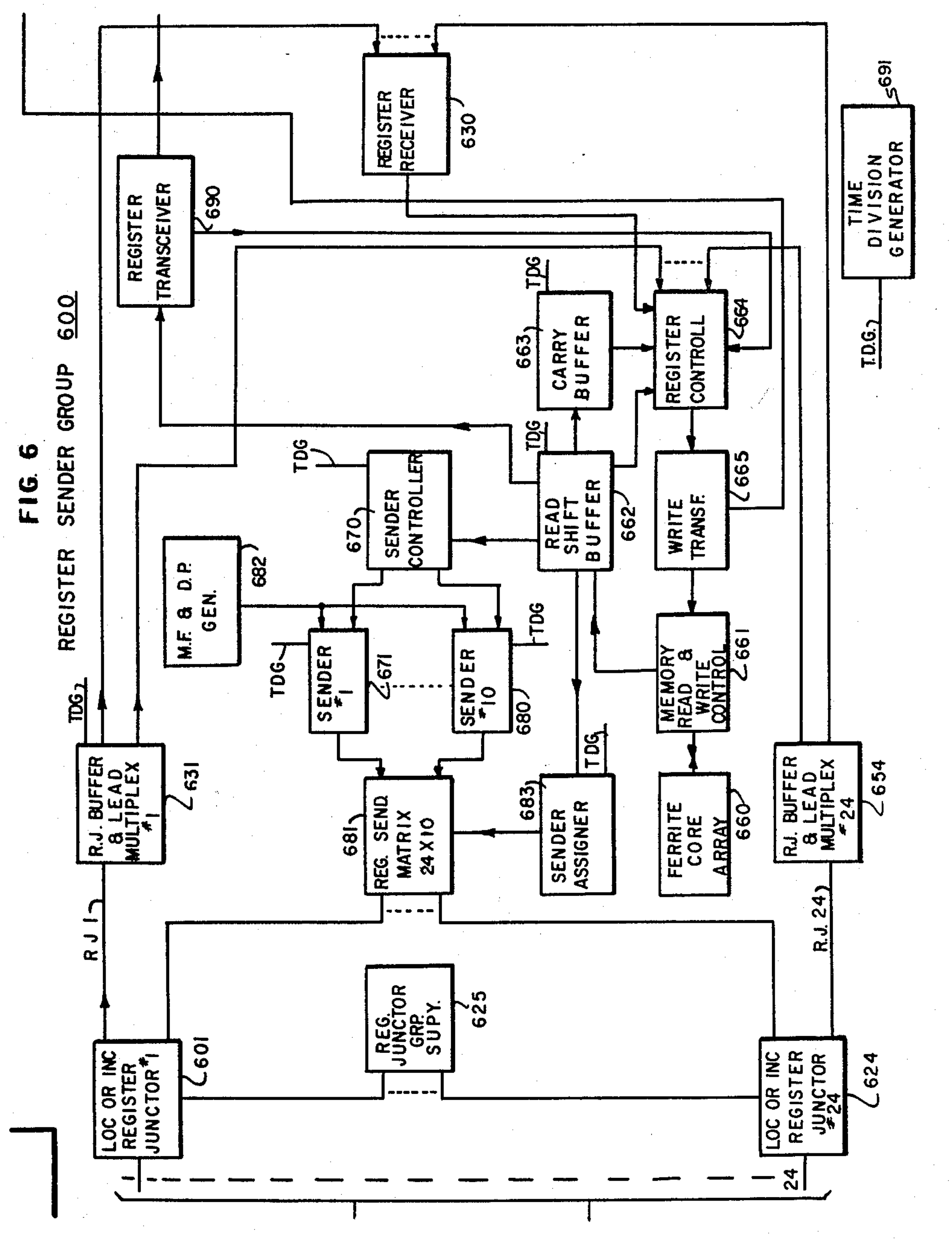

The time division multiplex register arrangement using a plurality of rows of storage in the memory for each register, with shared common logic, is covered by application S.N. 268,385 and its continuation application S.N. 367,003. Other register features are covered by application S.N. 308,112. FIG. 6 herein is a block diagram of the specific arrangement disclosed in S.N. 231,625 S.N. 308,112.

Application S.N. 304,827 covers features of the sender including the arrangement for two way communication with the markers and also covers coin and party line detection features of the register-junctor shown herein in FIGS. 43–45. Other features of the sender are covered in application S.N. 280,053.

The binary serial diphase transmisison arrangement used in the various send-receive circuits, transceivers, senders, and receivers is covered by applications S.N. 352,912 and S.N. 372,993.

The arrangement discussed in the section entitled "Ease of Expansion" for integration of this system with a step-by-step part of an orifice, permitting a subscriber to move back and forth between the step-by-step and this system without changing the directory number is covered by application S.N. 373,032.

What is claimed is:

1. A communication switching system comprising a plurality of switching groups, each group including a plurality of crosspoint switching devices arranged in coordinate matrices;

marker apparatus for controlling the establishment of connections through said crosspoint matrices;

register-sender apparatus comprising register means and a plurality of senders;

translating means common to said plurality of switching groups, and means for transferring information directly between the register means and the translator means;

means including the marker apparatus, responsive to a calling line service request signal for identifying the calling line and connecting it to the register means, means for transmitting the information identifying the calling line from the marker apparatus to the register means for registration therein;

means for registering in said register means the called line directory number as transmitted over the calling line and for translating, under the control of said translating means, at least a part of said directory information into corresponding equipment location information;

means including one of the senders for transmitting said equipment location information to said marker apparatus;

and means including the marker apparatus for completing a connection between the calling and called lines.

2. A communication switching system as claimed in claim 1, further including means for identifying the class of service of the calling line and means for transmitting class of service information along with the line identification information from the marker to the register means.

3. A communication switching system as claimed in claim 1, wherein said switching groups include first switching groups and second switching groups, and the marker apparatus includes a first marker associated with the first switching groups and a second marker associated with the second switching groups, wherein the sender first transmits part of said equipment location information to said first marker of said marker apparatus, which causes a connection to be extended through some of the crosspoint matrices;

and additional part of the equipment location information is then transmitted from the sender over the connection said second marker of the marker apparatus, which caused the connection to be extended to the called line.

4. A communication switching system as claimed in claim 1, wherein said register means comprises equipment shared on a time division multiplex basis by a plurality of calls in recurring time slots, with a memory comprising a coordinate array of storage elements in a recirculating arrangement with said equipment.

5. A communication switching system as claimed in claim 4, wherein some of said switching groups are line groups and others are selector groups, and the marker apparatus includes line marker apparatus associated with the line groups and selector marker apparatus associated with the selector groups;

wherein the sender first transmits part of the equipment location information to the selector marker apparatus, which causes a connection to be established through selector group matrices to the called line group;

and an additional part of the information is then transmitted from the sender over the connection through the selector matrices to the line group marker apparatus to cause the completion of the connection to the called line through line group matrices.

6. A communication switching system as claimed in claim 5, wherein each line group includes a plurality of originating junctors and a plurality of terminating junctors, wherein said connection of a calling line to the register means includes an originating connection through matrices of the calling line group to an originating junctor, and thence a register connection through a matrix to the register means, the selector connection extends from the originating junctor through selector-group matrices to a terminating junctor of the called line group, and the completion of the connection extends from the terminating junctor through line-group matrices to the called line.

7. A communication switching system as claimed in claim 6, wherein each marker of the marker apparatus includes scanning means for selecting outlets accessible from a plurality of markers, and each marker includes, independent pulse generating means for controlling its own scanning means, whereby the markers operate asynchronously.

8. A communication switching system as claimed in claim 7, wherein the register-sender apparatus is divided into groups, each having its own memory and independent pulse generating means, whereby each register-sender group operates asynchronously from all other units of the system.

9. A communication switching system as claimed in claim 5, wherein said translating means includes a magnetic drum, means including a control center for changing translation information recorded on the drum, whereby subscriber equipment numbers can be easily changed and various special services provided.

10. In an automatic telephone system having switching stages for extending connections between called and calling lines, a plurality of register means, means including junctor means for seizing one of said register means for a given call and for transmitting the called party number thereto for registration thereon;

directory number translator means connected for seizure by said register means operative to determine the terminal location of said called directory number and to provide the terminal location to said register means;

a plurality of sender means, the total number of sender means being less in number than the number of register means, means for assigning one of said sender means to one of said seized register means, and means for transferring information including said terminal location from said register means to the assigned sender means, means for selectively connecting said assigned sender means to said junctor means to establish an output path from the sender means by way of said junctor means associated with said call to further switching stages in the call routing, and means for transmitting information from said sender means by way of said path to said further switching stages to control the switches to route the call to the called line registered on said register means.

11. In an automatic telephone system, the combination as claimed in claim 10, wherein said register means comprises equipment shared on a time division multiplex basis by a plurality of calls in recurring time slots, with a memory comprising a coordinate array of storage elements in a recirculating arrangement with said equipment.

12. In an automatic telephone system, the combination as claimed in claim 11, wherein said translating means includes a magnetic drum, means including a control center for changing translation information recorded on the drum, whereby subscriber equipment numbers can be easily changed and various special services provided.

13. In an automatic telephone system, the combination as claimed in claim 11, wherein said register means and said sender means are arranged into register-sender groups, each having its own memory and independent pulse generating means, whereby each register-sender group operates asynchronously from all other units of the system.

14. In an automatic telephone system, the combination as claimed in claim 13, wherein each switching stage comprises a plurality of crosspoint switching devices arranged in coordinate matrices, there being a plurality of groups of said switching stages including line groups and selector groups; marker apparatus for controlling the establishment of connections through said crosspoint matrices, including line group markers associated with the line groups and selector group markers associated with the selector groups;

and wherein each marker includes scanning means for selecting outlets accessible from a plurality of markers, and each marker includes independent pulse generating means for controlling its own scanning means, whereby the markers operate asynchronously.

15. In an automatic telephone system, the combination as claimed in claim 14, wherein said junctor means includes register junctors individual to the register means; each selector group has inlets and outlets interconnected by its switching stages; and each line group includes line circuits, originating junctors individually connected to selector inlets, terminating junctors individually connected to selector outlets, and the line group switching stages include at least one originating stage between the line circuits and the originating junctors, at least one terminating stage between the terminating junctors and the line circuits, and at least one register stage between the originating junctors and the register junctors; wherein said means for seizing said register means includes the line group marker which responds to a calling line service request to find and establish an originating path from the line circuit via the originating stages to an originating junctor and from thence via the register stage to a register junctor; and said means for connecting said assigned sender includes a sender switching stage between the sender means and the register junctors, and said outpath extends from the assigned sender means via the sender stage, the register junctor, the register stage, the originating junctor, and the selector inlet to the selector marker; and information transmitted via said output path causes the selector marker to select and establish a connection to extend the path from the inlet via the selector stages to a selector outlet.

References Cited by the Examiner

UNITED STATES PATENTS

| | | | |
|---|---|---|---|
| 2,597,209 | 5/52 | Walsh | 179—18 |
| 2,678,353 | 5/54 | Ostline | 179—18 |
| 2,876,288 | 3/59 | Brooks et al. | 179—18 |

References Cited by the Applicant

UNITED STATES PATENTS

| | | |
|---|---|---|
| 2,918,533 | 12/59 | Leonard et al. |
| 2,989,592 | 6/61 | Slemmer. |
| 3,007,006 | 10/61 | Callender et al. |
| 3,007,008 | 10/61 | Spjeldnes et al. |

ROBERT H. ROSE, *Primary Examiner.*